United States Patent
Godfrey et al.

(10) Patent No.: US 12,496,847 B2
(45) Date of Patent: Dec. 16, 2025

(54) SECURITY DEVICES AND METHOD OF MANUFACTURE THEREOF

(71) Applicant: DE LA RUE INTERNATIONAL LIMITED, Basingstoke (GB)

(72) Inventors: John Godfrey, Basingstoke (GB); Rebecca Locke, Basingstoke (GB)

(73) Assignee: DE LA RUE INTERNATIONAL LIMITED, Basingstoke (GB)

( * ) Notice: Subject to any disclaimer, the term of this patent is extended or adjusted under 35 U.S.C. 154(b) by 0 days.

(21) Appl. No.: 18/025,961

(22) PCT Filed: Sep. 10, 2021

(86) PCT No.: PCT/GB2021/052364
§ 371 (c)(1),
(2) Date: Mar. 13, 2023

(87) PCT Pub. No.: WO2022/053829
PCT Pub. Date: Mar. 17, 2022

(65) Prior Publication Data
US 2023/0347679 A1    Nov. 2, 2023

(30) Foreign Application Priority Data

Sep. 11, 2020  (GB) ..................................... 2014325
Sep. 11, 2020  (GB) ..................................... 2014326
(Continued)

(51) Int. Cl.
*B42D 25/324* (2014.01)
*B41M 3/14* (2006.01)
(Continued)

(52) U.S. Cl.
CPC ........... *B42D 25/324* (2014.10); *B41M 3/148* (2013.01); *B42D 25/29* (2014.10); *B42D 25/351* (2014.10);
(Continued)

(58) Field of Classification Search
CPC .................................................. B42D 25/324
See application file for complete search history.

(56) References Cited

U.S. PATENT DOCUMENTS

2006/0107854 A1    5/2006   Bauer et al.
2008/0024846 A1    1/2008   Tompkin et al.
(Continued)

FOREIGN PATENT DOCUMENTS

CA    2 841 862 A1      1/2013
DE    11 2010 003 249 T5    5/2013
(Continued)

OTHER PUBLICATIONS

WO-2010149476-A1 English Translation (Year: 2010).*
(Continued)

*Primary Examiner* — Kyle R Grabowski
(74) *Attorney, Agent, or Firm* — Oliff PLC

(57) ABSTRACT

A security device is provided, comprising one or more surface relief structure(s), each formed of one or more cured material(s), the surface relief structure(s) being disposed on a substantially flat substrate and defining a plurality of raised elements spaced from one another, the raised elements corresponding to elements of an image, whereby the plurality of raised elements varies across the surface relief structure(s) so as to exhibit a multi-tonal version of the image. Methods of manufacturing such devices are also disclosed.

20 Claims, 28 Drawing Sheets

(30) Foreign Application Priority Data

| Sep. 11, 2020 | (GB) | 2014327 |
| Sep. 11, 2020 | (GB) | 2014328 |
| Sep. 11, 2020 | (GB) | 2014329 |
| Sep. 11, 2020 | (GB) | 2014330 |
| Sep. 11, 2020 | (GB) | 2014331 |

(51) Int. Cl.
- *B42D 25/29* (2014.01)
- *B42D 25/351* (2014.01)
- *B42D 25/369* (2014.01)
- *B42D 25/382* (2014.01)
- *B42D 25/387* (2014.01)
- *B42D 25/425* (2014.01)

(52) U.S. Cl.
CPC ......... *B42D 25/369* (2014.10); *B42D 25/382* (2014.10); *B42D 25/387* (2014.10); *B42D 25/425* (2014.10); *B41P 2200/10* (2013.01)

(56) References Cited

U.S. PATENT DOCUMENTS

| 2008/0160226 | A1 | 7/2008 | Kaule et al. | |
| 2010/0109317 | A1* | 5/2010 | Hoffmuller | B41M 3/14 283/85 |
| 2010/0194091 | A1* | 8/2010 | Heim | B42D 25/21 264/293 |
| 2010/0320742 | A1 | 12/2010 | Hoffmuller et al. | |
| 2011/0045248 | A1 | 2/2011 | Hoffmuller et al. | |
| 2013/0175793 | A1 | 7/2013 | Mercier | |
| 2013/0182300 | A1 | 7/2013 | Muller et al. | |
| 2014/0290367 | A1* | 10/2014 | Domke | G01N 29/36 73/596 |
| 2017/0165997 | A1 | 6/2017 | Holmes | |
| 2018/0178577 | A1 | 6/2018 | Lister | |
| 2019/0152244 | A1 | 5/2019 | Yamada et al. | |

FOREIGN PATENT DOCUMENTS

| DE | 102013015860 A1 * | 3/2015 | B41M 3/14 |
| DE | 10 2017 010 060 A1 | 6/2018 | |
| EP | 0 420 261 A2 | 4/1991 | |
| EP | 2 445 726 B1 | 10/2014 | |
| EP | 2 886 356 A2 | 6/2015 | |
| EP | 3 401 117 A1 | 11/2018 | |
| GB | 2 480 227 A | 11/2011 | |
| GB | 2 486 994 B | 3/2017 | |
| GB | 2 594 300 A | 10/2021 | |
| JP | 2016-114776 A | 6/2016 | |
| WO | 2004/050376 A1 | 6/2004 | |
| WO | 2007/085808 A1 | 8/2007 | |
| WO | 2008/049533 A2 | 5/2008 | |
| WO | 2008/098753 A1 | 8/2008 | |
| WO | WO-2010149476 A1 * | 12/2010 | B42D 25/00 |
| WO | 2011/000878 A1 | 1/2011 | |
| WO | 2011/017741 A1 | 2/2011 | |
| WO | 2013/010673 A1 | 1/2013 | |
| WO | 2016/016638 A1 | 2/2016 | |
| WO | 2017/009616 A1 | 1/2017 | |
| WO | 2017/009618 A1 | 1/2017 | |
| WO | 2017/009619 A1 | 1/2017 | |
| WO | 2017/009620 A1 | 1/2017 | |
| WO | 2017/055823 A1 | 4/2017 | |
| WO | 2018/011546 A1 | 1/2018 | |
| WO | 2018/153840 A1 | 8/2018 | |
| WO | 2018/206936 A1 | 11/2018 | |
| WO | 2019/063778 A1 | 4/2019 | |
| WO | 2019/063779 A1 | 4/2019 | |
| WO | 2019/153043 A1 | 8/2019 | |
| WO | 2020/030893 A1 | 2/2020 | |
| WO | 2020/070299 A1 | 4/2020 | |
| WO | 2020/070304 A1 | 4/2020 | |
| WO | 2020/156655 A1 | 8/2020 | |

OTHER PUBLICATIONS

DE-102013015860-A1 English Translation (Year: 2015).*
Mar. 10, 2022 combined Search and Examination Report issued in British Patent Application No. 2112959.8.
Oct. 24, 2022 Examination Report issued in British Patent Application No. 2112959.8.
Mar. 23, 2022 International Search Report issued in International Patent Application No. PCT/GB2021/052364.
Mar. 23, 2022 Written Opinion of the International Searching Authority issued in International Patent Application No. PCT/GB2021/052364.
Mar. 10, 2022 combined Search and Examination Report issued in British Patent Application No. 2112982.0.
Oct. 27, 2022 Examination Report issued in British Patent Application No. 2112982.0.
Mar. 22, 2022 International Search Report issued in International Patent Application No. PCT/GB2021/052362.
Mar. 22, 2022 Written Opinion of the International Searching Authority issued in International Patent Application No. PCT/GB2021/052362.
Mar. 11, 2022 combined Search and Examination Report issued in British Patent Application No. 2112956.4.
Jan. 4, 2022 International Search Report issued in International Patent Application No. PCT/GB2021/052361.
Jan. 4, 2022 Written Opinion of the International Searching Authority issued in International Patent Application No. PCT/GB2021/052361.
U.S. Appl. No. 18/026,060, filed Mar. 13, 2023 in the name of Godfrey, J. et al.
U.S. Appl. No. 18/026,067, filed Mar. 13, 2023 in the name of Godfrey, J. et al.
Aug. 1, 2023 Combind Search and Examination Report issued in British Patent Applciation No. 2305182.4.
Oct. 1, 2024 Notice of Allowance issued in U.S. Appl. No. 18/026,067.

* cited by examiner

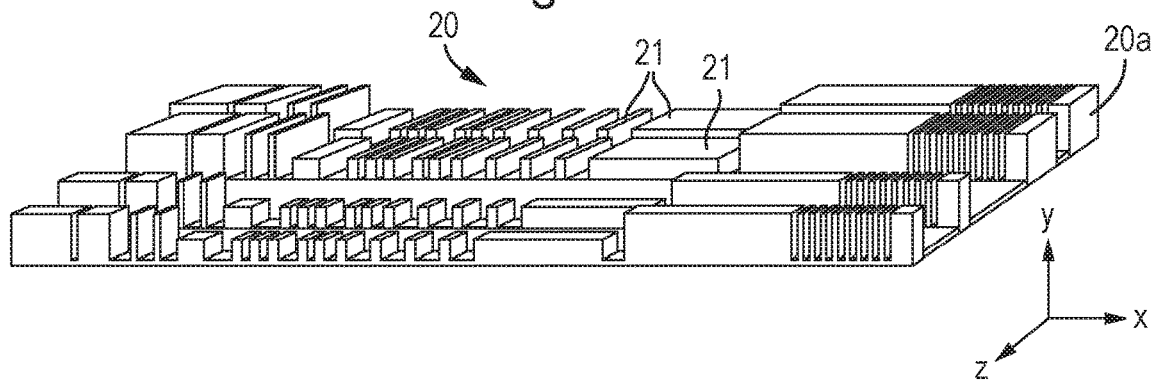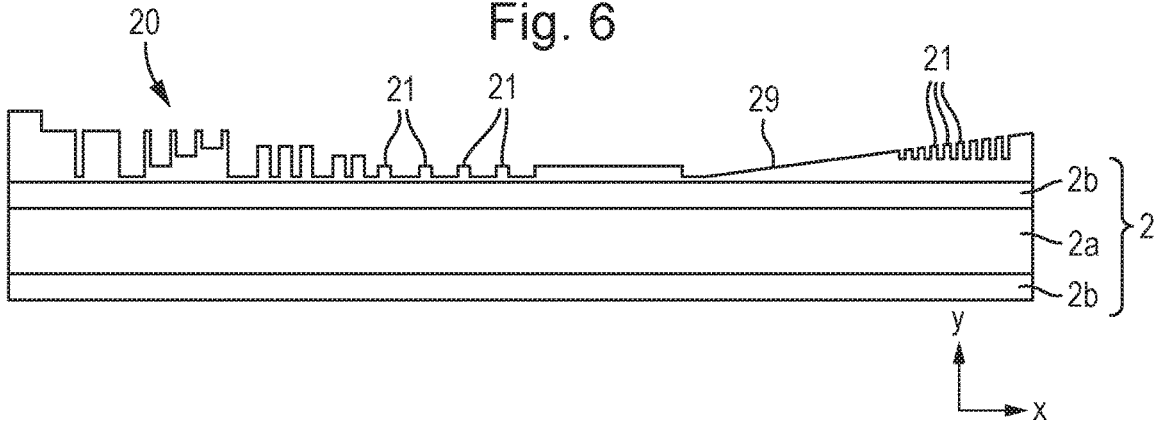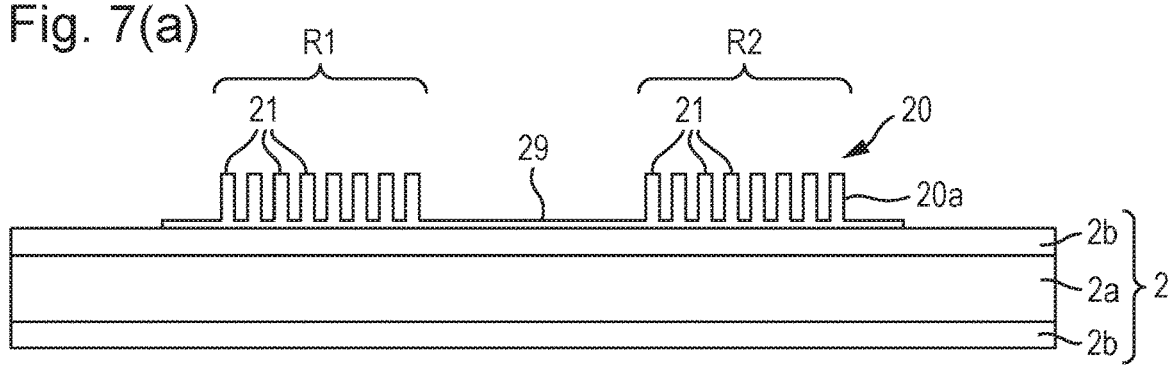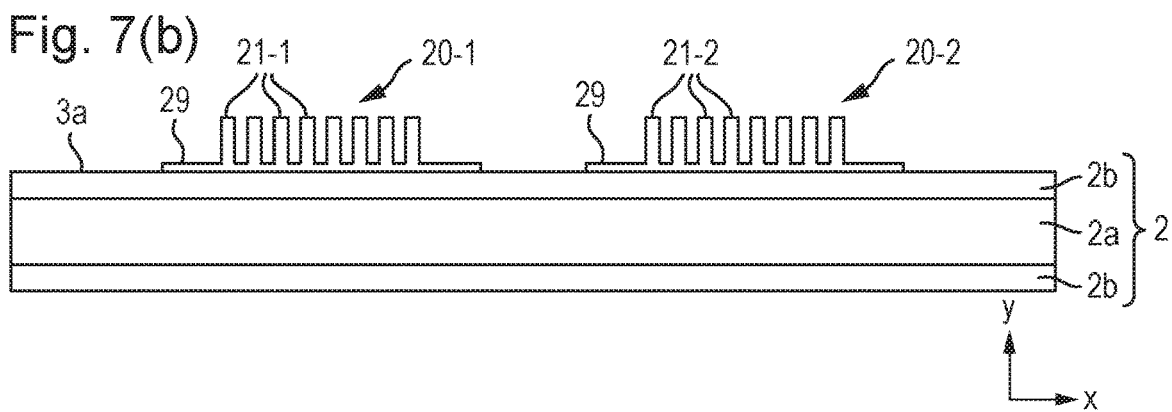

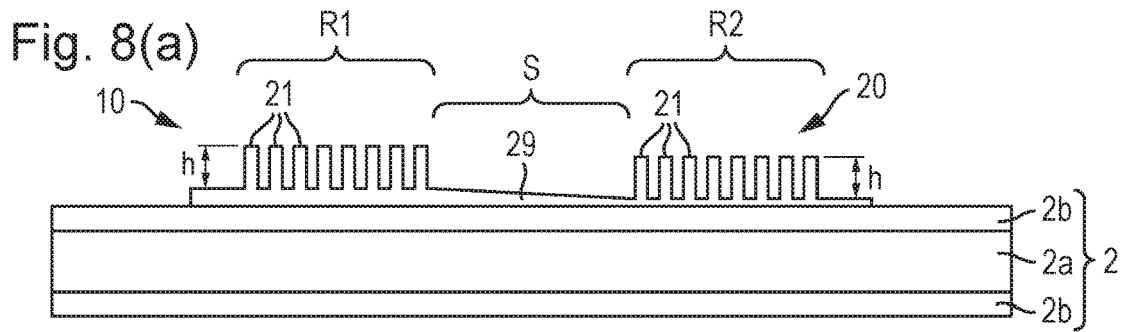
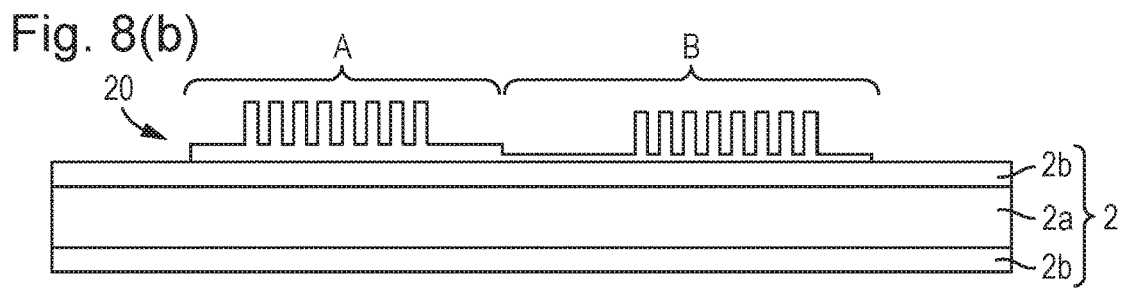
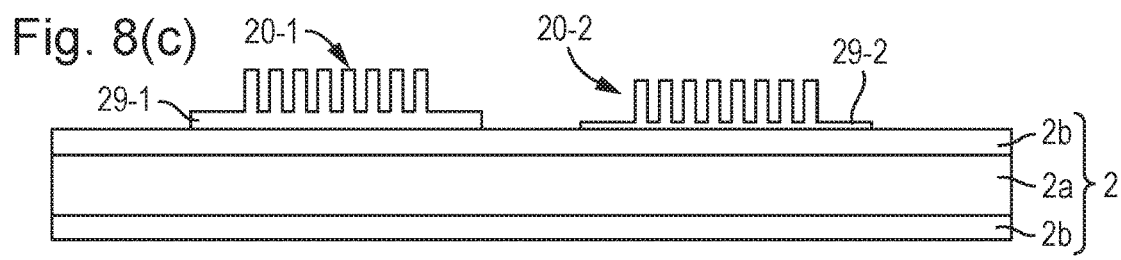
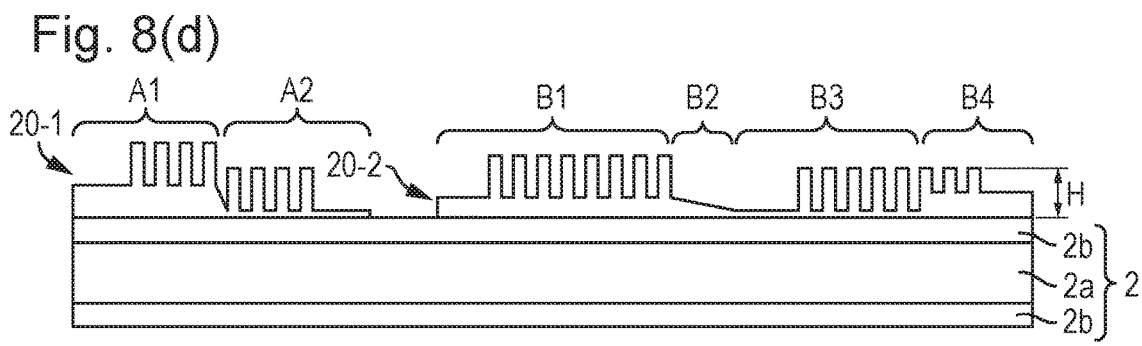
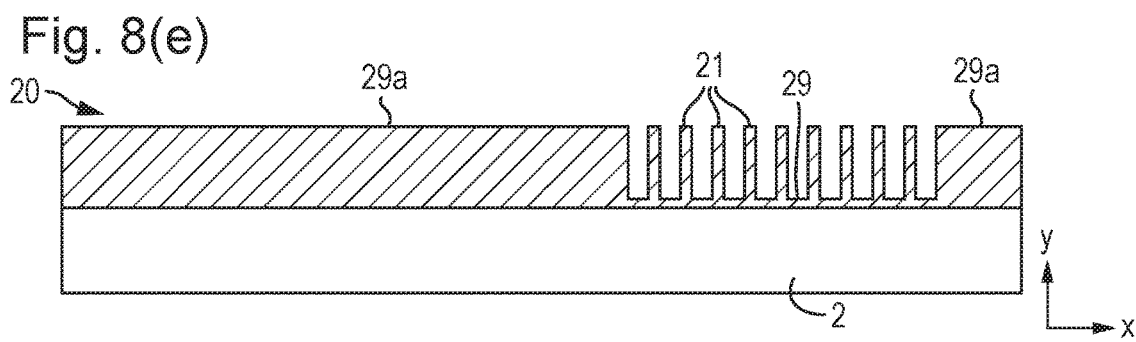

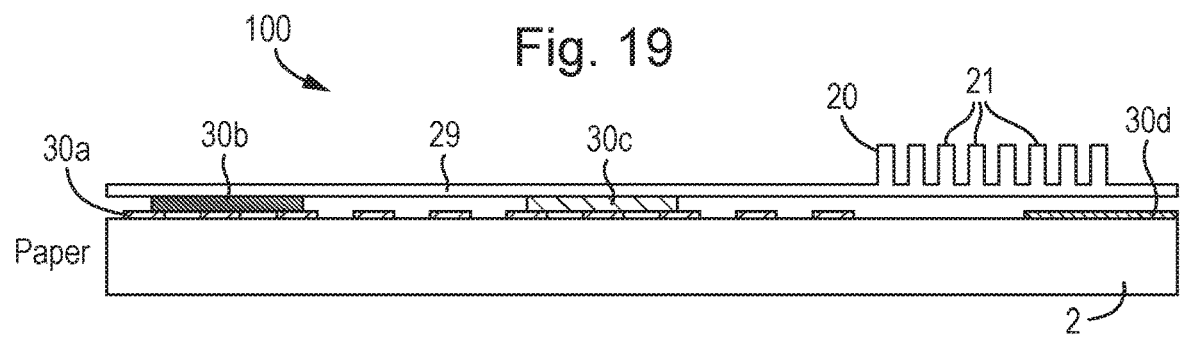
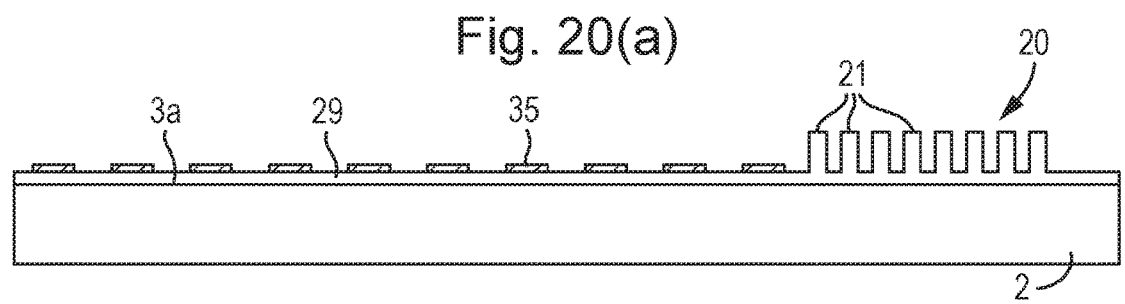
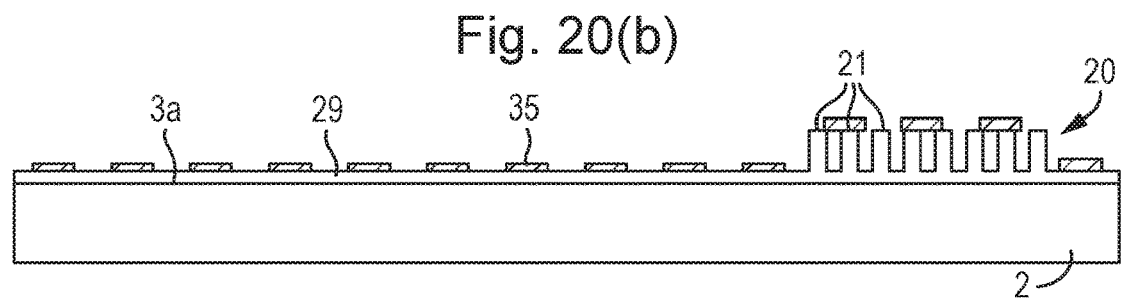
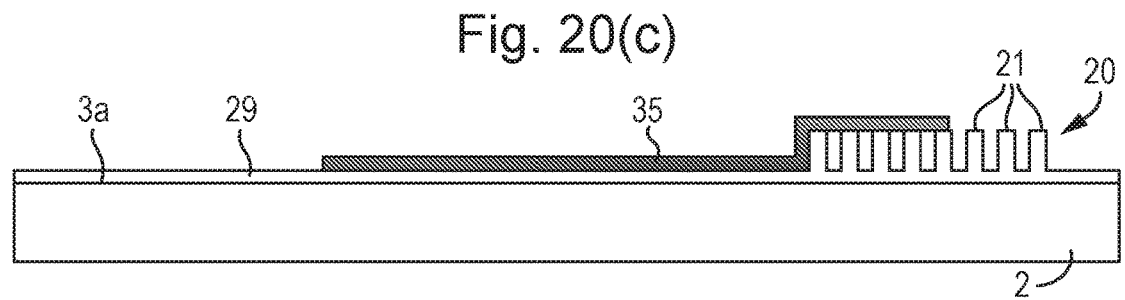
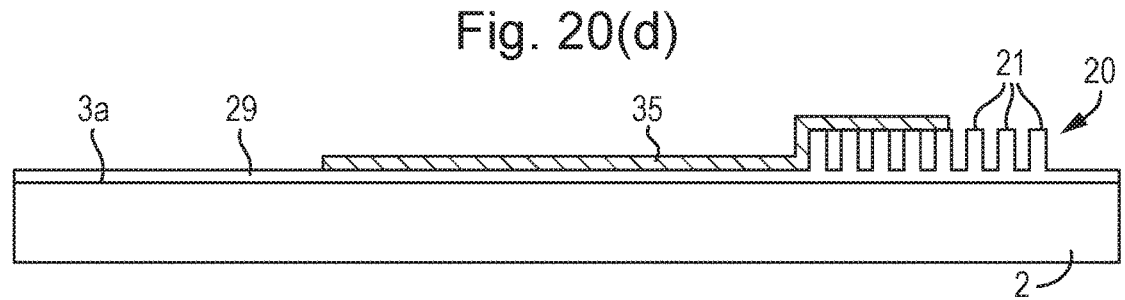

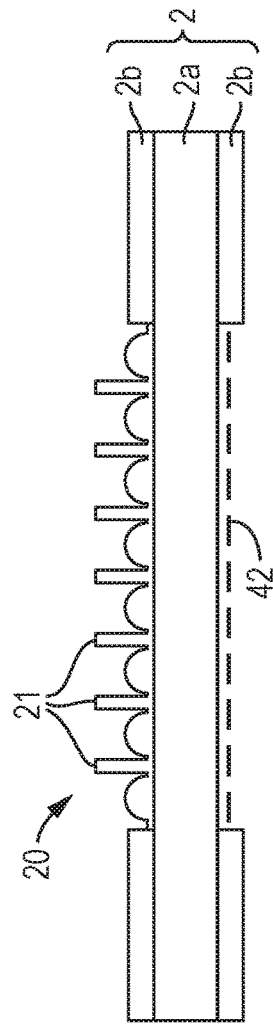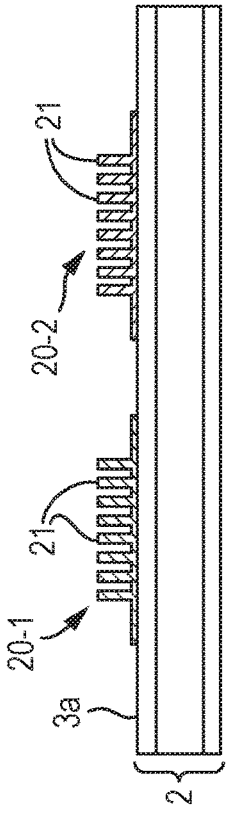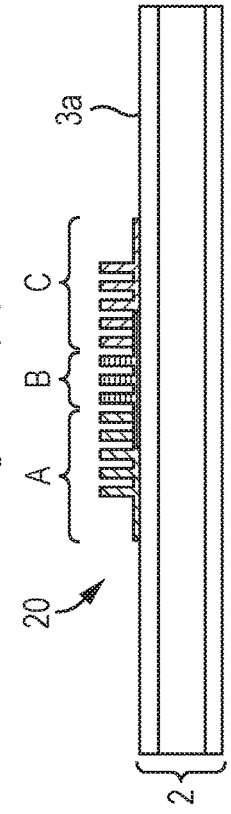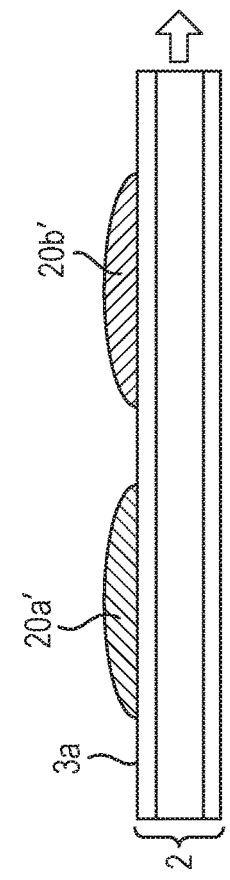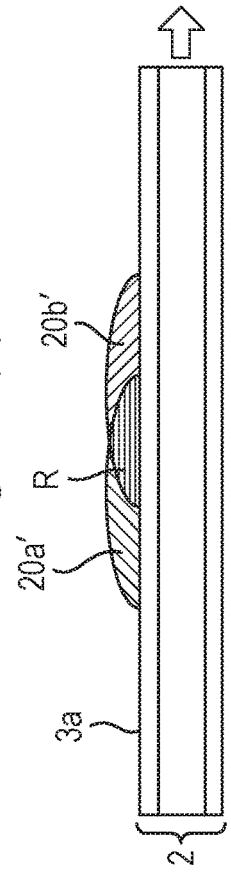

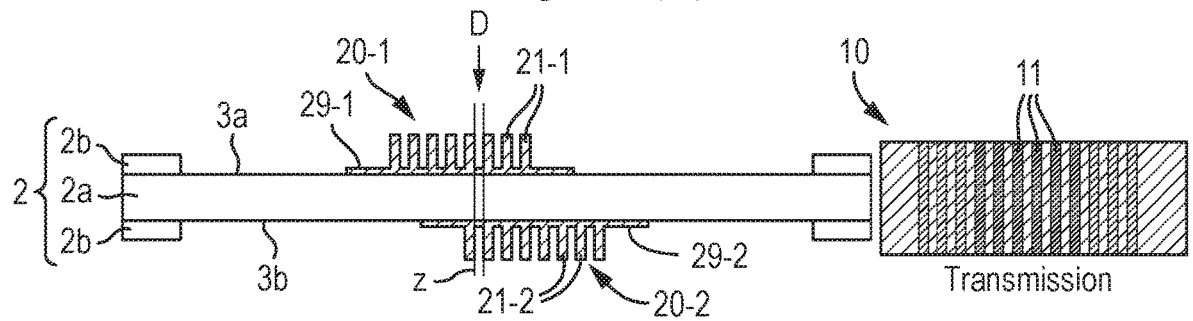
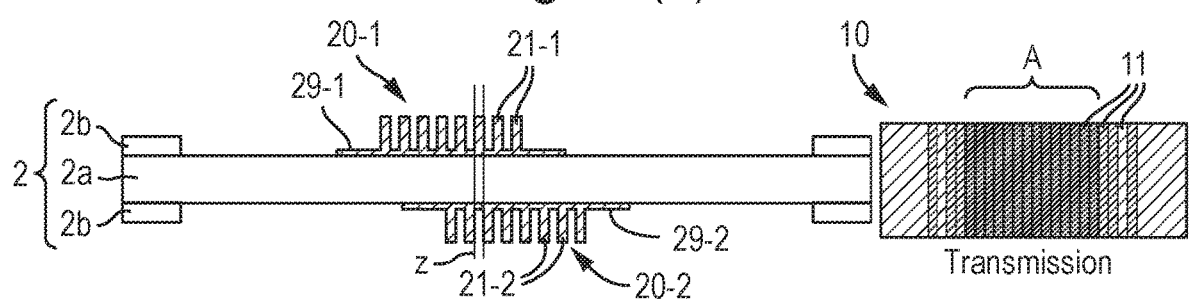
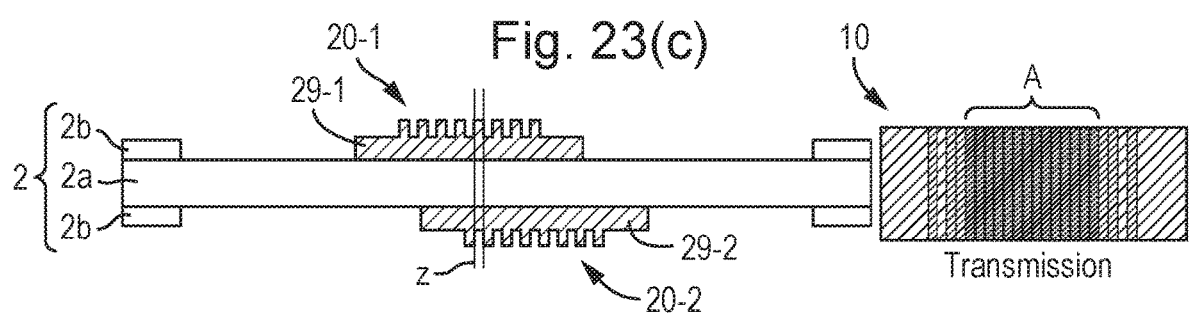
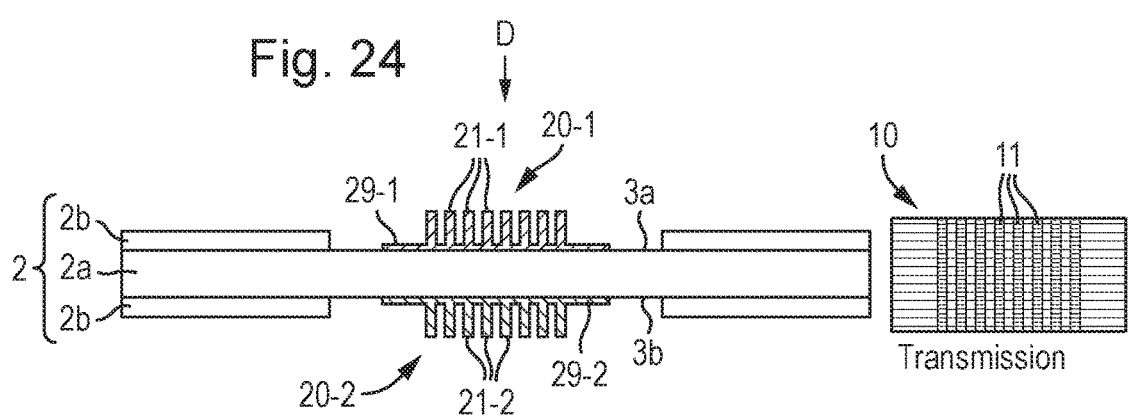

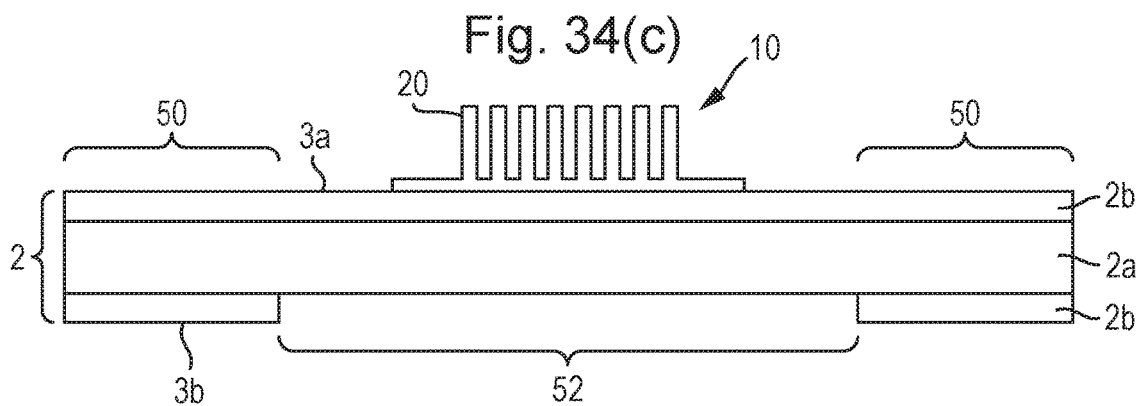
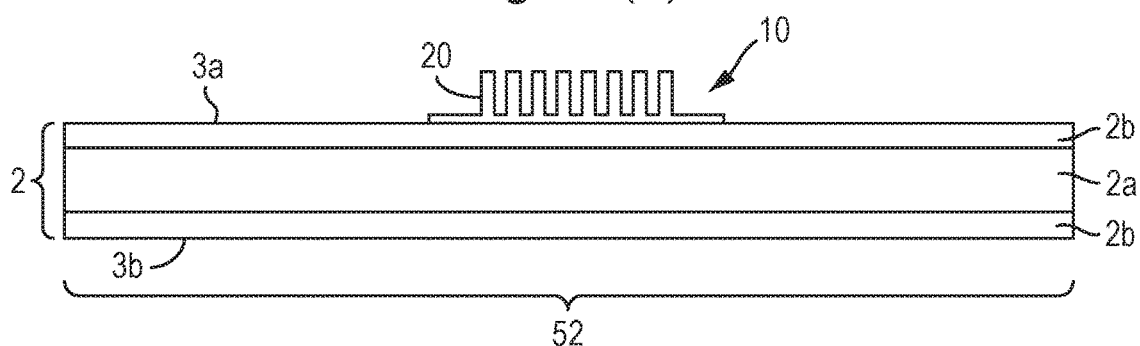
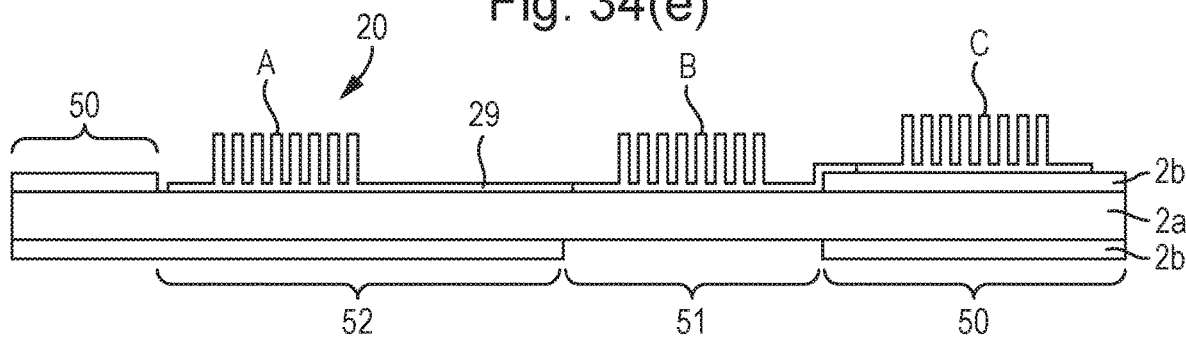

SECURITY DEVICES AND METHOD OF MANUFACTURE THEREOF

CROSS-REFERENCE TO RELATED APPLICATIONS

The entire content of each of the six international patent applications filed on 10 Sep. 2021 in the name of De La Rue International Limited and claiming priority from the following British patent applications (each filed on 11 Sep. 2020) is hereby incorporated by reference: GB2014325.1, GB2014326.9, GB2014327.7, GB2014328.5, GB2014329.3, GB2014330.1 and GB2014331.9.

FIELD OF THE INVENTION

This invention relates to security devices such as may be used as a mark of authenticity associated with an object of value, such as a security document including banknotes, passports, certificates, licences and the like. Methods for manufacturing security devices are also disclosed.

BACKGROUND TO THE INVENTION

Objects of value, and particularly documents of value such as banknotes, cheques, passports, identification documents, certificates and licences, are frequently the target of counterfeiters and persons wishing to make fraudulent copies thereof and/or changes to any data contained therein. Typically such objects are provided with a number of visible security devices for checking the authenticity of the object. Examples include features based on one or more patterns such as microtext, fine line patterns, latent images, venetian blind devices, lenticular devices, moiré interference devices and moiré magnification devices, each of which generates a secure visual effect. Other known security devices include holograms, watermarks, embossings, perforations and the use of colour-shifting or luminescent/fluorescent inks. Common to all such devices is that the visual effect exhibited by the device is extremely difficult, or impossible, to copy using available reproduction techniques such as photocopying. Security devices exhibiting non-visible effects such as magnetic materials may also be employed.

One popular security feature found on many known security documents is a printed, tactile macro image such as a portrait, formed by intaglio printing. Intaglio printing lends itself well to the formation of tactile elements on traditional substrates such as paper. For instance, many banknotes in circulation carry an image, such as a portrait or an architectural drawing, applied by intaglio printing. Typically all or part of the image is formed of an array of image elements, such as fine lines or dots, which can be individually discerned under close inspection and/or magnification. The intaglio printing technique not only ensures high resolution and accurate reproduction of the image (which prevents the production of passable counterfeit by readily available commercial printing techniques), but can also be used to impart tactility to the image. This significantly increases the security level, since would-be counterfeiters may have access to highly accurate printing systems which can reproduce the visual appearance of an intaglio print, but not its three-dimensional quality and hence its haptics (feel). However, the tactility provided by intaglio printing is limited by the amount of ink that can be transferred to the substrate and the amount of thermal/pressure deformation that substrate can endure/retain. In particular, a polymer banknote has less thermal stability and cannot be embossed as much as paper, resulting in a lower intaglio profile. There is therefore a desire to provide security features that overcome these drawbacks.

SUMMARY OF THE INVENTION

In accordance with the present invention, a security device is provided, comprising one or more surface relief structure(s), each formed of one or more cured material(s), the surface relief structure(s) being disposed on a substantially flat substrate and defining a plurality of raised elements spaced from one another, the raised elements corresponding to elements of an image, whereby the plurality of raised elements varies across the surface relief structure(s) so as to exhibit a multi-tonal version of the image.

The inventors have realised that such devices can exhibit images (e.g. macro images) having a similar appearance and tactility to conventional intaglio prints, but through the use of raised elements of cured material on a substantially flat substrate. In other words, the raised elements of the surface relief structure(s) in the present invention have not been formed during an embossing process such as intaglio printing, where the substrate would exhibit local raised areas due to the embossing. The elements are arranged to form a multi-tonal image such as a portrait much like those commonly produced by intaglio on banknotes. This approach achieves a more distinct profile than can be achieved on polymer substrates using intaglio (i.e. embossing of the substrate).

The present approach of using cured surface relief structure(s) also provides a number of additional benefits over conventional intaglio printing. For example, the deformation of the substrate via intaglio printing can make the registration of subsequent print processes difficult to manage (an issue known as "flower-potting"). With the present technique, the raised elements of cured material are provided on a substantially flat substrate, which increases the ease with which subsequent print processes can be accurately and repeatedly performed, resulting in improved registration between different components of a security device or document.

As the present invention utilises cured materials, set-off (the unwanted transfer of ink from one printed sheet to another)—which is common in production off intaglio inks on paper and polymer—can be avoided. Furthermore, the drying times of intaglio inks are long, and the use of cured materials in the present approach overcomes this disadvantage of conventional intaglio. Therefore, the present invention is able to provide the anti-counterfeiting and security benefits of conventional intaglio workings, while overcoming a number of the known issues with the intaglio process.

The plurality of raised elements varies across the surface relief structure(s) so as to exhibit a multi-tonal version of the image. In other words, the plurality of raised elements varies in at least one parameter across the surface relief structure(s). In a similar manner to intaglio printing where the variation in the width of the image elements and the ink thickness gives the impression of different tones (e.g. areas of light and shade) across the image, the variation in the plurality of raised elements exhibits the desired variation in tone. For example, raised elements of greater size (e.g. in width and/or height) will be perceived to have a different tone to raised elements of smaller size (e.g. due to the difference in the thickness of cured material that light is required to pass through). Further, areas of the image in which the image elements are closely spaced (i.e. where the corresponding raised elements are closely spaced) will appear darker than areas of the image in which the image elements have a greater separation between them. The shape and/or orientation of the raised elements may affect the intensity and direction of light reflected from the raised elements, again providing the impression of different tones within the exhibited image. Preferably, at least one of the size, shape, orientation, spacing and/or colour density of the raised elements varies across the surface relief structure(s) so as to exhibit the multi-tonal version of the image. Typically, the size, spacing and/or colour density of the elements varies across the surface relief structure(s) so as to exhibit the multi-tonal version of the image.

The plurality of raised elements are preferably arranged as an array of raised elements, whereby the array of raised elements varies across the surface relief structure(s) to as to exhibit a multi-tonal version of the image.

The raised elements are typically large enough such that they can be individually discerned under close inspection (e.g. with a magnification aid). Typical lateral dimensions of the raised elements (e.g. corresponding to a linewidth of a line element) are in the range of 20 µm-8 mm, more preferably 30 µm-3 mm, even more preferably 50 µm-500 µm. Typical spacings between raised elements are greater than 30 µm. Preferred heights of the raised elements are in the range of 10 µm to 200 µm, preferably 10 µm to 150 µm, more preferably 20 µm to 100 µm and even more preferably 20 µm to 50 µm. Due to the nature of the cast-cure process used to form the surface relief structure(s), these preferred dimensions may be implemented on both paper and polymer substrates, which provides a further advantage over conventional intaglio processes where the dimensions are typically dependent on the substrate.

In preferred embodiments, the image is a screened image. For instance, the raised elements could define a line-work (e.g. similar to a conventional line intaglio image) or a dot screen of image elements, such as a half tone screen. The elements may be (e.g. rectilinear or curvilinear) line elements, dot elements or define indicia such as preferably letters, numbers, currency symbols (e.g. £, $ etc.). Thus, the raised elements may define (e.g. rectilinear or curvilinear) line elements, dot elements or define indicia such as preferably letters, numbers, currency symbols (e.g. £, $ etc.). The image may comprise a Guilloche pattern. Desirably the image is a portrait or architectural drawing. Preferably, the image is of a 3D object or scene. In embodiments in which the image is a screened image, the elements of the image are preferably arranged on a regular grid, although in general the elements may or may not be arranged on a regular grid.

The surface relief structure(s) can be formed by cast-cure techniques or by "microintaglio" techniques, which will be described below. It should be noted that microintaglio operates according to fundamentally different principles from standard intaglio and does not merely invoke a smaller dimension.

Optionally, for at least one (preferably all) of the surface relief structure(s) the height of the raised elements varies across the surface relief structure, preferably in accordance with the image, to provide additional tactility thereto. The ability to accurately vary the height of the raised elements across the surface relief structure (e.g. in accordance with the image) provides a particular advantage over conventional intaglio processes, where the heights of any printed structures are limited by the ink transfer process and are therefore difficult or impossible to vary or control accurately. For example, certain areas of the image (e.g. an eye or mouth in a portrait) may correspond to raised elements having a different height than in other regions of the image, providing a difference in perceived tactility. A difference in height of the raised elements may also be used to enhance a three dimensional image. The height of the raised elements may vary within an individual raised element, and/or across different raised elements (i.e. one raised element has a different height from another).

Raised elements of different height will exhibit different optical densities due to the different thickness of cured material that light needs to pass through. Therefore, varying the size of the raised elements through varying their heights can contribute to conveying different tones across the image.

In embodiments, the height of the raised elements may vary across the at least one surface relief structure in two dimensions (e.g. a user would observe a difference in tactility running their finger across the width of the structure as well as along the length), thereby providing asymmetrical tactility to the surface relief structure. Varying the height of the raised elements in order to provide additional tactility advantageously increases the complexity of the device and the difficulty of counterfeit, particularly if the height of the raised elements is varied in accordance with the image.

Varying the height of the raised elements can also or alternatively be used to vary the colour density of the elements, if the cured material is semi-transparent (elements of greater height will have a higher optical density). This property of the cured material forming the surface relief structure(s) can provide further complexity to the multi-tonal image exhibited by the device, with the optical density varying across the image in accordance with the heights of the raised elements. For example, a surface relief structure formed of a semi-transparent tinted cured material (e.g. carrying a blue tint) will exhibit a multi-tonal, mono-colour image at least partly due to the difference in the height, and therefore the colour density, of the raised elements.

In some cases, for at least one (preferably all) of the surface relief structure(s) the raised elements are joined by a base layer of the or another cured material(s), the base layer having a lower height ("thickness") and a lower optical density than the raised elements such that there is a contrast between the raised elements and the base layer. In other words, an individual surface relief structure will comprise a continuous body of cured material with a varying height profile between the base layer and the raised elements. This will typically be the case if the structure is formed by cast-cure, and would not be the case in a device having tactile protrusions formed of localised printed material (e.g. conventional intaglio). This continuous nature of the surface relief structure needs to be taken into account in the design of the security device in order that it exhibits the desired optical effect. The base layer typically has a thickness of between 0.5 µm and 1 µm. It should be noted that there may be a different cured material present between the raised elements, formed by the tie coat of some preferred microintaglio processes, as will be described in more detail herein. Preferably, a ratio of the height of at least one raised element to the height of the base layer joining the raised element to an adjacent raised element is at least 10, preferably at least 20, and furthermore is preferably no greater than 400, preferably no greater than 200. In some embodiments, a ratio of the height of each raised element to the height of the base layer is at least 10, preferably at least 20, and furthermore is preferably no greater than 400, preferably no greater than 200.

In some embodiments, the base layer may extend over a peripheral region surrounding the plurality of raised elements. Such a peripheral region of base layer may in some cases be narrow, e.g. extending between 0.01 mm and 5 mm away from the plurality of raised elements. This might be the case if the device is disposed within a specific region of a substrate, for example a window region of a security document substrate defined by the localised absence of opacifying layers. In other examples, the surface relief structure including the peripheral region of base layer may extend over a wider area, for example so as to act as a protective layer across a security document substrate or region thereof. In such examples the surface relief structure may extend over at least 5%, preferably at least 10% and even more preferably at least 50% of such a security document substrate. A preferred range is 10%-60%. The surface relief structure including the peripheral region of base layer may act as a protective layer over substantially the whole document substrate (similar to a varnish layer), in which case the surface relief structure may extend over at least 75% of the document substrate (including 100%). Due to the contrast between the raised elements and the base layer, such a peripheral region can provide additional complexity to the image, for example if the peripheral region defines a part of the image.

Optionally, the height of the base layer (e.g. the "thickness" of the base layer) may vary across the surface relief structure. The height of the base layer could vary in a discrete manner (e.g. in the form of a "step change" where the height changes over a substantially zero lateral dimension), and/or in a continuous manner for example so as to define a sloped (linear or curved) portion of the base layer. The height of the base layer may vary between adjacent raised elements.

The additional complexity that may be added to the surface relief structure(s) by varying the height of the base layer is typically not possible using conventional intaglio printing, thereby further increasing the security level of the presently disclosed devices. As another advantage, the height of the base layer may be used to compensate for height differences across a security document within which it is incorporated, such that the thickness of the security document is substantially constant across its full area.

In embodiments, the tops of the raised elements may have a substantially constant height across at least a part (preferably all) of the surface relief structure. In embodiments in which the height of the base layer varies across a surface relief structure, the heights of the raised elements with respect to the base layer may vary such that the tops of the raised elements have a substantially constant height across at least a part (preferably all) of the surface relief structure. Such embodiments may advantageously compensate for differences in thickness across a security document due to the substantially uniform height of the tops of the raised elements (e.g. with respect to the substrate). This may advantageously improve ream shape and handling properties in downstream processes for example.

In the above examples, the raised elements are joined by a base layer of cured material such that an individual surface relief structure comprises a continuous body of cured material. In other cases, for at least one (preferably all) of the surface relief structure(s) the cured material is absent between the raised elements. This will typically be the case if the structure is formed by microintaglio without the use of a tie coat. As outlined above, microintaglio operates according to fundamentally different principles from standard intaglio and does not merely invoke a smaller dimension.

In some embodiments, the device may further comprise a decorative layer formed on a first and/or second surface of the substrate, wherein at least one of the said surface relief structure(s) at least partially overlaps with the decorative layer such that under at least some viewing conditions the decorative layer and the surface relief structure may be viewed in combination. Thus, at least at one viewing angle, an observer of the device will perceive the combined effect of both the decorative layer (or decorative layers) and the surface relief structure(s), with either the surface relief structure(s) being positioned between the decorative layer and the observer, or the decorative layer being positioned between the surface relief structure(s) and the observer. This enables further complex effects to be exhibited by the device, thereby further enhancing its security level.

The decorative layer may comprise one or more of: a print layer; an optically variable layer such as a colour shifting layer or a diffractive structure; a reflective (e.g. metallic) layer. In cases in which the decorative layer comprises a print layer, this is preferably in the form of a lithographic print working. For example, the surface relief structure(s) may be disposed on a lithographic print working as part of a conventional banknote manufacturing process. However, such a print layer may be provided by other printing techniques such as gravure, offset, flexographic, inkjet or other convenient method. These print techniques may be described as providing "flat" print workings, i.e. they do not comprise a plurality of raised elements. In other examples, the print layer may be provided by a microintaglio process (described in further detail herein).

The decorative layer may comprise an optically variable layer such as a colour shifting layer or a diffractive foil. These are examples of fragile features that would conventionally have been difficult or impossible to combine with standard intaglio workings as the temperatures and pressures involved with the conventional intaglio process would typically damage such a feature. However, the present techniques employing cured materials rather than intaglio embossing advantageously allows the combination of such optically variable features with the surface relief structure(s). By optically variable effect we mean an optical effect that varies with viewing angle, e.g. that varies upon tilting the device. Examples of colour shifting layers include layers incorporating liquid crystals (e.g. a liquid crystal film), interference pigments (including magnetically orientated interference pigments), pearlescent pigments, structured interference materials (including dielectric and Fabry-Perot structures), photonic crystals or thin film interference structures including Bragg stacks. A diffractive structure may be in the form of a diffractive optically variable image device ("DOVID"), such as a holographic foil, either produced from creating a relief structure by either hot embossing a thermoplastic resin or casting a UV curable resin (e.g. "cast-cure hologram"), and then in both cases combining the relief structure with accompanying metallic or high refractive index layer. Other examples include nano-diffractive structures and plasmonic and other sub-wavelength structures.

The decorative layer could comprise a (e.g. printed) plasmonic ink or a metallic ink.

In some embodiments, the surface relief structure encapsulates the decorative layer. In other words, the surface relief structure may substantially completely enclose the decorative layer, sealing it from the atmosphere or other external influences (e.g. chemicals). This may advantageously provide further protection to lower durability decorative layers such as colour shifting layer and foils, thereby prolonging the life of the device.

In preferred embodiments, the decorative layer is defined in accordance with the image, preferably wherein the decorative layer and the surface relief structure define the same image and are in overlapping alignment with each other. In other words, the decorative layer and the surface relief structure may be described as being registered to each other. Such embodiments are particularly relevant in the cases where the decorative layer is in the form of a print layer, where preferably both the print layer and the raised elements of the surface relief structure define the same image elements of a screened image, in register. For example, in some embodiments where the decorative later is defined in accordance with the image, the at least one curable material is colourless and the decorative layer is in the form of a print layer that exhibits one or more visible colours, the print layer most preferably being a (e.g. full-colour) RGB or CMYK print layer. In other embodiments, the cured material of the surface relief structure may carry a tint of a first colour and the decorative layer is in the form of a print layer that exhibits at least the first colour and/or a second colour, preferably configured such that when viewed in combination a multi-coloured version of the multi-tonal image is visible. For example the cured material of the surface relief structure may carry a red tint, with the print layer defining the blue and green colour components of a full colour RGB image.

Particularly in embodiments in which the security device comprises a decorative layer, the invention also provides a plurality of substantially identical security devices, each as described above, in each of which the respective surface relief structures and decorative layers have the same position relative to one another. This arises from the two constituents being accurately registered to one another during manufacture. By "same position" it is meant that the relative position of the respective surface relief structures and print layers varies by an amount less than can be detected by the naked eye between the security devices, if at all. For example, the translational variation in the machine or cross-direction may be +/−75 µm or less. The skew variation is preferably 1 degree or less, more preferably 0.1 degree or less, still preferably 0.05 degrees or less, most preferably 0.02 degrees or less. The plurality of security devices will typically be produced sequentially on the same manufacturing line and according to the same design—for instance the plurality may include a whole batch of security devices, or the whole of a print run. The plurality may include at least 10 security devices, more preferably at least 100 security devices. Each security device of the plurality may ultimately be located on a different security document. Most preferably, the formation of the surface relief structure and the formation (e.g. printing) of the decorative (e.g. print) layer are simultaneous, taking place at the same position along the machine direction, at the same time. This achieves the highest level of registration between the two constituent parts of the security device, since there can be no slippage or distortion of the substrate occurring after one step is performed and before the other (since there is no interval between them). Suitable apparatus for performing simultaneous cast-curing and printing on opposite sides of a substrate is disclosed in WO-A-2018/153840 and WO-A-2017/009616. The level of registration that can be provided by simultaneous casting and printing using the apparatus disclosed therein cannot be achieved on a web press or in two separate processes.

Optionally, the security device may further comprise an over layer formed on at least a portion of at least one of said surface relief structure(s). In a corresponding manner to the decorative layers discussed above, such an over layer could be an optically variable over layer such as a colour shifting layer or a foil, a reflective (e.g. metallic) layer and/or a print over layer such as a lithographic or other convenient print working. In embodiments in which the surface relief structure comprises a base layer extending over a peripheral region surrounding the plurality of raised elements, the base layer of the peripheral region may be advantageously utilised as a primer for such an over layer, improving the printing or adhesion quality of the over layer in comparison to application to the underlying paper fibres or opacifying layer pigments for example. In embodiments in which an over layer is provided, this may be disposed on the peripheral region of base layer only, the raised elements only, or a combination of both.

In embodiments where the security device comprises a decorative layer and/or an over layer in the form of a print layer, the print layer could be applied using standard, visibly coloured ink(s). To further increase the security level, in other embodiments, the print layer may comprise one or more substances which are responsive to non-visible wavelength(s), preferably UV or IR, the print layer optionally being invisible under white light illumination. For instance, the print layer could comprise a pair of inks which appear matched to one another under one illumination condition (e.g. white light) and different from one another under another illumination condition (e.g. UV light). Examples of suitable materials from which the print layer may be formed are disclosed in WO-A-2004/050376 and WO-A-2018/206936. In other examples, the print layer may comprise substances which emit red, green and blue light under illumination by a corresponding excitation waveband whereby a full colour version of the common image is exhibited. Examples of suitable substances are disclosed in WO-A-2020/030893.

The at least one cured material for at least one of the surface relief structure(s) could be transparent and colourless (under standard white lighting), which may be desirable to provide a tactile feature which is only covertly visible as a result of reflections off its surface. A transparent and colourless surface relief structure is capable of exhibiting a multi-tonal image due to differences in optical density and/or differences in reflectivity off the surface of raised elements due to differences in shape or orientation for example. Alternatively, the cured material may have a colour visible under at least some viewing conditions (preferably white light illumination, but alternatively under special illumination such as UV).

Preferably, for at least one (preferably all) of the surface relief structure(s) the cured material is at least semi-transparent. As highlighted above, in embodiments where a base layer extends between the raised elements, the continuous nature of the surface relief structure needs to be taken into account in the design of the security device in order that it exhibits the desired optical effect. Here, the use of a cured material that is at least semi-transparent is desirable so that the base layer has low optical density. The at least one cured material may be transparent and colourless. In embodiments, the at least one cured material preferably comprises a visible colourant. Typically, the at least one cured material carries a tint of at least one colour, i.e. the cured material is at least semi-transparent whilst having a colour visible under at least some viewing conditions. Such embodiments are particularly advantageous for exhibiting multi-tonal images, as the variation of the plurality of raised elements across the surface relief structure(s) means that the perceived colour intensity varies across the surface relief structure(s).

It is envisaged that devices according to the invention may include cast cured surface relief structures in which the cured material is substantially opaque, with variations in tone being perceived across the image due to differences in the reflectivity off the surfaces of raised elements. Differences in tone may be more readily perceived if the opaque material preferably carries a light colour (such as yellow).

The use of an opaque cured material may have particular application when the surface relief structure(s) are formed by a microintaglio process where no tie coat is used.

Each of the surface relief structure(s) is formed of one or more cured materials. A surface relief structure may typically be formed of a cured material having uniform optical properties, e.g. a single colour tint. In some embodiments, at least one (preferably all) of the surface relief structure(s) is formed of two or more cured materials having different colours that are visible to the naked eye under at least some viewing conditions. Such embodiments advantageously allow for further complex effects to be exhibited by the device. In some examples, the two cured materials may exhibit the same visible colour under some viewing conditions (preferably white light illumination), but different colours under special illumination such as UV.

In some embodiments, for at least one (preferably all) of the surface relief structure(s), the at least one cured material comprises a machine-readable substance. Examples of suitable machine readable substances (e.g. that react to an external stimulus) include any luminescent, fluorescent or phosphorescent material, or a material which exhibits Raman scattering. Magnetic materials may also be used. In this way, the surface relief structure(s) of the device may be detected by a detector configured to detect the machine-readable substance ("taggant"). Typically, the external stimulus required and/or the emission of the machine readable substance is outside the visible range of the electromagnetic spectrum (typically in the infra-red, IR, or ultraviolet, UV, ranges), such that detection of the machine readable substance does not occur under standard visible light conditions. This advantageously increases the security level of the device as a would-be counterfeiter not only needs to replicate the multi-tonal image exhibited by the plurality of raised elements but also the machine-readable emission. Moreover, the detection signal varies in accordance with the amount of taggant present. Preferably, the amount of the machine readable substance present in each region of the relief structure(s) varies according to the height of the region with respect to the substrate (e.g. the thickness of cured material in that region), whereby the detection signal likewise varies in accordance with the height of the relief structure(s). This can generate a machine-readable code. Such a variation of the detection signal corresponding to the height of the surface relief structure(s) provides further increases in security level. Furthermore, this may allow improved quality control during manufacture of the devices, since the detection signal from the machine readable substance can be analysed in order to assess the quality of the structure (as well as a determination as to whether the structure is present or absent). In embodiments in which the curable material comprises a machine readable substance, the amount of machine readable substance present (e.g. dependent on both the particle size of the taggant and its concentration) is preferably sufficiently low that the curable material is optically clear. It has been found that transmission haze values of less than 50%, preferably less than 30%, more preferably less than 10%; and/or optical density values of less than 1.0, preferably less than 0.5, more preferably less than 0.15 are preferred.

Each individual raised element of a surface relief structure may have a substantially constant (e.g. uniform) height across its domain, for example having a cylindrical, or cubic geometry. Such structures exhibit substantially a square or rectangular ("square-wave") profile in cross-section. In some embodiments, for at least one (preferably all) of the surface relief structure(s), at least some of the raised elements have at least one face that makes an angle of greater than 0 degrees but less than 90 degrees with the plane of the substrate, preferably between 30 degrees and 70 degrees. Such raised elements may be in the form of cones, prisms, pyramid or irregular (e.g. curved or wave-like) structures for example. The raised elements may have curved surfaces. Raised elements with angled faces will exhibit varying optical density on the scale of individual raised elements (e.g. through varying optical density and reflection off the angles faces), allowing complex multi-tonal effects to be exhibited. Such control of the geometry of the individual raised elements is typically not possible with standard intaglio printing techniques. Raised elements with angled faces may exhibit a variation in optical density in one dimension (e.g. linear microprisms), or two dimensions (e.g. cones and pyramidal structures, or other structures that vary in height along more than two axes).

In general, the raised elements may be in the form of at least one of: form of least one of: cubic structures; faceted structures such as prisms, cones, pyramidal structures; curved structures; irregular structures.

As has been discussed herein, a security device according to the invention comprises one or more surface relief structure(s). Typically, the plurality of raised elements varies across a particular (e.g. single) surface relief structure such that the surface relief structure exhibits a multi-tonal version of the image. For example, the security device may comprise exactly one such surface relief structure comprising a plurality of raised elements corresponding to elements of an image, whereby the plurality of raised elements varies across the surface relief structure so as to exhibit a multi-tonal version of the image.

The security device may comprise two or more surface relief structures. In such cases, each of the two or more surface relief structures preferably defines a plurality of raised elements spaced from one another, as described above. In other words, each of the surface relief structures exhibits a respective multi-tonal image (which may or may not be related to each other). In some embodiments, the security device comprises two surface relief structures formed on opposing sides of the substantially flat substrate, said surface relief structures preferably at least partially overlapping and the substrate being at least semi-transparent in the region of overlap, and wherein the plurality of raised elements varies across the combination of the surface relief structures so as to exhibit a multi-tonal version of the image at least at one angle of view. In this way, when a viewer of the security device observes the two surface relief structures simultaneously (i.e. the observer views the device at a viewing angle such that the two surface relief structures are overlapping), the overall impression exhibited to the observer is that of a multi-tonal image. In this way, each surface relief structure may be considered to define a subset of raised elements, that in combination define the plurality of raised elements exhibiting the multi-tonal image. In this way, the individual surface relief structures themselves need not exhibit a multi-tonal image, although in some cases each subset of raised elements may vary across the respective surface relief structure so as to exhibit a different or partial multi-tonal image as compared to the multi-tonal image defined by the combination of the surface relief structures. Preferably for such embodiments, the at least one cured material of the surface relief structures is at least semi-transparent.

It is noted that a security device according to the invention may comprise two (e.g. laterally spaced or laterally abutting) surface relief structures, each being disposed on the same side of the substantially flat substrate, whereby the two surface relief structures in combination define plurality of raised elements that exhibit a multi-tonal image.

In some embodiments, at least one of the surface relief structure(s) further comprises an effect-generating region that is laterally offset from the plurality of raised elements. Preferably, the effect-generating region comprises any of: one or more optical elements such as focussing elements (e.g. lenses), faceted elements (e.g. prisms), reflective elements (e.g. mirrors) or a caustic element; a diffractive structure; a tactile structure; a matte structure; a gloss structure. Optical elements such as focussing elements, faceted elements and reflective elements are typically provided in the form of an array. Such further features may be used to provide further complex optical and/or haptic effects in order to further increase the difficulty of counterfeiting the device. For example, an effect-generating region comprising an array of focussing elements (e.g. lenses or micromirrors) may be provided in combination with a decorative layer comprising a microimage array located substantially in the focal plane of the optical elements in order to provide a lenticular or moiré effect in addition to the multi-tonal image exhibited due to the plurality of raised elements. The effect-generating region and the plurality of raised elements are laterally offset (e.g. spaced, partially overlapping, abutting or interleaved).

In general, the substrate may comprise paper, polymer (e.g. biaxially oriented polypropylene, BOPP, or polycarbonate), cellulose or a combination thereof. Preferably the substrate is a polymeric substrate, optionally provided with one or more opacifying layers.

Further disclosed herein is a security document comprising a document substrate and a security device thereon, the security device being as described above, wherein the document substrate may or may not act as the substrate of the security device. The document substrate could be of any type, including fibrous substrates such as paper or non-fibrous substrates such as polymer (or a hybrid of both). Thus, the document substrate preferably comprises paper, polymer, cellulose or a hybrid thereof. It will be understood that the security document could therefore include a single substrate, which acts as both the document substrate (i.e. the self-supporting sheet forming the body of the document) and as the security device substrate (i.e. that carrying the surface relief structure(s)).

In preferred embodiments, the security device is located at least in part in a window or half-window region of the document substrate, which has a lower optical density than the surroundings thereof. The window region may be a half window region, in which case the optical effect of the security device may be observed in reflection, or transmission if the opacity of the non-transparent side of the half window is low enough for the transmission of light. The window may be a full widow, in which case the device is intended for viewing in transmission, and this arrangement is particularly preferred for embodiments which comprise surface relief structures on opposing sides of the substrate, where the two or more surface relief structures will both be disposed within the full window region.

In some embodiments, the security device may be located at least in part in a non-window region of the document substrate, which is typically non-transparent and where the device is intended for viewing in reflection.

In preferred examples, the document substrate comprises a core polymer substrate with at least one opacifying layer disposed on one or both surfaces of the core polymer substrate, optional gaps in one or more of the opacifying layers forming window or half-window regions of the document substrate. For example the security document could be a polymer banknote. The opacifying layers are preferably of non-fibrous materials such as a coating of binder containing light-scatting pigments, preferably white, off-white or grey in colour (such as $TiO_2$).

In some embodiments, the document substrate may further comprise an integral decorative mark. "Decorative marks" (unlike the decorative layer described above) are incorporated into the substrate during its production rather than during its later processing into security documents. For instance, the decorative mark may be applied during the same process as that by which the opacifying layers are applied, e.g. gravure printing. The decorative mark is integral to the document substrate. The integral decorative mark could be unrelated to the presently disclosed security device. However, preferably, the integral decorative mark is at least partially overlapping with at least one of the surface relief structure(s) such that under at least some viewing conditions the decorative layer and the at least one surface relief structure may be viewed in combination. For example, the decorative mark may be defined in accordance with the image, preferably wherein the integral decorative mark and the surface relief structure define the same image (e.g. the decorative mark defines the same image elements as the raised elements of the surface relief structure) and are in overlapping alignment with each other (e.g. in register). The decorative mark could be a watermark in a paper substrate.

In such embodiments, the at least one curable material may be colourless and the decorative mark exhibits one or more visible colours, the decorative mark most preferably being a RGB (red, green, blue) or CMYK (cyan, magenta, yellow, black) decorative mark. Thus, the use of a decorative mark in combination with the surface relief structure therefore exhibits a multi-tonal, multi-colour image. Alternatively, the at least one curable material may carry a tint of a first colour and the decorative mark may exhibit at least the first colour and/or a second colour, preferably configured such that when viewed in combination a multi-coloured version of the multi-tonal image is visible. For example, in an RGB arrangement, the surface relief structure may carry a tint of one of red, green or blue, with the decorative mark defining the other two colour components.

Although the decorative mark will most typically carry a colour that is visible in white light, it may have a colour visible under special illumination such as IR or UV. Although an integrated decorative mark will typically be in the form of a print working as described above, the decorative mark could comprise or be in the form of other elements or components such as an optically variable component (e.g. colour shifting layers or holographic foils) or reflective/metallic component as described above with reference to embodiments including decorative layers.

In cases where the security device is not formed directly on the document substrate, the security device substrate may be affixed to or incorporated into the document substrate, preferably over a transparent or translucent region of the document substrate optionally formed as an aperture. However, it is envisaged that a device may be affixed to the document substrate over a non-transparent region (e.g. over an opacifying layer region), in which case the device is designed to be viewed in reflection.

Preferably, the security document is any of: a banknote, passport, identification document, identification card, bank card, driving licence, visa, stamp, cheque or certificate.

Further disclosed herein is a security article comprising a security device according to any of the examples described above, preferably wherein the security article is security thread, strip, insert, foil or patch. The invention also provides a security document comprising such a security article.

The present invention also provides a method of manufacturing a security device, comprising forming one or more surface relief structure(s) on a substantially flat substrate, each formed from one or more curable material(s) and curing the material(s), the surface relief structure(s) defining a plurality of raised elements spaced from one another, the raised elements corresponding to elements of an image, whereby the plurality of raised elements varies across the surface relief structure(s) so as to exhibit a multi-tonal version of the image.

The method therefore provides a device exhibiting all of the advantages outlined above. Preferably, the image is a screened image. Preferably at least one of the size, shape, orientation, spacing and/or colour density of the raised elements varies across the surface relief structure(s).

In preferred methods, at least one of the surface relief structure(s) is formed by: providing a casting tool having a relief structure defined in a surface thereof, the relief structure corresponding to the surface relief structure; applying the one or more curable material(s) to the substrate and/or to the relief structure of the casting tool; bringing the substrate and the casting tool together, to thereby form the one or more curable material(s) in accordance with the relief structure and; during and/or after bringing the substrate and the casting tool together, curing the one or more curable material(s) such that the surface relief structure(s) formed of the cured material(s) is retained on the substrate.

This is a cast-cure process. The mode of curing will depend on the type of curable material used. In preferred examples the material is radiation-curable (e.g. UV-curable) and the curing step(s) will involve irradiating the material with appropriate wavelength radiation so as to cause cross-linking of the material. The one or more curable material(s) are typically applied to the substrate or alternatively to the relief structure of the casting tool. However, in some embodiments the curable material may be applied to a combination of both the substrate and the casting tool, particularly if more than one curable material is being used. In embodiments in which the security device comprises two or more surface relief structures, typically each surface relief structure is formed in a cast-curing process.

Alternatively, at least one of the surface relief structure(s) is formed by: providing a die form, the die form having a surface comprising an arrangement of raised areas and recessed areas defining the raised elements of the surface relief structure; applying the one or more curable material(s) to the surface of the die form such that said curable material(s) substantially fills the recessed areas; bringing the substrate in contact with the surface of the die form such that it covers the recessed areas; separating the substrate from the surface of the die form such that the one or more curable material(s) in the recessed areas is removed from said recessed areas and retained on the substrate to thereby form the surface relief structure; and during and/or after the bringing of the substrate in contact with the surface of the die form, at least partly curing the curable material in one or more curing steps.

This is a microintaglio process. Preferably a tie coat of curable material (which may or may not be the same curable material(s) as used to form the surface relief structure) is used to improve the adhesion between curable material(s) forming the surface relief structure and the substrate. This provides an integral base layer formed between the raised elements, as descried above. However, surface relief structures formed by a microintaglio process do not necessarily include a tie coat.

In embodiments in which the security device comprises two or more surface relief structures, each surface relief structure may formed in a microintaglio process.

In embodiments in which the security device comprises two surface relief structures formed on opposing sides of the substrate, the surface relief structures (which may be formed by a cast-cure process or microintaglio process as detailed above) may be formed sequentially in the same pass ("in-line") or separate passes (off-line) and then registered in web-based or sheet-based process. It is also envisaged that the formation of the two surface relief structures may be performed substantially simultaneously, taking place at the same position along the same direction, at the same time. This achieves the highest level of registration between the two constituent parts of the security device, since there can be no slippage or distortion of the substrate occurring after one step is performed and before the other (since there is no interval between them).

In a further aspect of the invention there is provided a method of manufacturing a security document, comprising providing a document substrate and either forming a security device on the document substrate or on a security device substrate affixed to or integrated within the document substrate, or forming a security device on a security device substrate, and then applying the security device substrate to or incorporating the security device substrate into the document substrate, in each case using one or more of the methods above to manufacture the security device. The method may be configured to provide a security document with any of the preferred features described above.

As the cast cure and microintaglio processes do not have the same pressure/thermal constraints of intaglio printing, the surface relief structure(s) may be formed at substantially any stage in the manufacturing process of the security device or security document, increasing the flexibility in the workflow. For example, the surface relief structure(s) may be applied before or after conventional lithographic print workings of applications of foils in a banknote manufacturing process.

During manufacture of a security device or security document according to the invention, the substrate could be processed in the form of a web or a plurality of sheets.

BRIEF DESCRIPTION OF THE DRAWINGS

Examples of security devices and security documents in accordance with the present invention, as well as their methods for their manufacture, will now be described with reference to the accompanying drawings, in which:

FIG. 5 is a perspective view of a surface relief structure formed in accordance with the invention;

FIG. 6 is a schematic cross sectional view of a security device in accordance with the invention, illustrating the increase in design freedom compared to conventional intaglio printing.

FIGS. 7(a) and 7(b) illustrate further surface relief structures formed in accordance with the present invention;

FIGS. 8(a) to 8(e) schematically illustrates cross sectional views of security devices according to the invention which exhibit a change of height of the base layer;

FIGS. 17 to 19 illustrate example security devices according to the invention which further comprise a decorative layer;

FIGS. 20(a) to 20(d) illustrate example security devices according to the invention that further comprise an over layer;

FIGS. 21(a) to 21(f) illustrate example security devices according to the invention that comprise further security features;

FIGS. 22(a) through 22(d) show the use of cured materials having different optical properties;

FIGS. 23 to 25 show schematic cross-sectional views of security devices according to further embodiments of the invention which comprise surface relief structures on opposing sides of the substrate;

FIGS. 34(a) to 34(e) illustrate further embodiments of security devices according to the invention, in cross-section;

and

FIGS. 42(a) to 42(d) schematically illustrate the steps of a conventional intaglio print process.

DETAILED DESCRIPTION OF THE DRAWINGS

The following description will focus on security devices formed directly on document substrates ultimately used as the basis for security documents such as banknotes, passports, certificates, licences, ID cards and the like. However, as will be explained with reference to FIG. 36(b), all embodiments of the security device could alternatively be formed on a separate substrate for later application to (or incorporation into) a security document.

Figure 1:
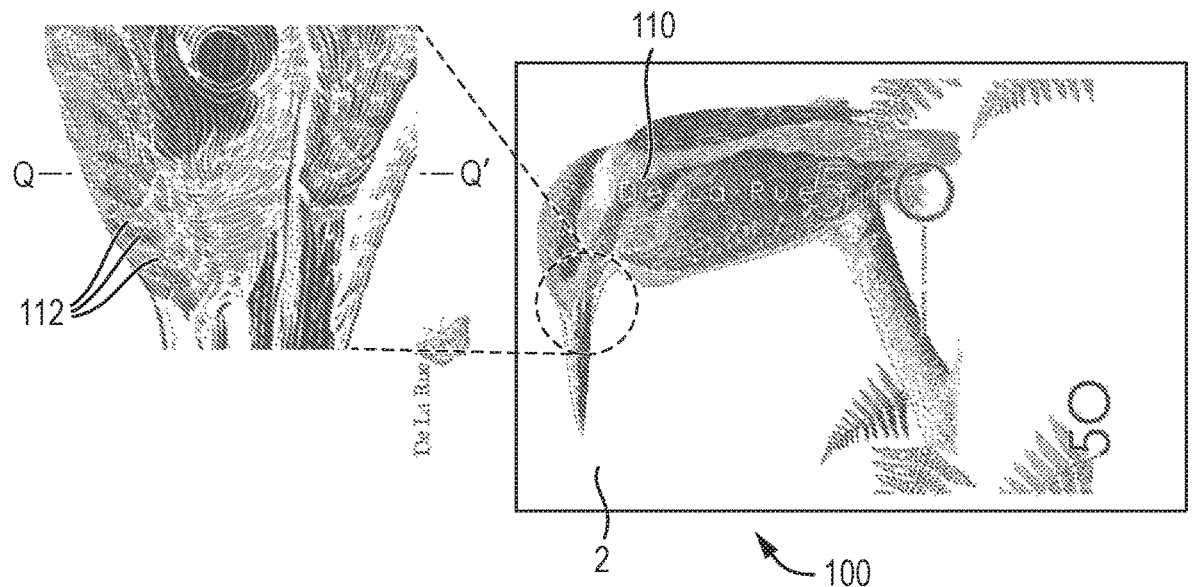
FIG. 1 shows an example of a conventional security device in plan view.
Figure 2A:
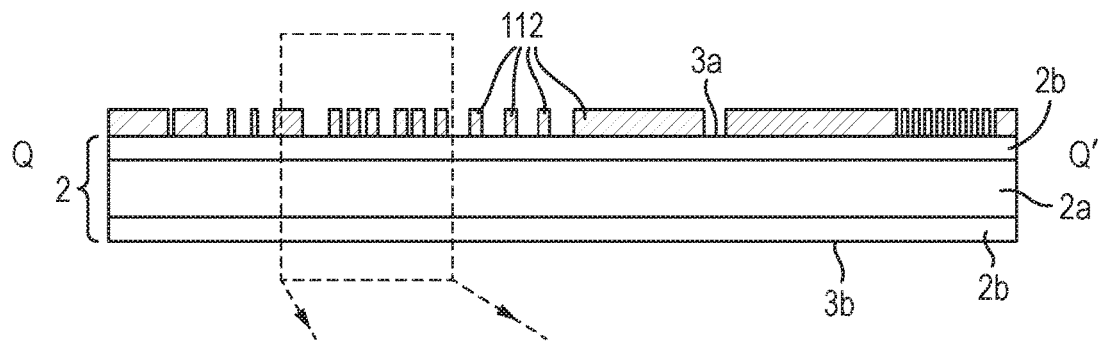
FIGS. 2(*a*) and 2(*b*) are schematic cross-sectional views of the conventional security device shown in FIG. 1.

For comparison, FIG. 1 shows an example of a conventional security device in the form of an intaglio print 110 on a security document 100. FIG. 1 shows the security document 100 in plan view with an enlarged portion of the intaglio print, and FIG. 2(a) shows a schematic cross-section along the line Q-Q'. It should be noted that, for simplicity, FIG. 2(a) does not show the embossed nature of the substrate which is caused by intaglio printing and will be present in practice. This is shown in the enlarged detail of FIG. 2(b). In this example, the intaglio print is shown as being formed on a document substrate 2 formed of an inner core substrate 2a, which may be a polymer material such as BOPP, and outer opacifying layers 2b, such as white ink. This is a typical construction of a polymer banknote substrate. However, intaglio prints 110 can be formed on any document substrate, including paper substrates.

As is shown in FIG. 1, in this example the intaglio print 110 comprises a linework image of a kingfisher. The image of the kingfisher is multi-tonal, being made up of an array of image elements 112 in the form of spaced ink lines of varying size and spacing, configured as necessary to convey the features of the image. With reference to FIG. 42, the intaglio process involves providing a printing plate 500 into which is etched all the lines 510 of the desired image elements 112 (shown in FIG. 42(a)). Ink 114 is applied to respective regions of the printing plate corresponding to the desired image elements 112 (FIG. 42(b)). The ink is forced into the etched lines and cleaned off the intervening surfaces of the plate using a wiper blade or similar. The printing plate 500 is then applied to the substrate 2 against an impression roller (not shown) at high pressure, forcing the substrate 2 into the etched lines (FIG. 42(c)), thereby causing embossing of the substrate 2. Upon separation, the ink 114 is transferred from the printing plate onto the tops of the raised elements of the now-embossed substrate 2 (FIG. 42(d)). The raised elements and the ink carried therefrom form the image elements 112 of the intaglio print 110. For completeness, FIG. 42 also schematically illustrates the process of "blind embossing" where no ink is applied to the printing plate 500, but the substrate is embossed as shown by the image elements 112 in region B of the substrate FIG. 42(d).

The embossed nature of the print 110 provides a tactile quality. However, the tactility provided by intaglio printing is limited by the amount of ink that can be transferred to the substrate 2 and the amount of thermal/pressure deformation that the substrate can endure/retain. In particular, a polymer-based substrate (as commonly seen on banknotes) has less thermal stability and cannot be embossed as much as paper, resulting in a lower intaglio profile. Furthermore, the conventional intaglio process causes a number of problems such as the difficulty of controlling subsequent print processes ("flower potting"), set-off and possible damage to frangible components such as optically variable inks and foils, as have been discussed above.

Figure 33:
FIG. 33 is an example of a typical printed feature which may be formed by conventional intaglio printing.

FIGS. 1 and 33 illustrate two examples of typical printed features which may conventionally be formed using intaglio printing, in plan view. In embodiments of the present invention features such as these may be formed by cast-curing a surface relief structure instead of (or as well as) intaglio printing. The examples shown are screened, multi-tonal images made up of an array of screen elements—in this case line elements—which vary in thickness and/or spacing across the device so as to give the appearance of different tones.

Figure 2B:
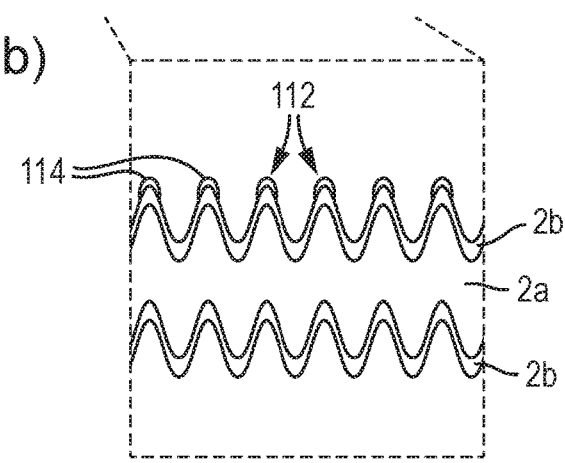
Figure 3A:
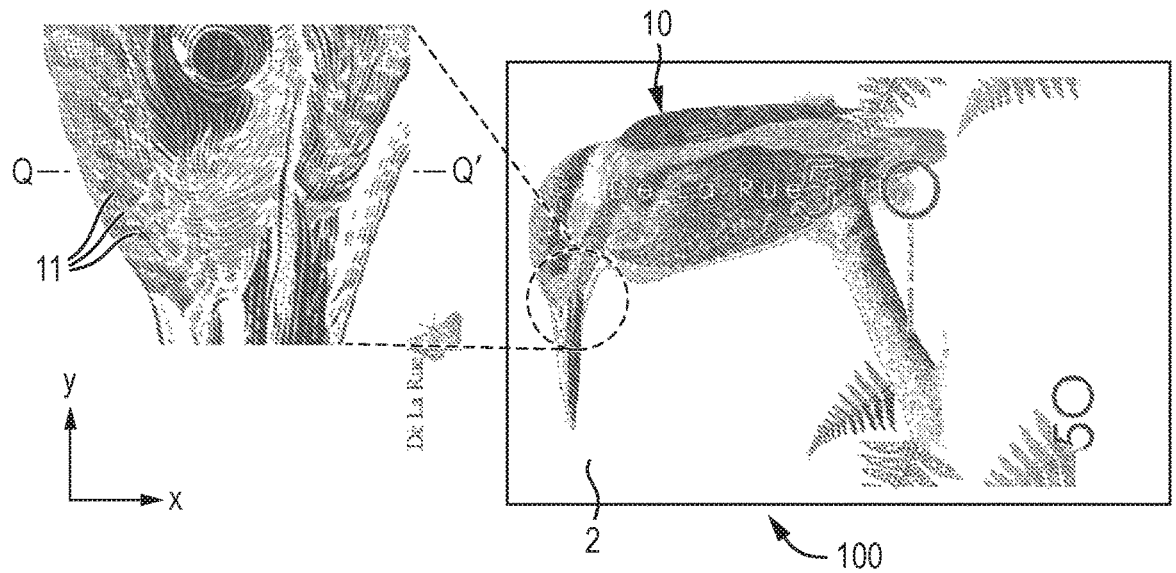
FIG. 3(*a*) shows a first embodiment of a security document having a security device in accordance with the present invention, and FIG. 3(*b*) is a schematic cross-sectional view of the device.
Figure 3B:
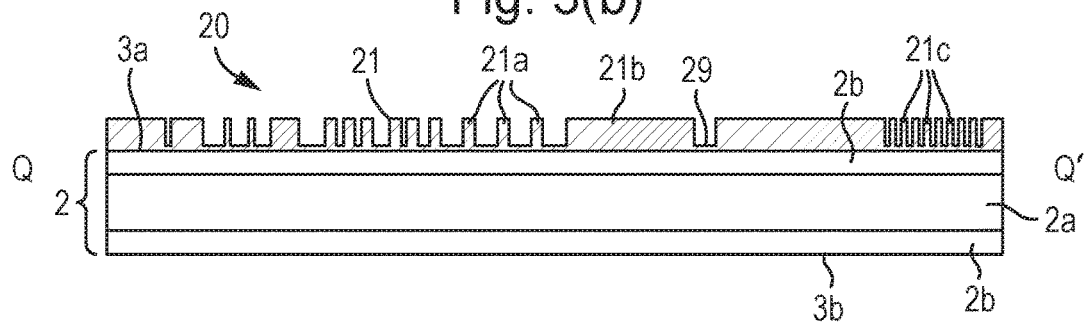

FIG. 3 shows a first embodiment of a security document 100 having a security device 10 in accordance with the present invention. FIG. 3(a) shows the document 100 and security device 10 in plan view including an enlarged portion, and FIG. 3(b) illustrates a schematic cross section of the device 100 taken along the line Q-Q'. Again, in this example the document substrate 2 is shown as a multilayer substrate having a polymer core substrate 2a, which is transparent (e.g. BOPP), and opacifying layers 2b on either side. In practice multiple opacifying layers will be used to achieve the desired opacity. In this example, the security device 10 is provided in a non-window region (i.e. the opacifying layers are present on both sides of the polymer core substrate in the region of the device 10) and is intended to be viewed in reflection, although other arrangements of the device in window and half-window regions are envisaged as will be outlined in more detail herein. The substrate does not show the localised raised areas and depressions caused by embossing (as shown in FIG. 2(b)), and is therefore referred to as "flat".

The device 10 exhibits the same linework image of a kingfisher as in FIG. 1, made up of an array of spaced image elements 11 which vary in one or more parameters such as size, shape and/or spacing across the image so as to convey the features of a multi-tonal image (e.g. the kingfisher's head, eye, beak etc.) as shown more clearly in the enlarged section of FIG. 3(a). In this example the multi-tonal image is a screened image, although it need not be. The image elements are preferably of such a size that they are individually discernible under close inspection or low magnification.

As schematically illustrated in FIG. 3(b), the security device 10 comprises a surface relief structure 20 disposed on a first surface 3a of the flat substrate 2, wherein in this example the first surface 3a of the multilayer substrate 2 is a first surface of opacifying later 2b. The surface relief structure 20 is formed of a body of cured material 20a having a profile of varying height (parallel to the y axis). The surface relief structure 20 defines a plurality (array) of raised elements (protrusions) 21 that correspond to the image elements 11 exhibited by the device 10. The raised elements 21 corresponding to the image elements 11 vary in size and spacing across the surface relief structure so as to convey a multi-tonal image of the kingfisher. For example, the raised elements 21a have a different size (e.g. a width parallel to the x-axis) to the raised element 21b, and a different size and spacing to the raised elements 21c. An observer of the device will perceive the corresponding regions of the image to exhibit different tones, thereby exhibiting the multi-tonal image shown in FIG. 3(a).

As can be seen in FIG. 3(b), the raised elements 21 of the surface relief structure are joined to one another by a base layer 29 of the same cured material 20a, which extends between each of the raised elements. The base layer 29 is an artefact of the cast-curing process by which the surface relief structure 20 is formed. The base layer is preferably sufficiently thin (in a direction parallel with the y axis) so as to have a much lower optical density than the raised elements 21 so that a contrast is visible between them. The height of the base layer 29 may be varied across the surface relief structure to provide further optical and/or tactile effects, as will be explained further herein.

The FIG. 3 embodiment therefore results in a security device 10 which mimics the appearance and tactile feel of the intaglio print 110 described in FIG. 1, albeit formed via a different method and having a different structure.

It is noted that as well as the multi-tonal image of the kingfisher, the banknote 100 shown in FIG. 3 further exhibits indicia in the form of text (e.g. the "50" denomination). The text typically does not exhibit a multi-tonal image, but may still be formed from a plurality of raised elements (e.g. formed by cast cure or microintaglio) which are arranged in a regular array (e.g. do not vary in size, shape, orientation, spacing or colour density).

Figure 4A:
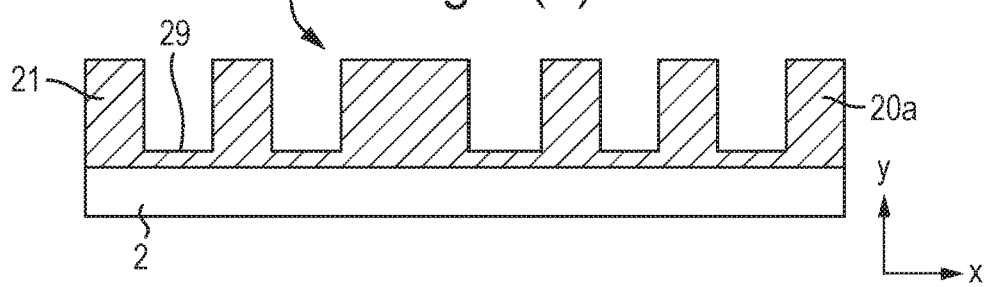
FIG. 4(*a*) is a schematic cross-sectional view through a further device according to the invention.
FIG. 4(b) is a schematic cross-sectional view through a device according to the invention in which the raised elements vary in height across the surface relief structure.

FIG. 4(a) shows a schematic cross-section through a portion of a further device 10 from which it will be seen that the individual elements are formed as raised elements 21 in a surface relief structure 20 formed of cured material 20a, by a cast-cure process. Preferably, the material is semi-transparent and carries a visible colourant so as to contrast with the underlying substrate 2. The base layer 29 of the material which extends between the raised elements 21 is preferably sufficiently thin so as to have a much lower optical density than the raised elements so that a contrast is visible between them. The size, spacing and/or height (e.g. and therefore the optical density) of the raised elements can be varied across the device through appropriate design of the casting mould so as to convey the desired screen image.

Figure 4B:
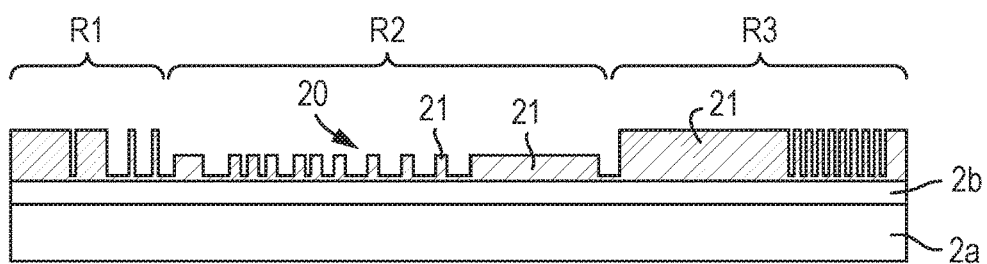

FIG. 4(b) shows a schematic cross-sectional view through a portion of a further security device 10 in accordance with the present invention. In this example, the plurality of raised elements 21 vary in height (parallel with the y-axis) across the surface relief structure 20. For example, the raised elements 21 in regions R1 and R3 have a greater height than the raised elements of region R2. Thus, the raised elements having a greater height in regions R1 and R3 will have a greater optical density than the raised elements in region R2 due to the increased amount of cured material that light needs to pass through. The difference in height may also affect the reflection of light from the cured material across the surface relief structure, further contributing to a perception of different tones. The height of the raised elements 21 can therefore be varied across the surface relief structure 20 in order to convey different tones across the image, with raised elements of differing height corresponding to image elements that appear to the viewer to have different tones. In addition to the heights of the raised elements varying across the surface relief structure, the areal size (e.g. "footprint") of the raised elements may vary as shown in the perspective view of FIG. 5. Here, the dimensions of the raised elements 21 vary along both the x and z axes (e.g. the length and width of the elements), further contributing to the multi-tonal effect.

Variation in the geometrical properties (e.g. size, shape, orientation spacing) of the raised elements 21 across the surface relief structure(s) 20 provides additional tactility to the device, which can increase its security level. The tactility of the surface relief structure 20 can be varied in accordance with the image. In the image of the kingfisher seen in FIG. 3 for example, as well as the raised elements of the surface relief structure contributing to conveying different tones across the image, their heights may vary in various regions (e.g. the beak, eye, wing etc.) to provide corresponding changes in tactility. For instance, the heights of the raised elements corresponding to the image elements of the kingfisher's wing might have a height that provides a lower tactility level ("finer" feel) compared to the raised elements corresponding to the beak which may provide a higher tactility level ("coarser" feel).

The use of cast curing to form the surface relief structures 20 of the present invention provides a greatly increased flexibility of the raised element parameters in comparison with intaglio printing, where the form of the elements is limited by the ink transfer. FIG. 6 is a schematic cross sectional view of a security device in accordance with the invention, illustrating the increase in design freedom compared to conventional intaglio printing. For example, as shown in FIG. 6, the heights of both the raised elements 21 and the base layer 29 may vary across the surface relief structure in order to exhibit different tones. This increase in design freedom advantageously allows for a greater variety of visual effects and more complex designs, and hence a higher security level of the device.

In some embodiments, the base layer 29 may extend around the periphery of the raised elements, as schematically illustrated in FIGS. 7(a) and 7(b). In each of these examples, the device is disposed in a non-windowed region of a multi-layer substrate 2 comprised of a core (e.g. BOPP) layer 2a and opacifying layers 2b on either side, as has been described above. In FIG. 7(a) the surface relief structure 20 comprises two laterally spaced sets of raised elements 21 (shown generally at regions R1 and R2) joined by a region of base layer 29. The surface relief structure 20 is therefore formed of a continuous block of the cured material 20a. The raised elements 21 of the two regions R1 and R2 correspond to image elements of a multi-tonal image (although for simplicity in these figures the variation in the parameters of the raised elements is not shown). The height (and therefore optical density) of the base layer 29 is significantly lower than the height of the raised elements 21 such that a viewer perceives a contrast between the base layer 29 and raised elements 21. The base layer 29 will provide a "background" to the two regions R1, R2 of raised elements, and the presence of the base layer will need to be taken into account in the design of the multi-tonal image to be exhibited by the device.

In FIG. 7(b), the device 10 comprises two surface relief structures 20-1 and 20-2 disposed on the same surface 3a of the substrate 2 and laterally separated from each other by a region absent of cured material. Each of the surface relief structures comprises a plurality of raised elements 21 joined by a base layer 29 formed of the same cured material, with the base layer laterally extending around the periphery of the raised elements, typically by only a small distance such as between 0.01 mm and 5 mm. In this example, the raised elements 21-1 of the first surface relief structure 20-1 correspond to the image elements of a first multi-tonal image, and the raised elements 21-2 of the second surface relief structure 20-2 correspond to image elements of a second, different, multi-tonal image. For example, the first surface relief structure 20-1 may exhibit a multi-tonal version of the digit "5", and the second surface relief structure may exhibit a multi-tonal version of the digit "0" as shown in FIG. 3(a). In other examples, the parameters of the raised elements 21 may vary across the combination of the two surface relief structures 20-1, 20-2 such that in combination the device exhibits a multi-tonal version of an image. It is noted that in such embodiments, the part of the image exhibited by an individual surface relief structure need not be multi-tonal, as long as the array of the raised elements varies across that combination of the surface relief structures in order that a multi-tonal image is exhibited.

As has been outlined above, the height of the base layer may vary across the surface relief structure to provide further complex effects due to the differences in optical density. FIG. 8 schematically illustrates cross sectional views of security devices according to the invention which utilise such a change of height of the base layer 29. It is noted that such variation in the height of the base layer may add further complexity and different tones to the overall image exhibited by the device, in addition to the multi-tonal effects generated by the parameters of the raised elements 21.

In FIG. 8(a) a security device 10 is illustrated similar to that shown in FIG. 7(a), except that the two regions R1, R2 of raised elements 21 are separated by a region of base layer 29 (shown at S) that continually varies in height (thickness) from a relatively greater height at region R1 to a relatively lower height at region R2. This sloped section of base layer 29 will have a varying optical density across is lateral domain, providing a different visual characteristic to the device illustrated in FIG. 7(a). Such a continuous variation in height could be linear (as in FIG. 8(a)), or could be non-linear, e.g. curved or undulating. In FIG. 8(b), the continuous portion of base layer 29 that extends between the two regions of raised elements exhibits a step change in height between a thicker portion of base layer (region A) and a thinner portion of base layer (region B).

FIG. 8(c) illustrates a device similar to the one depicted in FIG. 7(b), but in which the base layer 29-1 of first surface relief structure 20-1 has a greater height than the base layer 29-2 of the second surface relief structure 20-2.

FIG. 8(d) illustrates a security device comprising two surface relief structures 20-1 and 20-2 exhibiting complex variations in base layer height. First surface relief structure 20-1 comprises region A1 where the base layer 29 has a greater height than the base layer of region A2. Regions A1 and A2 are joined by a sloped region of base layer having a continuously varying optical density. The second surface relief structure 20-2 comprises regions B1, B2, B3 and B4 having different base layer heights, adding further complexity to the surface device and thereby increasing its security level.

In most of the examples discussed so far that exhibit a variation in base layer height, the height, h, of the individual raised elements with respect to the base layer (e.g. corresponding to the depth of the casting tool, or the distance between the height of the base layer and the height of the tops of the raised elements) has been substantially constant, meaning that the height of the tops of the raised elements above the surface of the substrate 2 on which the surface relief structure is disposed varies in accordance with the height of the base layer. For example in FIG. 8(*a*), the height, h, of the raised elements 21 with respect to the base layer is the same in both regions R1 and R2, although the height of the tops of the raised elements 21 above the substrate 2 (e.g. the height of the raised elements with respect to the substrate) is greater in region R1 than R2, due to the lower base layer height in region R2.

However, the heights of the individual raised elements 21 may be varied in accordance with the height of the base layer such that the height of the raised elements above the substrate remains substantially constant across the device or a region thereof. This is illustrated in FIG. 8(*d*) where the heights of the raised elements with respect to the base layer in regions B3 and B4 vary in accordance with the base layer height in the respective regions such that the heights of the tops of the raised elements above the substrate in regions B3 and B4 (shown at H) are substantially the same. Such embodiments can provide a difference in tactility level between different regions of the surface relief structure (due to the difference in individual raised element height above the base layer), thereby further increasing the complexity and difficulty of counterfeit of the device. Moreover, the tops of the raised elements having a substantially uniform height across the device or portion thereof can provide further advantages, such as compensating for differences in document thickness so as to provide improved ream shape when processing a plurality of documents carrying the security device.

FIG. 8(*e*) illustrates an example of a surface relief structure 20 according to a further embodiment of the invention. Here, an array of raised elements 21 is located between regions of base layer 29*a* having a height that is substantially equal to the height of the tops of the raised elements 21 above the substrate 2. Therefore, the raised elements appear recessed within the surface relief structure 20. However, the regions of base layer between the individual raised elements is of lower height than that raised elements.

Figure 9:
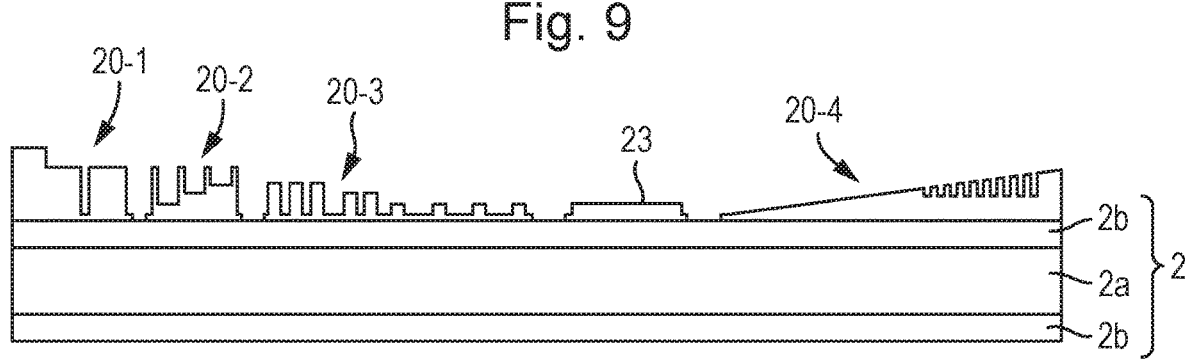
FIG. 9 is a schematic cross sectional diagram of a security device according to a further embodiment of the present invention.

FIG. 9 is a schematic cross sectional diagram of a security device according to a further embodiment of the present invention. In this case, the security device comprises a plurality of surface relief structures 20-1, 20-2, 20-3, 20-4 according to the invention, each comprising an array of raised elements that correspond to elements of a multi-tonal image. The individual surface relief structures are separated by regions absent of cured material. The device further comprises an additional decorative structure 23 which does not convey a multi-tonal image. Such a decorative structure may exhibit a uniform (e.g. not multi-tonal) decorative aspect of the device, such as a block print, border, key line or text for example. Such a decorative structure may also advantageously add additional tactility to the device.

Figure 10A:
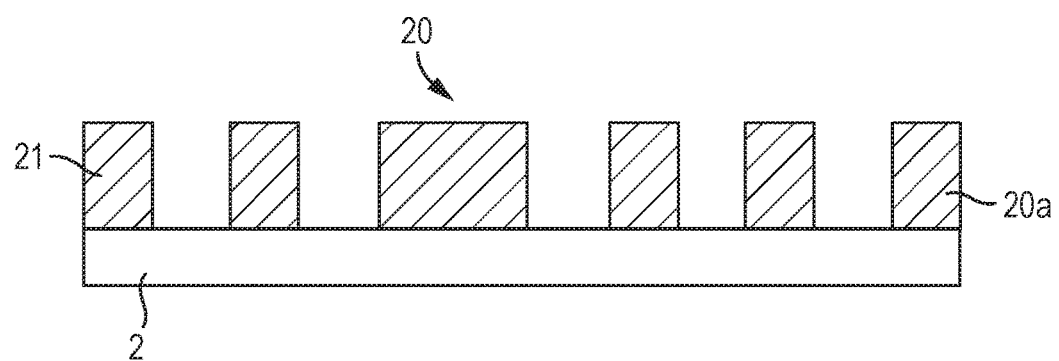
FIGS. 10(a) and 10(b) schematically illustrate surface relief structures in accordance with the invention that has been formed by a microintaglio process.
Figure 10B:
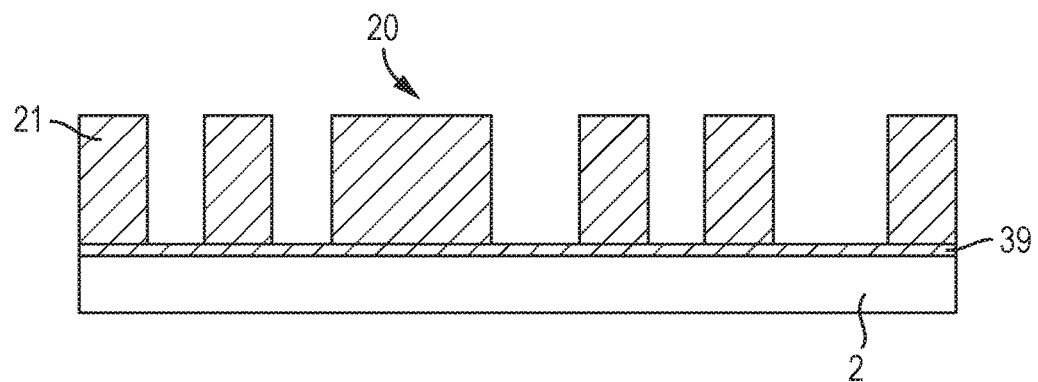

In the above-described examples, the surface relief structures 20 each comprise a base layer 29 between the raised elements 21, due to the structures having been formed by a cast curing process. In an alternative, the surface relief structure(s) 20 defining the (e.g. screened) multi-tonal image may be formed by a so-called "microintaglio" process. An example of a resulting structure is shown in FIG. 10(*a*). The raised elements 21 can be configured in the same manner as described above. Owing to the nature of the microintaglio process, there will be no base layer integral with the raised elements, although there may optionally be a tie coat layer formed of another curable material, as illustrated in FIG. 10(*b*). The curable material 20*a* forming the raised elements could be translucent or opaque if desired.

FIG. 10(*b*) schematically illustrates an embodiment in which a tie coat layer (shown at 39) is used, thereby forming a base layer integrally formed with the raised elements. The curable material of the tie coat layer may or may not be the same curable material used to form the raised elements.

Typical parameters of conventional intaglio trenches used to form known print elements are given below. The relief on the casting tool used to form cast-cured raised elements (or on the die form used in a microintaglio implementation) in accordance with embodiments of the present invention can, if desired, be configured with the same or similar parameters:

For a Paper Substrate:
 Linewidth range for trenches that will contain ink/print are typically 50 μm-8 mm, more preferably 50 μm-3 mm, even more preferably 50 μm-1 mm
 Linewidth range for trenches that will contain embossing only (no ink) are typically μm-8 mm, more preferably 30 μm-3 mm, even more preferably 30 μm-1 mm
 Minimum Gaps between trenches are typically 30 μm
 Depth range for trenches are typically 20-150 μm, more preferably 25-125 μm, even more preferably 35-90 μm For a Polymer Substrate:
 Linewidth range for trenches that will contain ink/print are typically 50 μm-8 mm, more preferably 50 μm-3 mm, even more preferably 50 μm-1 mm
 Linewidth range for trenches that will contain embossing only (no ink) are typically μm-8 mm, more preferably 30 μm-3 mm, even more preferably 30 μm-1 mm
 Minimum Gap between trenches are typically 30 μm
 Depth range for trenches are typically 10-100 μm, more preferably 15-85 μm, even more preferably 20-55 μm.

Cast-cure and microintaglio processes used in the present invention can in theory match these parameters (and as discussed above is advantageously substrate-independent), the only limitation is the thickness of curable (e.g. UV-curable) resin that can be cured effectively. Cast-cure and microintaglio do not have the depth limitations that intaglio has on polymer substrate. In particular, both cast-cure and microintaglio techniques can produce larger, smaller and/or more complex structures than intaglio (so long as the curable material can be cured), as these processes are not limited by the ink, print, or embossing constraints of conventional intaglio.

In all of the embodiments it will be understood that the size (e.g. height, width), shape, orientation and/or spacing can vary between raised elements of the relief structure.

Figure 11A:
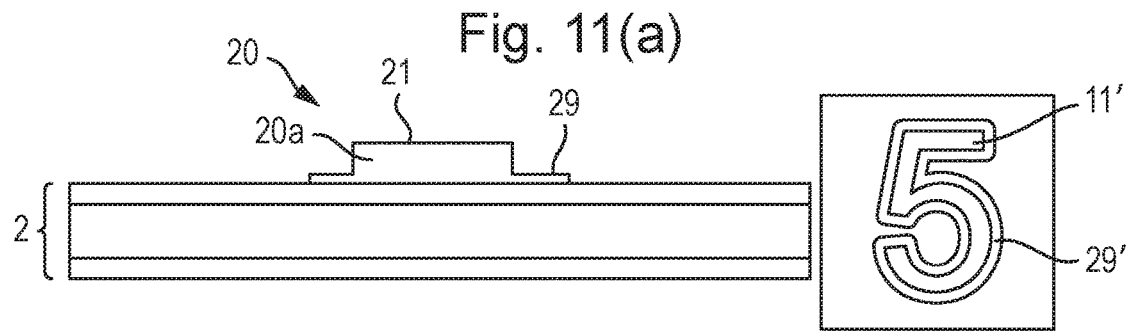
FIGS. 11(a) to 11(c) illustrate different optical properties of the cured material(s) that may be used in the present invention.

The cured material(s) used in any of the embodiments herein may have different optical properties, as schematically illustrated in FIG. 11. FIG. 11(*a*) illustrates a cross-sectional view of a surface relief structure 20, with a single raised element 21 shown for clarity; however, illustrating how different tones may be achieved. A base layer 29 is present due to the surface relief structure 20 being formed by cast curing, the casting here defining a digit "5" as shown in the accompanying plan view. In FIG. 11(*a*), the cured material 20*a* is transparent and substantially colourless, but exhibits regions of different tones due to the difference in height (and therefore difference in optical density) between the raised element 21 and the base layer. Here, the raised element 21 will appear in a darker tone (11') than the surrounding base layer shown at 29' due to the increased thickness in cured material. A magnified portion of a security device 10 according to the invention is shown in FIG. 12, showing a surface relief structure 20 formed of a transparent, substantially colourless, cured material defining an array of raised elements 21. The parameters of the raised elements defining the image elements in this portion of the image vary so as to exhibit different tones. For example the spacing between the individual raised elements 21 in the right hand side of FIG. 12 is smaller than the spacing on the left hand side, and therefore the right hand side of the image appears in a darker tone.

Figure 11B:
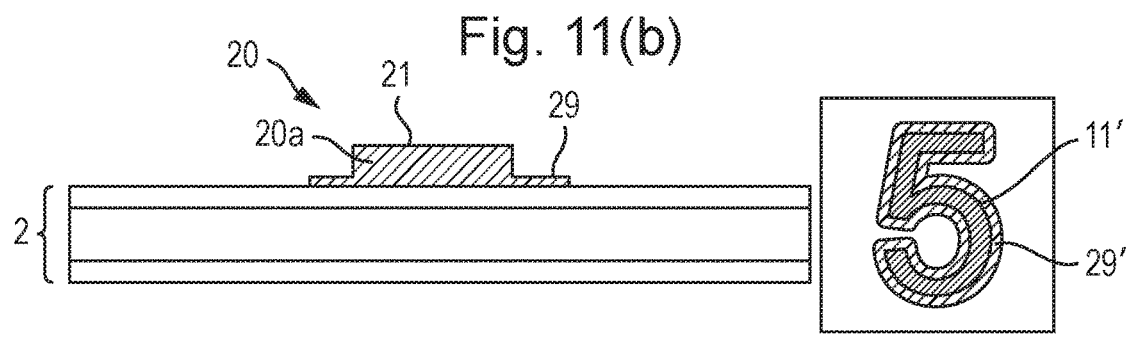
Figure 12:
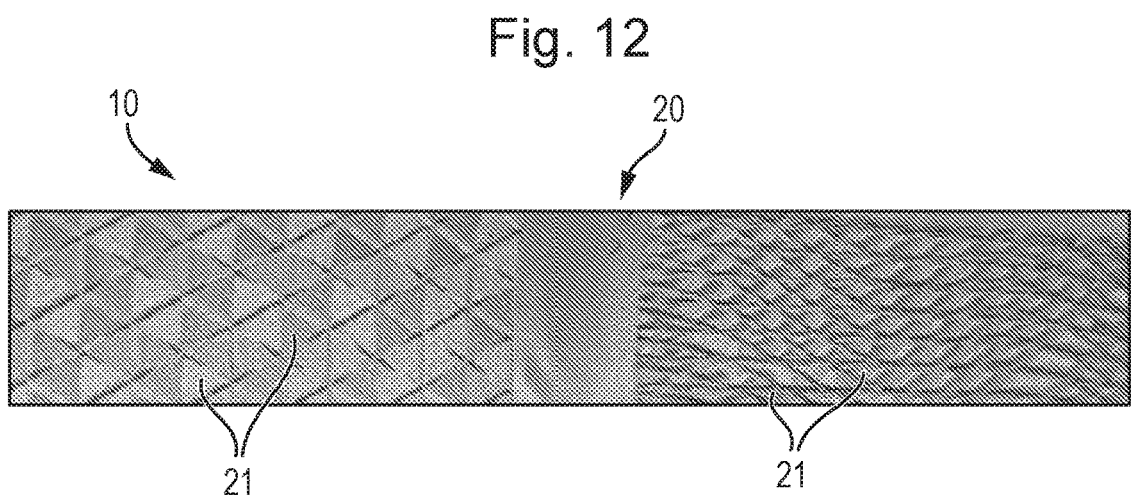
FIG. 12 illustrates example devices according to the invention where the cured material is substantially transparent and colourless.

In FIG. 11(b), the cured material 20a carries a coloured tint (e.g. red), i.e. it is at least partially transparent and exhibits a visible colour. This is typically provided by using a dyed cured material, although low concentrations of pigment may also confer a coloured tint. The raised element 21 will appear in a darker tone (11') than the surrounding base layer (29') due to the greater thickness of cured material (and therefore greater colour density) in the region of the raised element 22. In such cases the surface relief structure will exhibit a mono-colour, multi-tonal image. The colour density of the raised elements may vary as a function of the concentration of tint carried by the cured material, e.g. tinted raised elements that comprise a relatively higher concentration of dye or pigment will appear relatively darker than raised elements having a relatively lower concentration of dye or pigment.

Figure 11C:
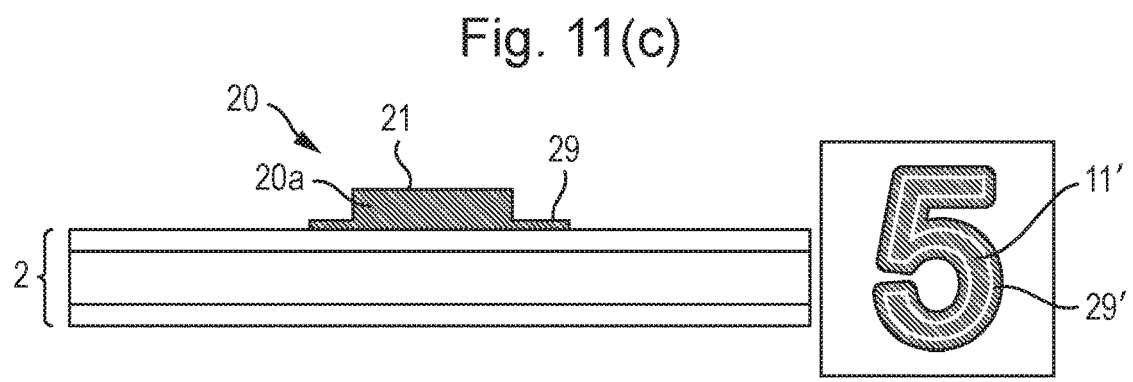

Although the cured material is preferably colourless or tinted as in FIGS. 11(a) and 11(b), in some embodiments the cured material may be substantially opaque and carry a colour (e.g. a blue pigment), as shown in FIG. 11(c). Even though the cured material is substantially opaque, the raised element 21 will appear to have a perceivably different tone to the base layer due to the difference in reflectivity of light off the raised element and the base layer. The differences in tone will be more apparent when not looking straight down at the feature. In embodiments where a substantially opaque cured material 20a is used, the differences in tone are more readily perceived when the array of raised elements exhibits differences in reflectivity, for example due to variations in orientation or facet angles of the raised elements.

Alternatively, the cured material may have a colour visible under at least some viewing conditions (preferably white light illumination, but alternatively under special illumination such as UV).

The surface relief structure(s) of the present invention exhibit a multi-tonal version of an image when viewed in isolation, due to the variation of the parameters (e.g. size, spacing and/or colour density) of the raised elements. This feature alone provides a secure device. However, in developments of the invention the surface relief structure(s) may be combined with further decorative layers in order to provide further complex effects that increase the security level of the device, as will now be described with reference to FIGS. 13 to 15.

Figure 13A:
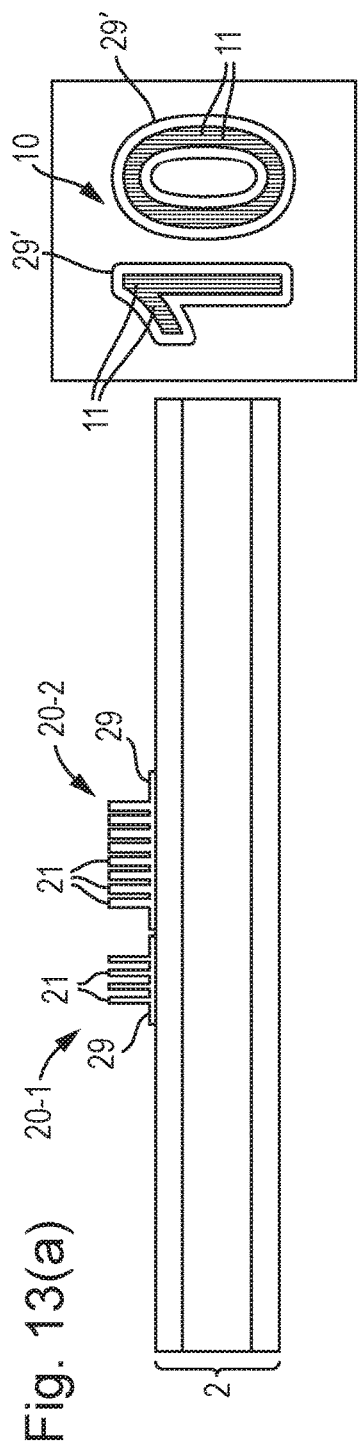
FIGS. 13(a) to 13(c) schematically show further embodiments illustrating the use cured material having different optical properties.
Figure 13B:
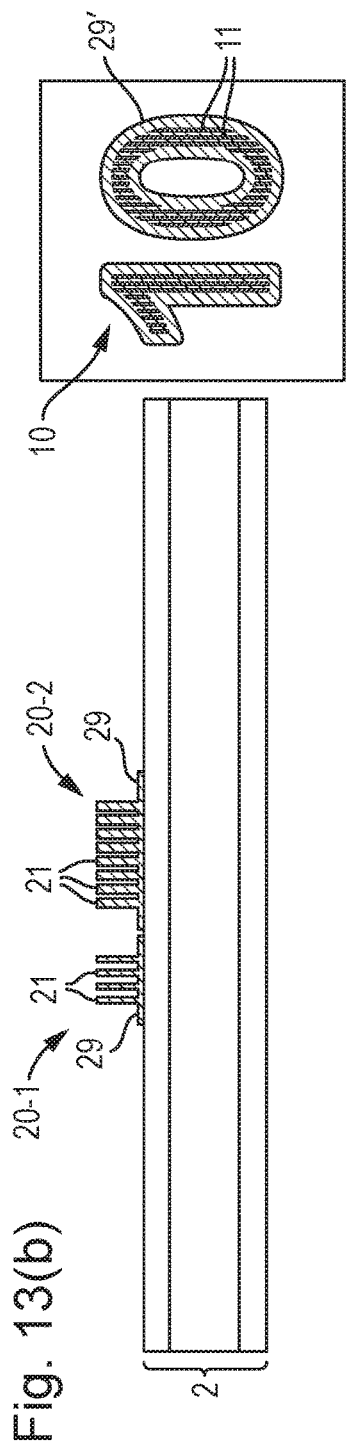
Figure 13C:
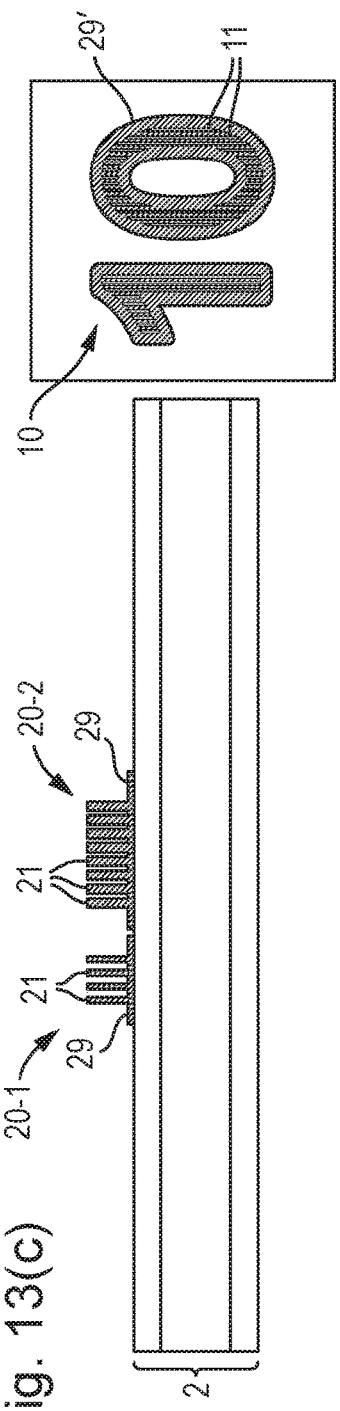

FIG. 13 illustrates embodiments of a security device according to the invention showing how the raised elements correspond to the elements of an image. In each of FIGS. 13(a) and 13(c), the device comprises two surface relief structures 20-1 and 20-2, both comprising an array of raised elements 21 and a base layer 29 extending therebetween (e.g. the surface relief structures were formed by cast curing). The raised elements of the first surface relief structure 20-1 correspond to image elements 11 defining the digit "1", and the raised elements of the surface relief structure 20-2 correspond to image elements 11 of the digit "0", as shown in the plan views of the device 10. A border region 29' around the image elements 11 corresponding to the base layer 29 is visible. The raised elements of the second surface relief structure 20-2 have a larger width than those of the first surface relief structure 20-1 and therefore exhibit a darker tone than the raised elements of the first surface relief structure 20-1. Here, the device 10 is disposed on a non-windowed region of a substrate 2 and is intended to be viewed in reflection.

In FIG. 13(a) the cured material 20a is transparent and colourless. In more complex embodiments, the cured material 20a may carry a coloured tint, for example through the use of a coloured dye or a low concentration of pigment. This can be used as a further variable to create new visual effects, especially since the colour density of the surface relief structure 20 may vary in dependence on its height (raised elements of greater height will have a greater colour density, due to the greater amount of tinted material 20a through which light passes). Such an example is schematically illustrated in FIG. 13(b), where the surface relief structures 20-1 and 20-2 have the same form as in FIG. 13(a), but the cured material has a coloured (in this example, red) tint. As can be seen from the plan view of the device, the image elements 11, which correspond to the raised elements 21 having a greater height than the base layer 29, have a greater colour intensity than the surrounding base layer region 29' due to the increased amount of tinted cured material that the light has to pass through before being reflected off the substrate. In a similar manner, the raised elements 21 of the first surface relief structure 20-1 (corresponding to image elements 11 defining the digit "1") have a narrower width than the raised elements 21 of the second surface relief structure 20-2. Therefore, the image elements 11 forming the digit "1" will appear to have a lower colour intensity (i.e. different tone) to the image elements 11 forming the digit "0".

If a coloured cured material is used to form the surface relief structures by cast curing it is preferred that it is tinted (i.e. light can pass through the tinted material at least to some degree) due to the presence of the base layer 29 between the raised elements. However, it is also envisaged to use coloured curable material during the cast curing process that carries a substantially opaque colour. Such an embodiment is illustrated in FIG. 13(c), where again the surface relief structures 20-1 and 20-2 have the same form as in FIGS. 13(a) and 13(b), although in this case the cured material is coloured (e.g. blue) and substantially opaque. Here, a multi-tonal effect can be observed due to the difference in reflected light off the surfaces of the opaque raised elements giving the appearance of different tones of the image elements 11, as illustrated in the plan view of the device. Due to the opacity of the cured material, the colour intensity of the base layer region 29' is greater than when the surface relief structure utilises a tinted cured material.

Figure 14A:
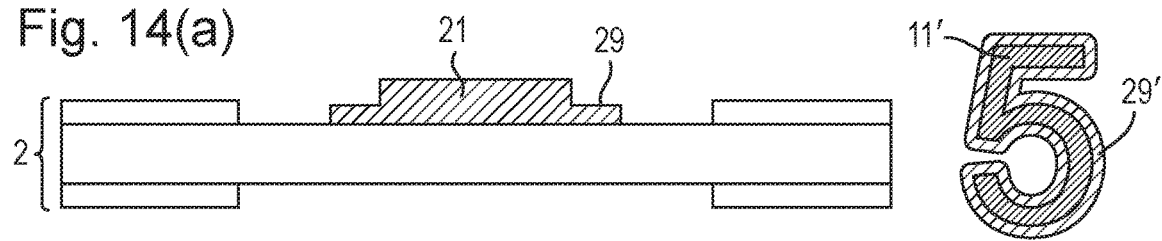
FIGS. 14(a) to 14(c) illustrate how different heights of the raised elements may exhibit different tones.
Figure 14B:
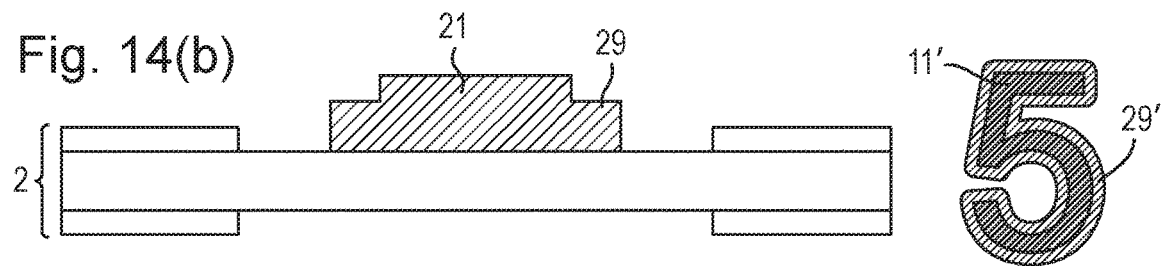
Figure 14C:
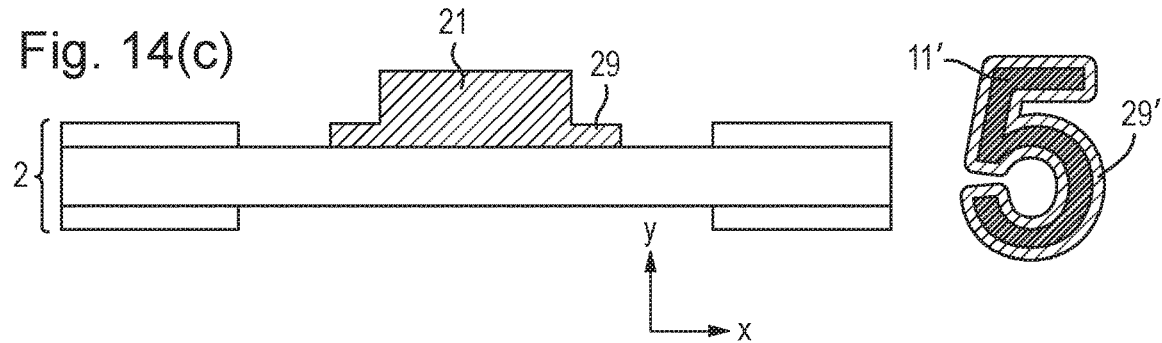

FIG. 14 schematically illustrates how different thicknesses of material forming the base layer and raised elements can exhibit different tones, thereby contributing to the multi-tonal image displayed by the device. In each of FIGS. 14(a) to 14(c) only a single raised element 21 is shown for simplicity; however, illustrating how different tones may be achieved. The lateral shape of the surface relief structure shown in FIGS. 14(a) to 14(c) conveys the shape of a digit "5" as shown in the accompanying plan views. The cured material of the surface relief structures is partially transparent and carried a coloured tint (e.g. red). Therefore, thicker regions of the cured material, i.e. regions of the surface relief structure having a greater height (parallel to they axis), will have a greater colour intensity (e.g. appear in a darker red tone) than regions of the surface relief structure having a lower height.

In FIG. 14(a), the top of the raised element 21 has a height above the substrate that is approximately twice the height of the base layer 29. Accordingly, the resulting image of the digit "5" exhibits a dark red interior region 11' surrounding by a border 29' having a lighter red tone corresponding to the base layer 29 of lower height.

In FIG. 19(b), the thickness of the base layer 29 is increased with respect to the structure shown in FIG. 19(a), and consequently both the interior region 11' and the border 29' of the digit "5" have a greater colour intensity compared to the corresponding regions of the image exhibited in FIG. 14(a) due to the increase in thickness of cured material. In FIG. 14(c), the base layer 29 has the same height as the base layer of FIG. 14(a), and the surface relief structure in the region of the raised element has the same overall height above the substrate as the structure of FIG. 14(b). The resulting image therefore exhibits a relatively low colour intensity border region 29' and a relatively high colour intensity interior region 11'.

Figure 15A:
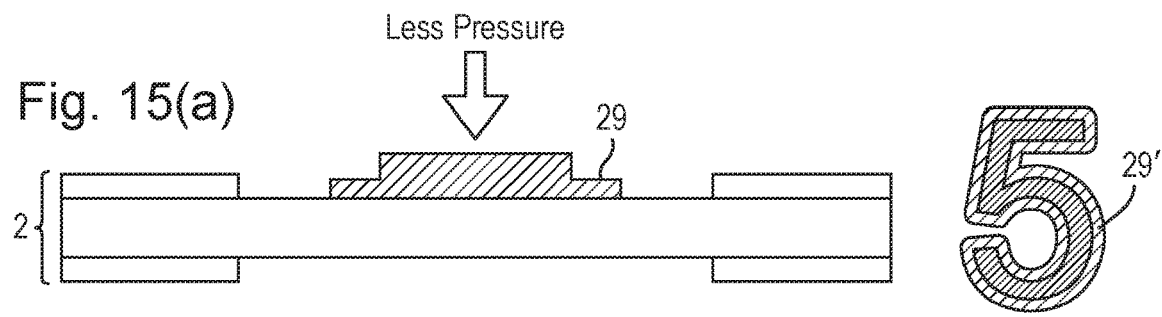
FIG. 15 schematically illustrates how different thicknesses of base layer may be formed.
Figure 15B:
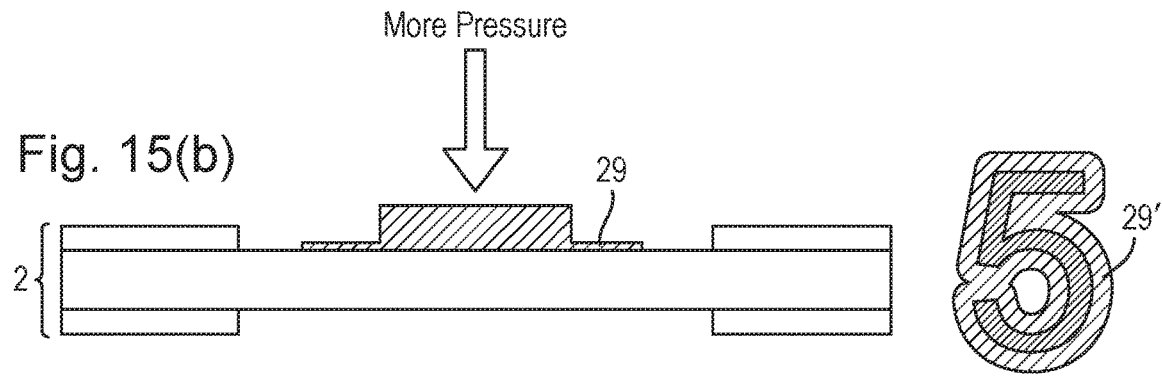

The heights (or "thicknesses") of the raised elements and the base layer may typically be controlled by appropriate design of the casting tool (e.g. deeper recesses in the casting tool will correspond to raised elements having a greater height). FIG. 15 schematically illustrates a further technique by which the thickness of the base layer 29 may be controlled, again illustrated using a single raised element for simplicity. During the cast curing process, the pressure with which the substrate 2 is brought into contact with the casting tool may be varied. If a relatively low pressure is used (FIG. 15(a)), then the base layer 29 will have a greater thickness than if a greater pressure is utilised (FIG. 15(b)). Thus, when the pressure used during the cast curing process is increased, the base layer of the resulting surface relief structure will have a lower colour intensity (and larger lateral extent around the periphery of the raised elements) than a base layer formed when using less pressure, as schematically illustrated in FIGS. 15(a) and 15(b). It is noted that the height of the raised elements above the base layer (e.g. corresponding to the depth of the recess in the casting tool) does not vary with the pressure used in the cast curing.

Figure 16A:
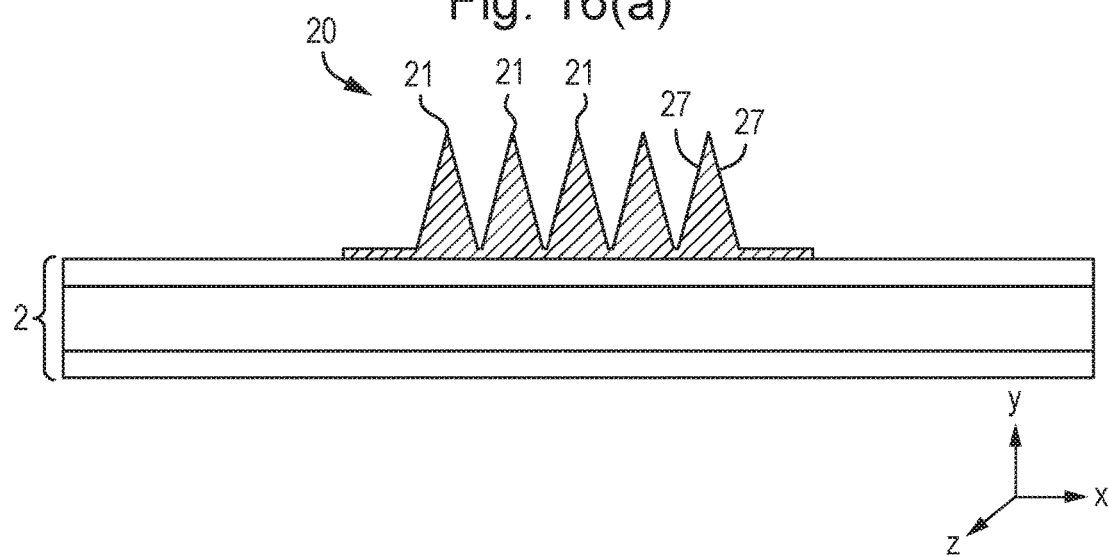
FIGS. 16(a) to 16(d) illustrate surface relief structures according to further embodiments of the invention.

FIGS. 16(a) to 16(d) illustrate surface relief structures 20 according to further embodiments of the invention. In FIG. 16(a), the raised elements 21 are in the form of faceted structures, here linear triangular microprisms, with their long axes extending along the z axis (perpendicular to the plane of the page in the view of FIG. 16(a)). In this embodiment the cured material carries a coloured tint (e.g. red) and exhibits a varying colour intensity in accordance with the prism geometry. More specifically, the apex ("top") of the microprisms has a greater colour intensity (e.g. appears darker red) than the troughs of the prismatic structure. The continually varying colour intensity exhibited by the angled facets 27 of the microprisms can be used to exhibit complex multi-tonal effects.

In the example embodiment of FIG. 16(a) the raised elements 21 are in the form of elongate triangular microprisms which have a constant height along their direction of elongation (along the z-axis). Thus, the variation in colour intensity is exhibited in a direction parallel to the x-axis. However, other raised element geometries are envisaged that display a variation in colour intensity in two dimensions, for example linear microprisms that exhibit a (e.g. linear, curved or irregular) height variation along their length, pyramid structures, corner cubes or cones. Furthermore, although the cured material of the raised elements in FIG. 16(a) carried a coloured tint, a continuous variation in the tones exhibited by raised elements having one or more angled facets 27 may be exhibited when using transparent and colourless cured material or opaque cured material, due to the difference in optical density and/or reflectivity off the surface of the cured material.

Figure 16B:
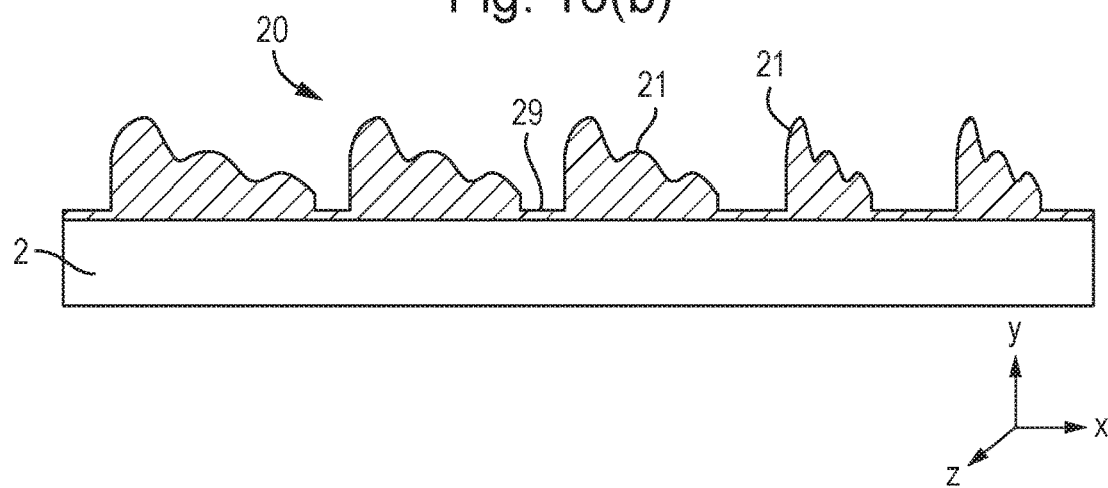
Figure 16C:
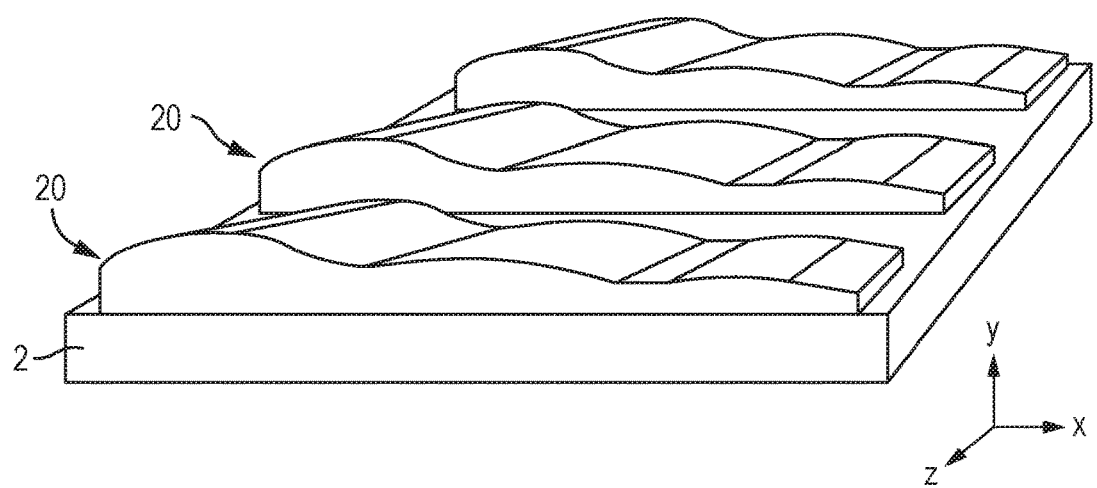
Figure 16D:
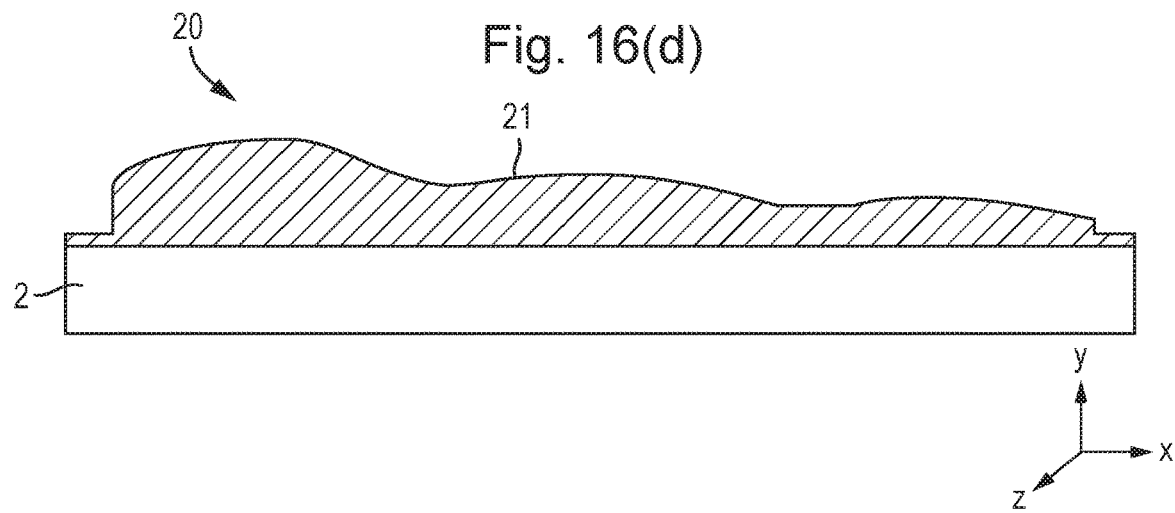

FIG. 16(b) illustrates a surface relief structure 20 in which the raised elements 21 are in the form of irregular structures having a continuous "wave" form, with each of the raised elements 21 separated by a region of base layer 29. Such irregular structures are possible using a cast-cure (or micro-intaglio) process due to the faithful replication of the desired surface relief, and would be very difficult or impossible to achieved using conventional intaglio. In the cross-sectional view of FIG. 16(b), the height of the raised elements 21 varies in a continuous non-regular manner along the x-axis. Further complexity may be achieved with height variation along the z-axis, as shown in FIG. 16(c). Adjusting the orientation of the individual raised elements can provide further control of the exhibited tonality. FIG. 16(d) illustrates a further example of a non-regular raised element that may be used within a surface relief structure 20 according to the invention.

Figure 17A:
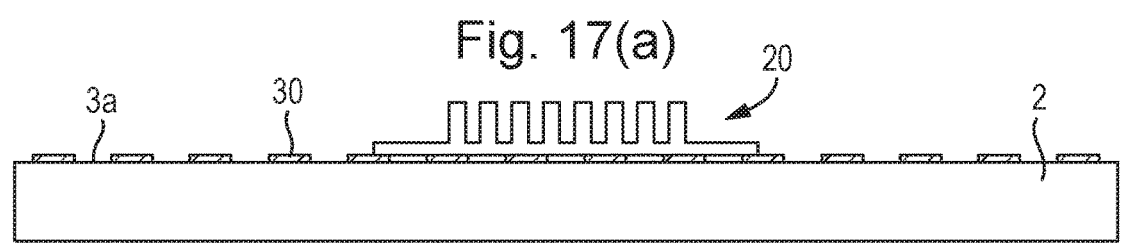

FIG. 17(a) illustrates a cross sectional view of a security device comprising a decorative layer 30 in the form of a print layer applied to the surface of the substrate. In this example the substrate 2 is a paper substrate and the print layer is formed by lithographic printing, although it should be understood that the print layer may be formed by other printing processes such as gravure, offset, flexographic, inkjet or any other convenient method. Here, the cured material of the surface relief structure 20 is substantially transparent and colourless, with the multi-tonal image exhibited due to the variation of the array of raised elements across the surface relief structure 20. The print layer may be used to provide colour to the multi-tonal image exhibited by the surface relief structure 20, with the print layer being visible through the transparent cured material of the surface relief structure.

Thus, the print layer may be in the form of an area of uniform colour overlapping with the surface relief structure 20 such that the multi-tonal image exhibited by the surface relief structure appears coloured. In other examples, the print layer 30 may define substantially the same image elements as the raised elements of the surface relief structure, with the image elements of the print layer and the raised elements of the surface relief structure being provided in register (i.e. in overlapping alignment, or "superimposed"). As is illustrated in FIG. 17(a), the print layer 30 may be in the form of a print working that covers substantially the whole substrate 2, or at least a substantial part of it, for example 50% or more. This is particularly the case when the security document is a banknote, where a decorative print layer in the form of a lithographic print working may be provided on the substrate surface before the casting of the surface relief structure 20 in a conventional banknote production work flow. In other examples the print layer 30 may cover a smaller area than the surface relief structure 20. For example, the print layer may be laterally completely within the lateral confines of the surface relief structure.

Figure 17B:
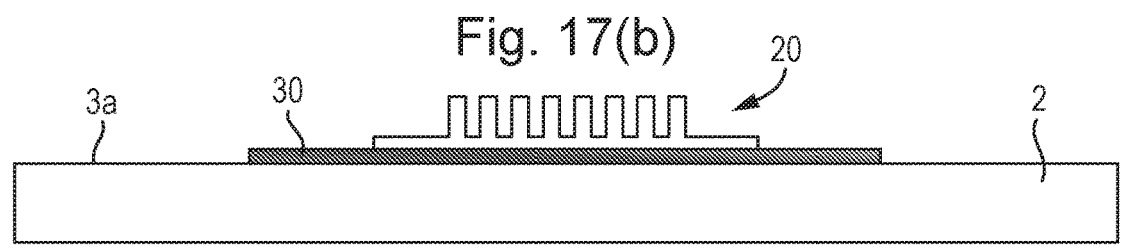
Figure 17C:
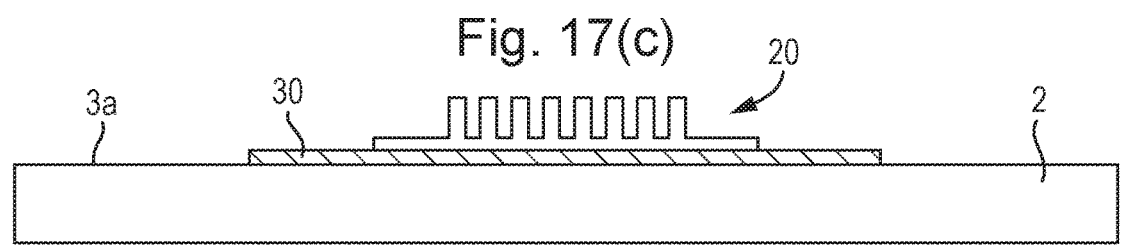

In FIG. 17(b) the decorative layer 30 is in the form of an optically variable layer, in particular a colour shifting layer, here a liquid crystal film disposed on a paper substrate 2. Similarly to the example of the print layer above, the colour shifting layer may be provided (e.g. printed) so as to define substantially the same image elements as the raised elements of the surface relief structure 20, or may be provided so as to have a different form to the surface relief structure. In FIG. 17(c) the decorative layer is in the form of a holographic foil, and again the substrate 2 is a paper substrate. It is noted that the arrangements seen in FIGS. 17(b) and 17(c) where the surface relief structures are disposed on frangible decorative layers such as liquid crystal films and holographic layers would be either very difficult or impossible to achieve using conventional intaglio printing, since the high temperatures and pressures involved in the intaglio process, together with the embossing of the substrate, would typically damage such features. Thus, the combination of the surface relief structure and decorative layer in these embodiments provides a device that is particularly difficult to counterfeit.

In the examples of FIGS. 17(a) to 17(c), the decorative layer 30 and the surface relief structure 20 are both disposed on the same surface 3a of a paper substrate. However, it is envisaged that in alternative embodiments, the decorative layer 30 and surface relief structure 20 may be provided on opposing surfaces of a transparent or translucent region of a substrate 2, such as a window or half-window region of a polymer-based substrate. In such embodiments, the surface relief structure and the decorative layer are arranged to at least partially overlap such that their combined effects may be observed at least at one observation angle.

Figure 18:
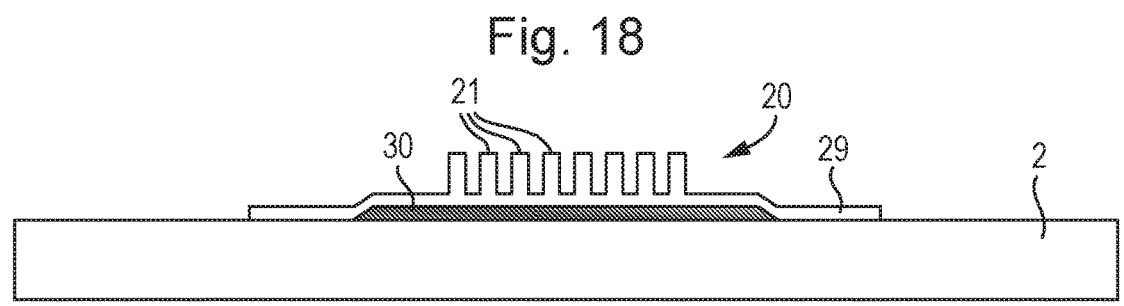

FIG. 18 shows a further embodiment which is similar to that shown in FIG. 17(b). In this embodiment, the decorative layer 30 is in the form of a colour shifting film and the surface relief structure 20 is configured so as to encapsulate the colour shifting film, i.e. completely covering the film and sealing it from the atmosphere or anything external. Here, the base layer 29 of the surface relief structure 29 laterally extends around the periphery of the raised elements 21 so as to encapsulate the decorate layer 30. In this way, the colour shifting film 30 is protected from external influences and the lifetime of the security device is prolonged. Although this embodiment is described with reference to a decorative layer in the form of a colour shifting film, it will be appreciated that the surface relief structure may be used to encapsulate and protect substantially any decorative layer. Such embodiments are particularly advantageous when the decorative layer is in the form of a metallic layer, since metallic elements are often susceptible to corrosion from alkaline components. Encapsulating the decorative layer with a surface relief structure acts as a chemical barrier, preventing alkaline materials or other corrosive materials from contacting the metal.

FIG. 19 illustrates a further embodiment of the invention in which the surface relief structure 20 may be utilised as a protective outer layer of a security document 100, in a similar manner to an outer varnish layer of a banknote for example. Here, the raised elements 21 of the surface relief structure 20 are provided so as to exhibit a multi-tonal image as discussed herein, and the base layer 29 laterally extends from the array of raised elements so as to form a protective later over the document. In this example, the security document 100 comprises a paper substrate 2 (which acts as the substrate of the device), and a plurality of decorative layers in the form of a lithographic print working 30a, a colour shifting or other optically variable layer 30b, a holographic foil 30c and a serial number 30d. The base layer 29 of the surface relief structure advantageously provides a protective layer across each of these features. In banknote production in particular, such embodiments advantageously enable the removal of the final varnishing step. In such embodiments where the base layer 29 acts as a protective layer, the surface relief structure 20 (including both the raised elements and the base layer) may be provided across at least 50% of the document substrate 2.

The base layer may be used as a primer layer for the provision of a further over layer 35, as will now be described with reference to FIG. 16. In each of the examples shown in FIGS. 20(a) to 20(d), the substrate 2 is a paper substrate, and the surface relief structure 20 comprises a base layer 29 that laterally extends from the array of raised elements 21 across the surface 3a of the paper substrate 2. As shown in FIG. 20(a), a decorative over layer 35 in the form of a print layer such as a lithographic print working may be applied to the base layer 29, where here the cured material of the base layer 29 acts as a primer allowing for improved print quality and resolution of the over layer 35 in comparison to printing directly onto the paper fibres. In the embodiment of FIG. 20(a) the over layer 35 is applied to the base layer only, but as shown in FIG. 20(b) it could be applied to both the base layer 29 and the tops of the raised elements 21. In yet further embodiments the over layer 35 may be provided only to the tops of the raised elements (i.e. not on any base layer surrounding the raised elements 21). In some embodiments, the over layer 35 that is applied to the base layer 29 and/or the raised elements 21 may extend on to the surface 3a of the substrate 2.

The embodiments shown in FIGS. 20(c) and 20(d) are similar to those of 20(a) and 20(b) except the over layer is in the form of a colour shifting film in FIG. 20(c), and in the form of a holographic foil in FIG. 20(d).

Figure 21A:
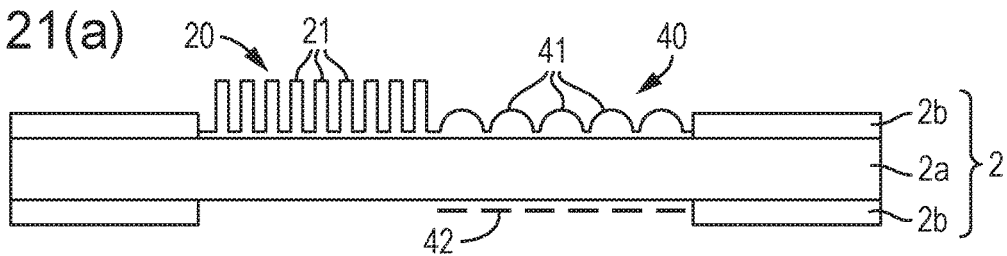

It is also possible to utilise the surface relief structure 20 to provide one or more additional security features, as will now be described with reference to FIG. 21. In FIG. 21(a), as well as the array of raised elements 21 defining image elements of a multi-tonal image, the surface relief structure 20 also comprises an array of focussing elements 41, such as lenses, laterally offset from the raised elements 21. The focussing element array may have one-dimensional periodicity (e.g. cylindrical elements) or two-dimensional periodicity (e.g. spherical or aspherical elements). In this example the device is provided within a transparent window region of the substrate 2, defined by the localised absence of the opaciyfing layers 2b on both sides of the core transparent substrate 2a. On the opposing side of the core substrate 2a to the array of focussing elements 41, a microimage array 42 is provided substantially in the focal plane of the focussing element array. The microimage array 42 and the array of focussing elements 41 cooperate with each other to provide an optically variable effect (such as a lenticular effect, moiré magnification effect or integral imaging effect), thereby defining a second security device 40 that is laterally offset from (here substantially abutting) the plurality of raised elements. Thus, the security device as a whole will exhibit a static multi-tonal image in the region of the raised elements 21 (as before), as well as an optically variable effect that is laterally offset from the static image.

Figure 21B:
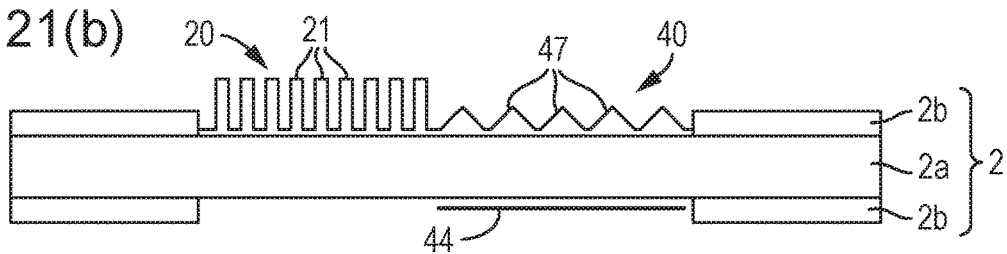

FIG. 21(b) shows a similar embodiment in which the surface relief structure comprises an array of substantially refractive microstructures 47 (in this example linear microprisms) that is laterally offset from the plurality of raised elements. The array of refractive microstructures 47 may define a security device in itself. However, in this example an optically variable colour shifting layer 44 is provided on the opposing surface of the transparent core substrate 2a to the array of microprisms. The colour shifting layer 44 and the array of microstructures 47 cooperate together to exhibit an optically variable effect that is visible laterally adjacent (here substantially abutting) to the static multi-tonal image exhibited by the array of raised elements 21.

Figure 21C:
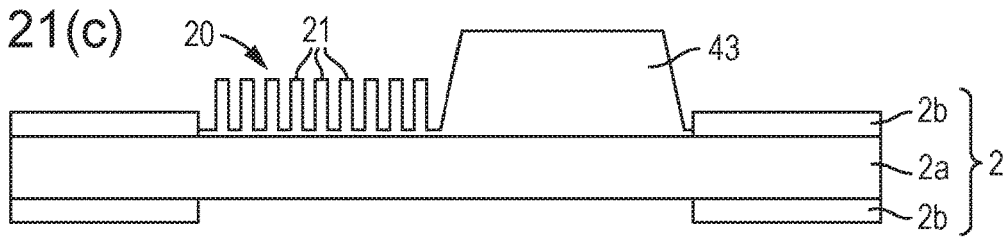
Figure 21D:
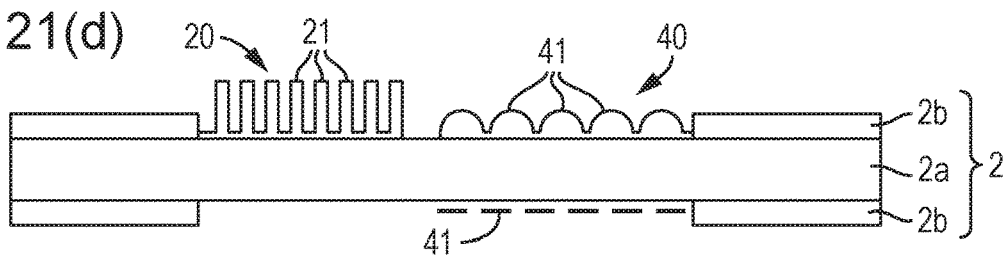
Figure 21E:
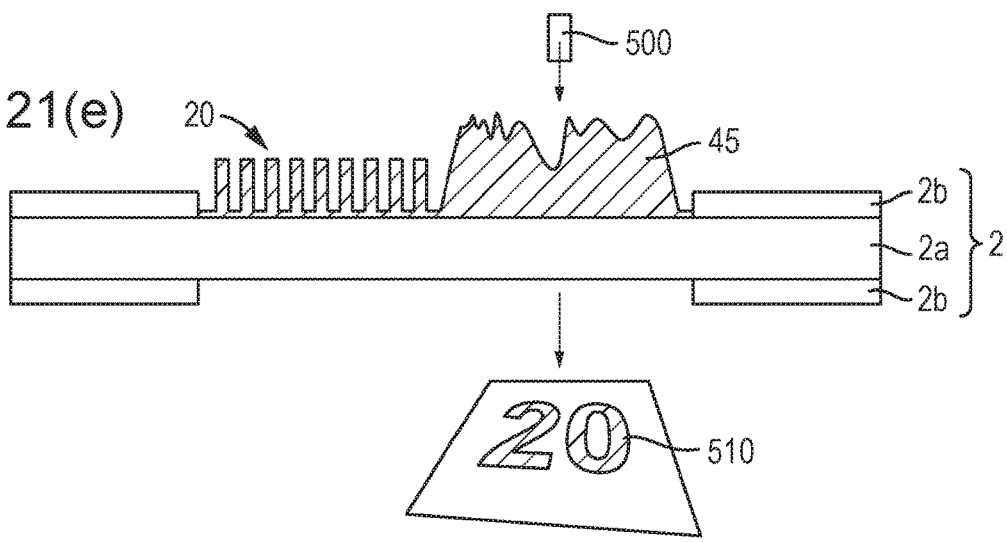

In FIG. 21(c), the device is again provided within a window region of a document substrate. Here, the surface relief structure further comprises a macrostructure 43 that is laterally offset from the plurality of raised elements 21. The macrostructure is formed from the same cured material as the plurality of raised elements, and the reflective nature of the material enables the viewer of the device to perceive the structure, which may be in the form of indicia such as an alphanumerical character. The macrostructure 43 may also be used to advantageously provide further tactility to the device.

FIG. 21(*d*) is similar to FIG. 21(*b*), except that the laterally offset second security device 40 is spaced from the surface relief structure 20 defining the array of raised elements by a region that is absent of cured material, and are separate surface relief structures.

In FIG. 21(*e*), the surface relief structure 20 further comprises a caustic element 45. Such a caustic element 45 is a reflective or refractive light-directing relief structure configured to redirect light from a light source (here shown at 500) to thereby project a caustic image (shown at 510). A caustic image is the visualisation of the envelope of light rays reflected or refracted by a curved surface or object, here provided by the caustic element 45. That is, the relief structure 45 includes one or more curved surfaces, configured as necessary to give rise to the desired caustic image. The caustic image may be a real image or a virtual image. In this embodiment, surface relief structure 20 is provided in a window region of the document substrate 2 and the caustic image is projected, via refraction from the surface of the caustic element 45, on the opposing side of the document substrate 2 to the illumination source 500. The caustic image may in general take any desired form, such as defining alpha-numeric text, one or more symbols, a logo, a portrait or another graphic.

In the examples of FIGS. 21(*a*) to 21(*e*), the security device as a whole will exhibit the static multi-tonal image in a first region thereof, and exhibit a second optical effect in a second region that is laterally abutting or laterally spaced from the first region. The first and second optical effects may or may not be related to each other. For example, both the multi-tonal image exhibited by the array of raised elements 21 and a moiré effect exhibited by the second device could display a banknote denomination, e.g. £50. In a variant of these embodiments, the first and second regions may be interleaved with each other across the device, as illustrated in FIG. 21(*f*); in this case the raised elements 21 being interleaved with an array of focussing elements 41. This will give rise to the visual impression of the multi-tonal image being superimposed on an optically variable background. It should be noted that in practice the relative sizes of the lenses and raised elements 21 will typically be such that there are many lenses between each raised element.

It is possible to form a device using two or more cured materials, which may have different optical characteristics from one another (e.g. different visible colours). The two or more cured materials will typically be laterally offset from one another (preferably non-overlapping). If they abut one another so as to produce a continuous body of cured material these will be consider to form one and the same surface relief structure whereas if they are spaced from one another these will be separate surface relief structures. Either approach can be employed in embodiments of the invention, as schematically illustrated in FIGS. 22(*a*) to 22(*d*).

FIG. 22(*a*) illustrates an intermediate step in the manufacture of an eventual security device, with a cross-section through the eventual security device shown in FIG. 22(*b*). FIG. 22(*a*) shows the two materials 20*a*' and 20*b*' applied to the first surface 3*a* of the substrate 2, in their uncured state and laterally offset and spaced from each other. The first curable material 20*a*' has a tint of a first colour, e.g. blue, and the second curable material 20*b*' has a tint of a second colour, e.g. red. The curable materials 20*a*', 20*b*' are each formed into the desired surface relief structures 20-1, 20-2 to define raised elements 21 corresponding to the image elements of a multi-tonal image.

In FIG. 22(*c*) the two uncured materials 20*a*' and 20*b*' are applied to the first surface 3*a* of the substrate 2 in an overlapping manner so as to form a region R in which the two overlapping regions mix to form a third colour (e.g. purple). One way of achieving this is via inkjet printing of two uncured resins next to and overlapping each other. The curable materials 20*a*', 20*b*' are then formed into the desired single surface relief structure 20 that exhibits three regions A, B and C of different colour corresponding to the mixing of the two materials 20*a*' and 20*b*' in their uncured state.

In the embodiments discussed so far, the surface relief structure(s) have each been formed on the same (i.e. common) surface of the substrate 2. However, it is also possible for the security device to comprise two or more surface relief structures located on opposing sides of the substrate 2, as will now be described with reference to FIGS. 23 to 25. FIG. 23(*a*) illustrates a security device 10 disposed in a full window region of a substrate 2 defined by the localised absence of the opacifying layers 2*b* covering transparent core substrate 2*a*. The security device 10 comprises a first surface relief structure 20-1 formed on a first surface 3*a* of the substrate, and a second surface relief structure 20-2 formed on the opposing second surface 3*b* of the substrate 2 and partially overlapping with the first surface relief structure 20-1. The cured materials of the two surface relief structures in this example have the same optical properties (e.g. transparent and colourless or carrying the same colour tint), but in other examples may have different optical properties. Thus, a viewer observing the device in transmission along the viewing direction D will see a multi-tonal image with different tones exhibited due to the variation in the parameters of the raised elements across the two surface relief structures 20-1 and 20-2.

In FIG. 23(*a*), the surface relief structures 20-1 and 20-2 are positioned such that in the region of overlap between the two structures 20-1 and 20-2, the raised elements of the two structures are registered to each other. In other words, the raised elements 21-1 of the first surface relief structure 20-1 are in overlapping alignment with the raised elements 21-2 of the second surface relief structure 20-2, as indicated at z. When viewing the device 10 along the viewing direction D, the raised elements 21-1, 21-2 exhibit image elements 11 of varying optical density (and therefore tone), as shown in the accompanying plan view of the device. Here the image elements 11 are in the form of line elements appearing in different tones dependent on the amount of cured material the light has passed through, as well as any differences in reflection dependent on the viewing angle.

The device 10 illustrated In FIG. 23(*b*) is the same as that shown in FIG. 23(*a*) except that the two surface relief structure 20-1 and 20-2 are positioned such that the raised elements of one structure are registered with the troughs (e.g. the region of base layer extending between the raised elements) of the opposing structure. In other words, the raised elements of the first surface relief structure 20-1 are in overlapping alignment with the troughs of the second surface relief structure 20-2, as indicated at z. When viewing the device 10 in plan view as illustrated, the region of the device where the raised elements overlap (shown at A) will appear in a substantially uniform optical density (and therefore tone) due to the uniform thickness of the overlapping cured material in this region. The region of the device laterally outside region A will exhibit different tones due to the varying thickness (and therefore optical density) of the cured material. FIG. 23(c) illustrates a device 10 that is identical to the one shown in FIG. 23(b) but in which both surface relief structure 20-1 and 20-2 have a thicker base layer (29-1, 29-2). Thus, the variation in optical density will vary in the corresponding manner to that of FIG. 23(b) except that the optical density will be greater due to the increased thickness of the base layer.

In such embodiments in which the device comprises two or more overlapping surface relief structures arranged on opposing surfaces of the substrate 2, each individual surface relief structure may or may not exhibit multi-tonal image elements. However, when viewed together, the combined parameters of the raised elements of the surface relief structures varies such that at least at one viewing angle (i.e. viewing the device along a particular viewing direction), the device exhibits a multi-tonal image. Viewing the device at different viewing angles may exhibit different versions of the multi-tonal image due to the parallax effect generated by the thickness of the substrate. This variation of the exhibited image with viewing angle may be utilised as a further security feature of the device.

The cured material of the surface relief structures on the opposing surfaces 3a, 3b of the substrate need not have the same optical characteristic (e.g. colour). FIG. 24 illustrates an example of a device 10 according to the invention in which the first surface relief structure 20-1 disposed on the first surface 3a of the substrate has a different coloured tint (e.g. blue) to the second surface relief structure 20-2 disposed on the opposing surface 3b (e.g. red). In this embodiment the two surface relief structures are fully overlapping and the raised elements 21-1 of the first surface relief structure 20-1 are registered with the raised elements 21-2 of the second surface relief structure 20-2. The security device is located within a transparent window region of the substrate 2 and when viewed in transmission along the viewing direction D, the device exhibits dark purple image line elements 11 against a lighter purple background due to the lower thickness of the base layers 29-1, 29-2 compared to the raised elements 21-1, 21-2.

Figure 25A:
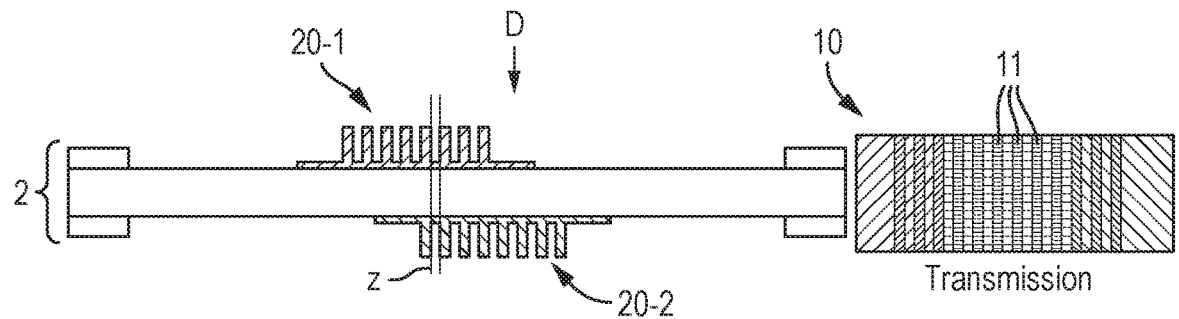
Figure 25B:
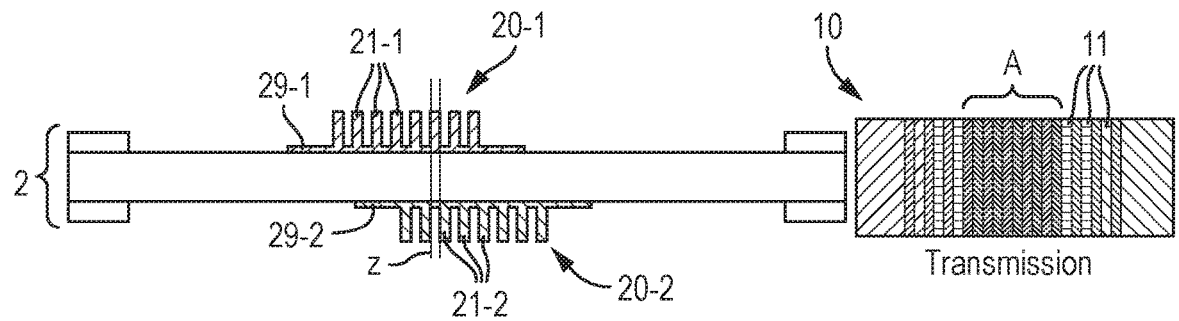
Figure 25C:
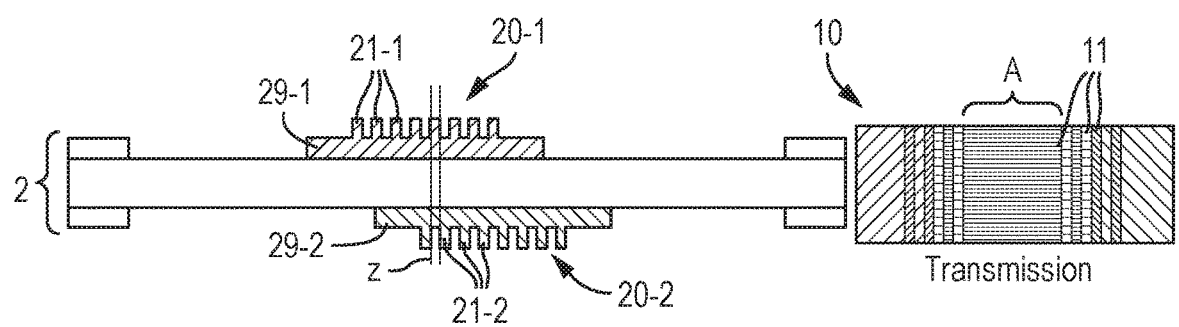

FIGS. 25(a) to 25(c) illustrate the same devices 10 as described with relation to FIGS. 23(a) to 23(c), but in which the first surface relief structure 20-1 carries a tint of a first colour (e.g. blue) and the second surface relief structure 20-2 carried a tint of a second, different colour (e.g. red). The use of different colour cured materials provides further complexity, with the device exhibiting a multi-coloured, multi-tonal image. For example, whereas region A in FIG. 23(b) appeared as a region of substantially constant optical density (and therefore tone), in the device of FIG. 25(b) the corresponding region A exhibits image elements 11 of different colour due to the different amounts of tinted resin being "mixed" when viewing in transmission. In the example of FIG. 25(c), the thicknesses of the base layers 29-1, 29-2 are substantially equal to the heights of the raised elements 21-1, 21-2 above the base layer. Consequently, region A appears as a substantially uniform colour (e.g. purple).

It will be appreciated that the surface relief structures illustrated in FIG. 23 to are highly schematic, and in practice the degree of overlap and registration properties between the raised elements of the structure will typically be more complex. The degree of registration may be on the scale of the individual elements as described above (e.g. raised elements registered to each other), or could be on the "macro" scale, e.g. where the lateral confines of the surface relief structures are in overlapping alignment.

Figure 26:
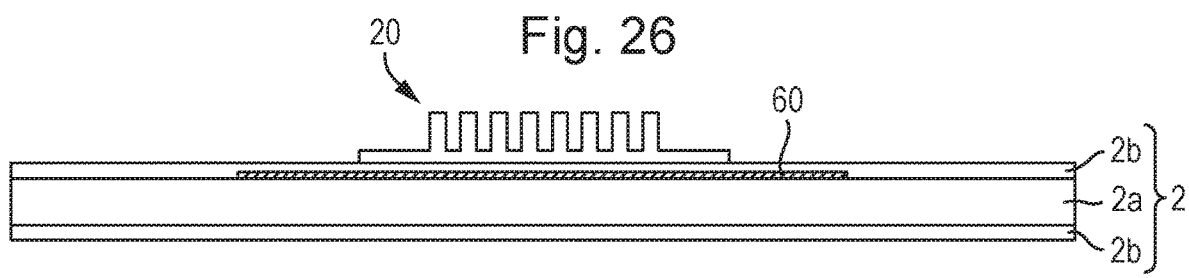
FIG. 26 illustrates a security device according to the invention in which the substrate comprises an integral decorative mark.

In a development of the invention, further complexity can be achieved by additionally providing an integral decorative mark 60 in the substrate 2, as schematically shown in FIG. 26. Decorative marks are formed during manufacture of a document substrate, rather than being applied to the substrate during later processing thereof (as with the decorative layers described with reference to FIG. 13). Typically, a decorative mark may be integrated into a multilayer polymer document substrate during the same process as that which applies the opacifying layer 2b to the core substrate 2a, e.g. via gravure printing. Thus, the integral decorative mark 60 will be in precise register with the opacifying layers 2b and particularly any window regions or half-window regions they define. Such decorative marks can be incorporated into security devices of the sort herein disclosed, by arranging the surface relief structure(s) to partially or fully overlap the decorative mark 60 or otherwise interact with it (e.g. appearing to abut, surround or interlock with the decorative mark). Some further examples of security devices 10 incorporating decorative marks 60 will now be described with reference to FIGS. 27 to 32.

Figure 27A:
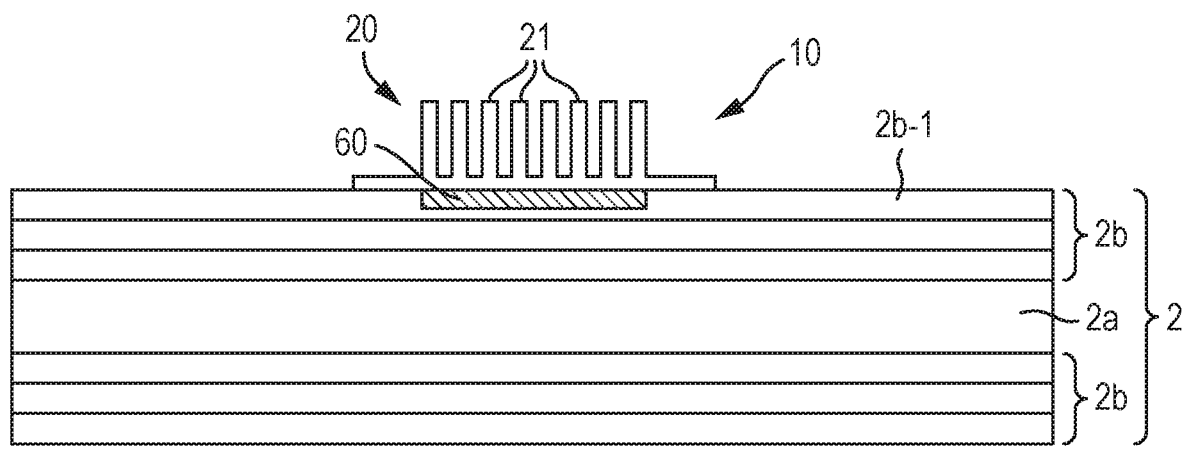
FIGS. 27 to 30 show further security devices in which the substrate comprises an integral decorative mark, illustrating different arrangements for the decorative mark.
Figure 27B:
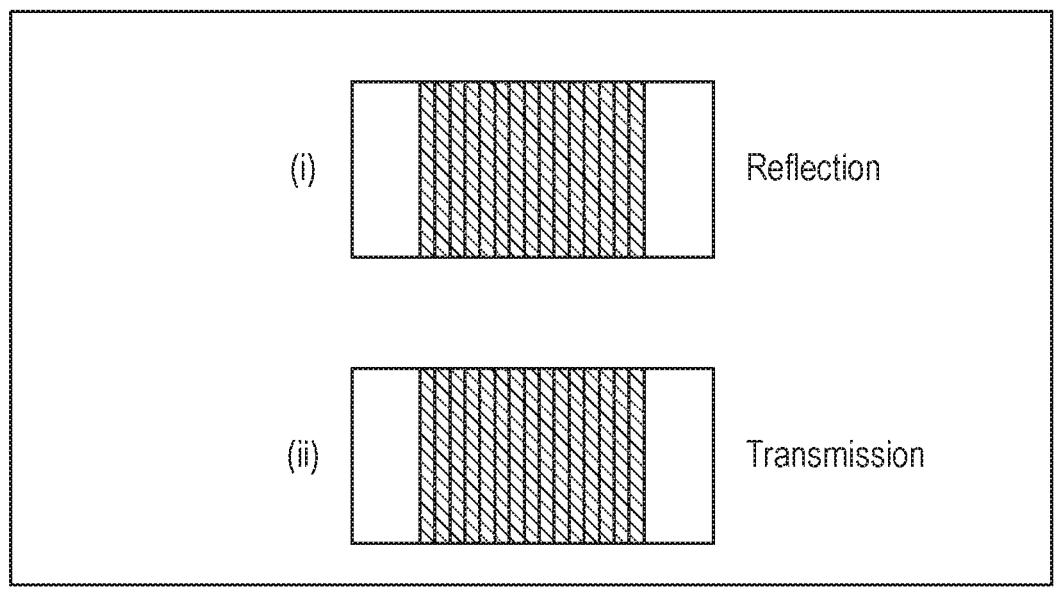
Figure 28A:
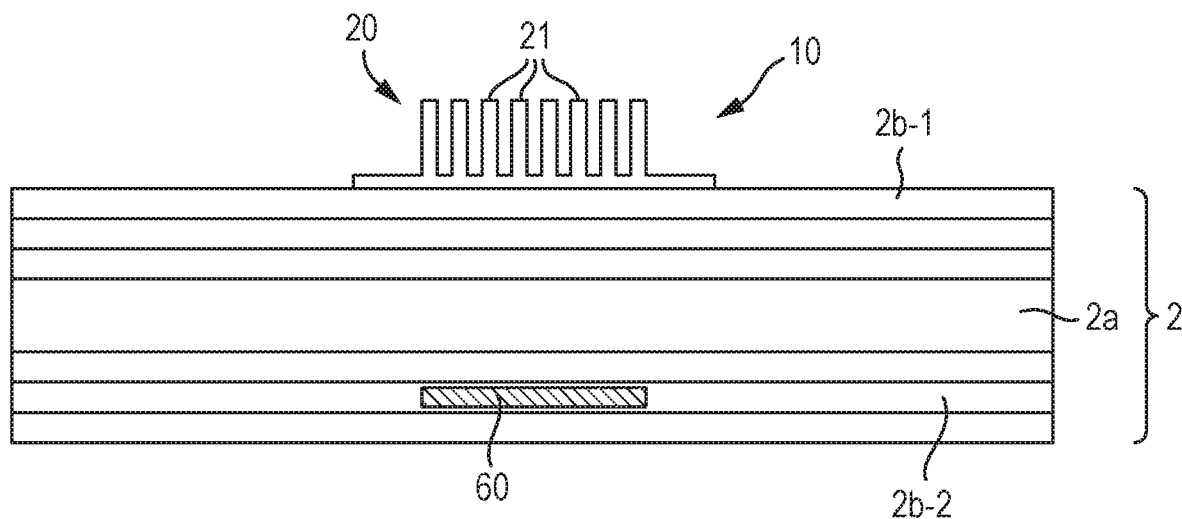

FIGS. 27 and 28 show cross-sectional views through a security device formed on a document substrate 2 having a decorative mark 60, showing different positioning arrangements for the decorative mark 60. In both examples, the security device 10 comprises a surface relief structure 20 formed of a transparent, colourless cured material and having an array of raised elements 21 in accordance with image elements and that vary in one or more parameters across the surface relief structure so as to exhibit a multi-tonal version of the image, as previously discussed. The decorative mark 60 is formed of a semi-transparent coloured ink (e.g. carrying a red tint), and overlaps with the raised elements 21 of the surface relief structure so as to impart colour to the exhibited multi-tonal image. The substrate 2 is a multi-layer substrate that comprises a transparent core substrate 2a such as BOPP, and a plurality of ink layers on either side of the core substrate. In this example, each of the ink layers are opacifying layers 2b. In FIGS. 27 and 28, the decorative mark 60 is formed by gravure printing in line with the provision of the opacifying layers, although the decorative mark may alternatively be formed by other printing methods.

In the device of FIG. 27, the decorative mark 60 is formed in line with the outermost opacifying layer 2b-1 on which the surface relief structure 20 is disposed. Thus, when viewing the device from the side of the surface relief structure in either reflected light or transmitted light (the opacity of the opacifying layers being low enough for viewing in transmitted light), the multi-tonal image exhibited by the raised elements 21 of the surface relief structure will appear red due to the contribution of the decorative mark 60, as illustrated in FIGS. 27(b)(i) and 27(b)(ii).

Figure 28B:
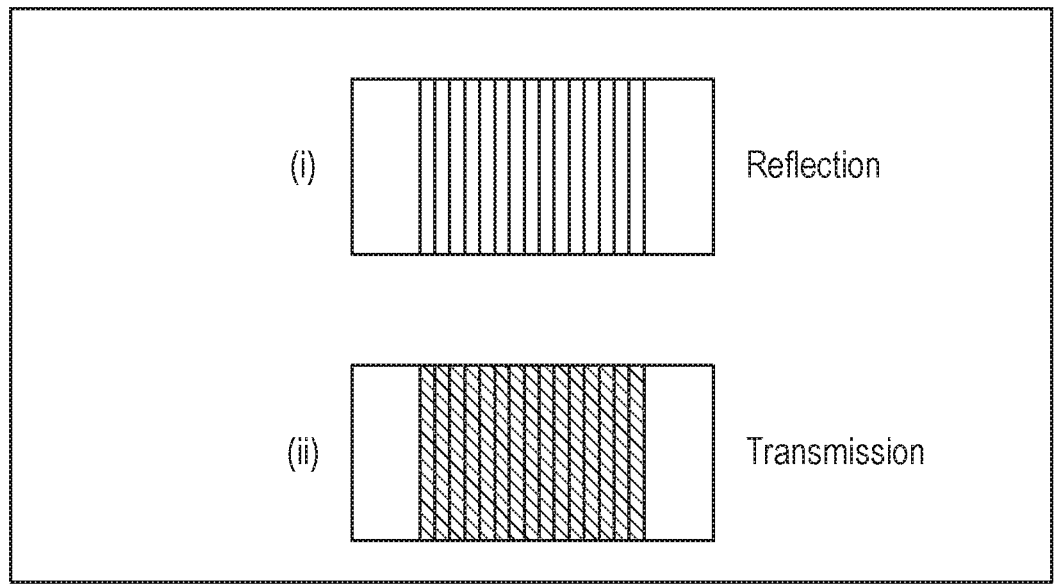

In the device illustrated in FIG. 28, the decorative mark 60 is formed in line with the provision of opacifying layer 2b-2 which is on the opposing side of the core substrate 2a to the surface relief structure 20, and consequently at least one opaciyfing layer 2b is present between the decorative mark 60 and the surface relief structure. When the device is viewed in reflected light from the side of the surface relief structure 20, the surface relief structure will exhibit the multi-tonal image that appears colourless (or the colour of the opacifying layer 2b-1 on which the surface relief structure is disposed) due to the transparent and colourless properties of the cured material (FIG. 28(b)(i)). However, when viewed in transmitted light, the contribution from the decorative mark 60 will be visible and the multi-tonal image will exhibit a red colour (FIG. 28(b)(ii)).

Figure 29A:
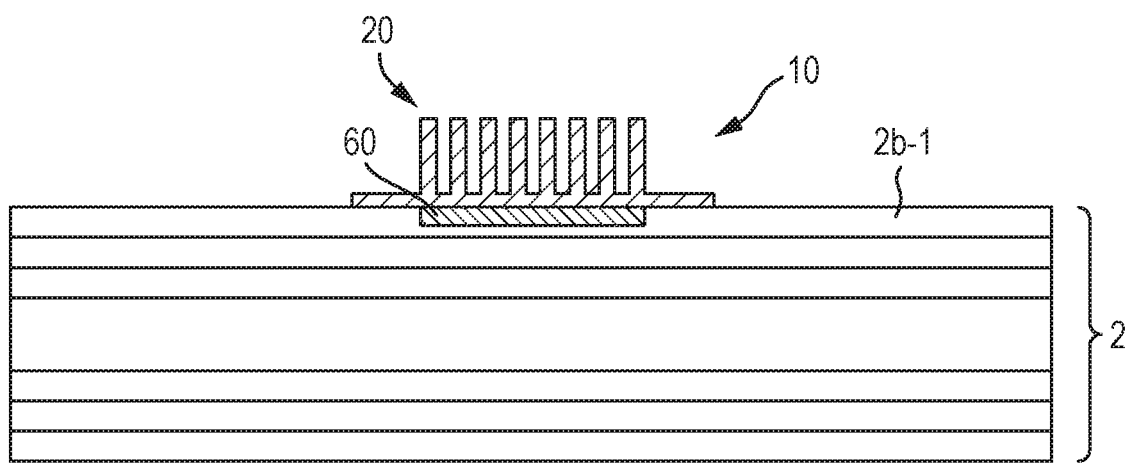
Figure 29B:
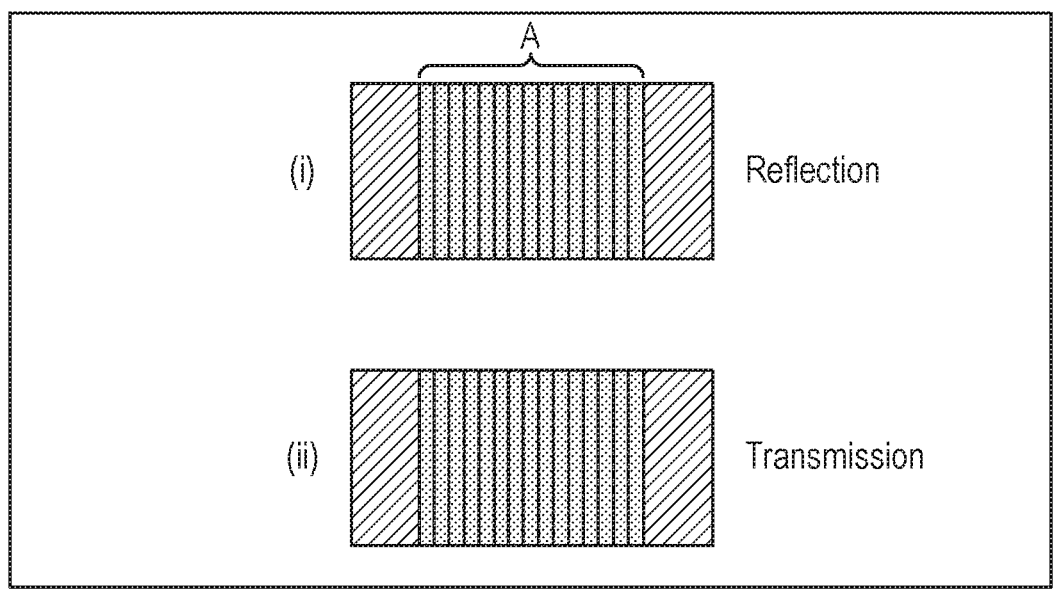
Figure 30A:
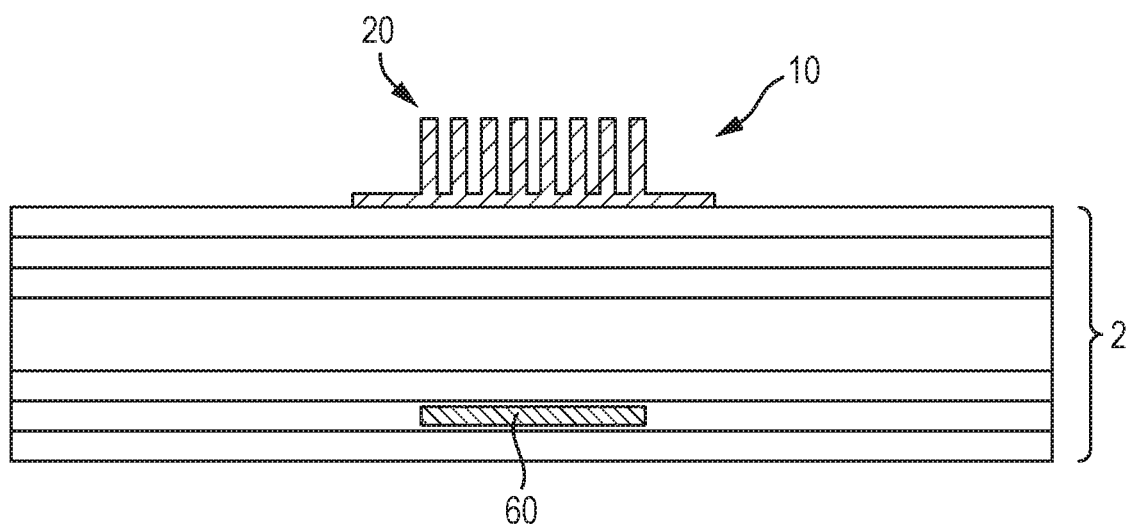

FIGS. 29 and 30 illustrate a further development of the embodiments shown in FIGS. 27 and 28, where the cured material of the surface relief structure carries a coloured tint. In the examples of FIGS. 29 and 30, the cured material of the surface relief structures 20 is semi-transparent and carries a blue tint. As with FIG. 27, in FIG. 29, the decorative mark 60 is formed in line with the opacifying layer 2b-1 on which the surface relief structure 20 is formed. Consequently, the colour contributions from both the decorative mark 60 and the cured material of the surface relief structure 20 are visible when viewing the device (from the side of the surface relief structure) in either reflected or transmitted light. In reflected light, the region A in which the decorative mark 60 overlaps with the surface relief structure exhibits a purple colour, with the non-overlapping regions appearing in the blue tint carried by the cured material. The same effect is exhibited when the device is viewed in transmitted light, as illustrated in FIGS. 29(b)(i) and 29(b)(ii).

Figure 30B:
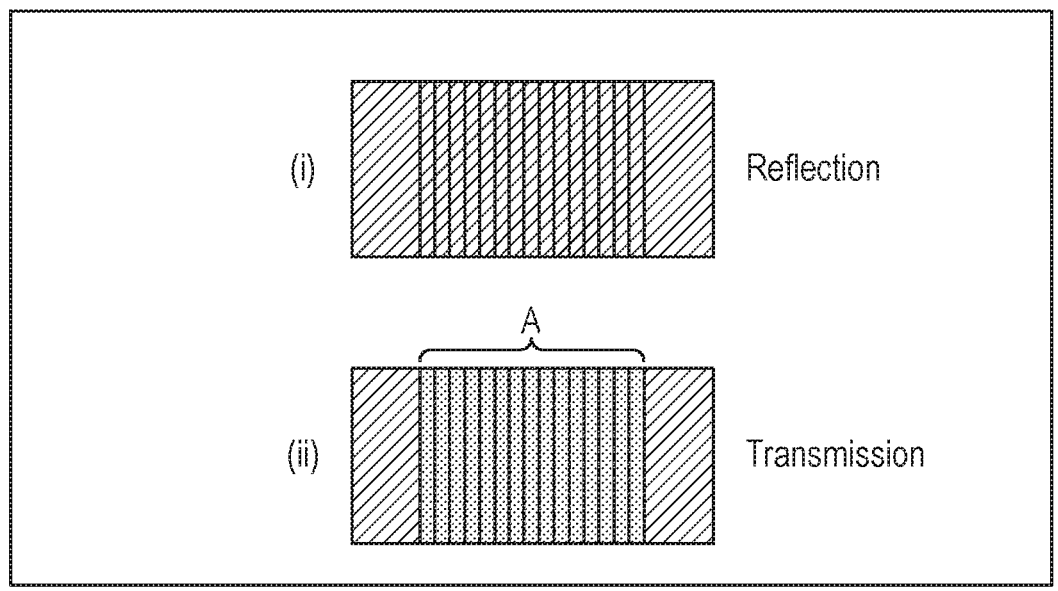

In the device of FIG. 30, at least one opacifying layer 2b is present between the decorative mark 60 and the surface relief structure 20, and therefore the colour contribution from the decorative mark 60 is only visible when viewing the device in transmitted light (FIG. 30(b)(ii)), where the region of overlap (A) between the surface relief structure 20 and the decorative mark 60 appears in a purple colour. In reflected light (FIG. 30(b)(i)), the viewer observes the multi-tonal image in a blue colour corresponding to the blue tint of the cured material forming the surface relief structure.

In the examples of FIGS. 27 to 30, the decorative mark 60 is in register with the surface relief structure such that substantially the entire multi-tonal image defined by the raised elements of the surface relief structure appears in a colour at least partly dependent on the colour of the decorative mark. However, it will be appreciated that in some embodiments the decorative mark 60 may not be registered to the surface relief structure (e.g. partially overlapping), for example such that only a portion (e.g. half) of the multi-tonal image is exhibited in the colour of the print layer, at least under some viewing conditions.

Figure 31A:
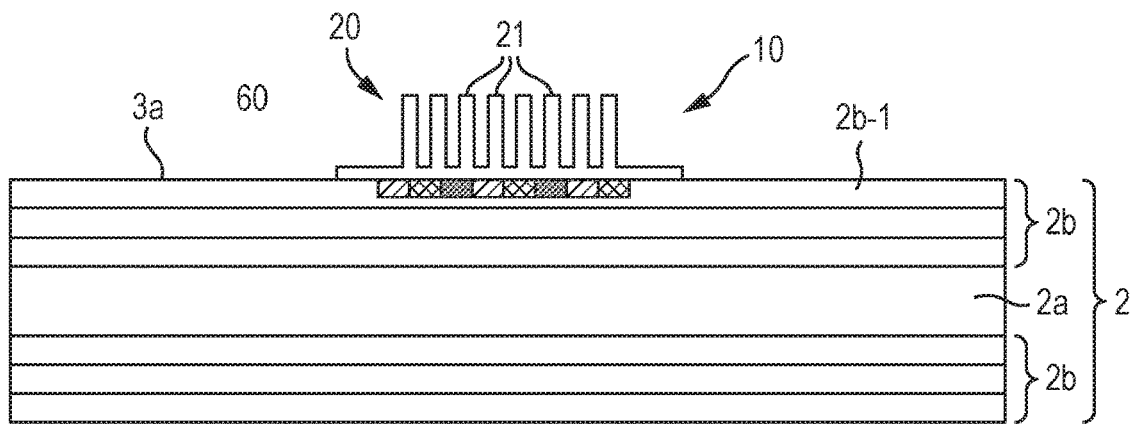
FIG. 31(a) illustrates a security device wherein the substrate comprises an integral full colour decorative mark.
Figure 31B:
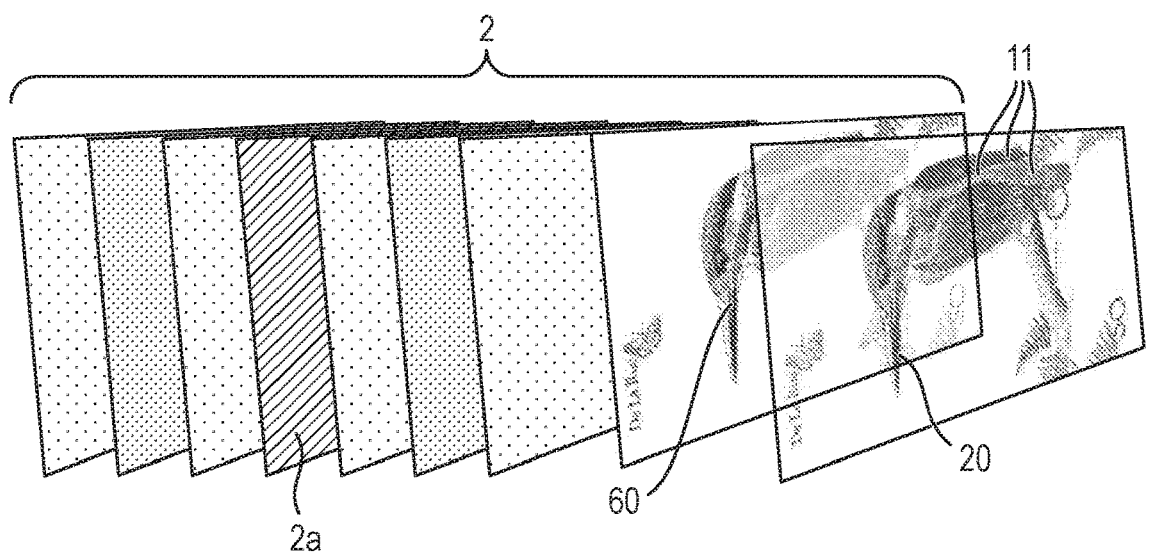
FIG. 31(b) is an exploded diagram illustrating the various layers of the device.

Further complexity (and thus an enhanced security level) can be provided to the security device if the print layer 60 is in the form of a coloured (e.g. mono-colour or multi-colour) version of the multi-tonal image exhibited by the surface relief structure 20. FIG. 31(a) is a cross-sectional view of a security device according to such an embodiment of the invention. Again, the substrate 2 is a multi-layer substrate comprising a transparent core substrate and a plurality of opacifying layers 2b on each side thereof. A decorative mark 60, which could be a full colour (e.g. RGB or CMYK) image is applied using the same print process used to provide the opacifying layers, which is typically gravure printing. For instance, the opacifying layers 2b and the decorative mark 60 may be applied on one and the same gravure press. The surface relief structure 20 is formed on the first surface 3a of the substrate 2 in register with the decorative mark 60 so that the two are in good alignment. In this example the cured material of the surface relief structure is transparent and colourless, and the raised elements 21 define image elements of the same image exhibited by the decorative mark 60. This is shown more clearly in FIG. 31(b) which is an exploded view of the device shown in FIG. 31(a). As seen in FIG. 31(b), in this example the decorative mark 60 is a full colour image of a kingfisher, with the raised elements 21 of the surface relief structure 20 defining image elements 11 of the same image. Thus, when viewing the device 10 from the side of the surface relief structure 20, the observer will see a full-colour multi-tonal version of the image. However, the decorative mark need not define a full-colour version of the image, and could instead display a mono-colour version of the image for example. The inherent tactility of the surface relief structure 20 due to the raised elements provides further security to the device. Such embodiments of the present invention that exhibit a (e.g. full-colour) multi-tonal image with tactility are particularly advantageous, since registration of cast-cured surface relief structures to gravure prints is better than registration of intaglio to gravure due to the deformation of the substrate that occurs during the intaglio process.

Figure 32:
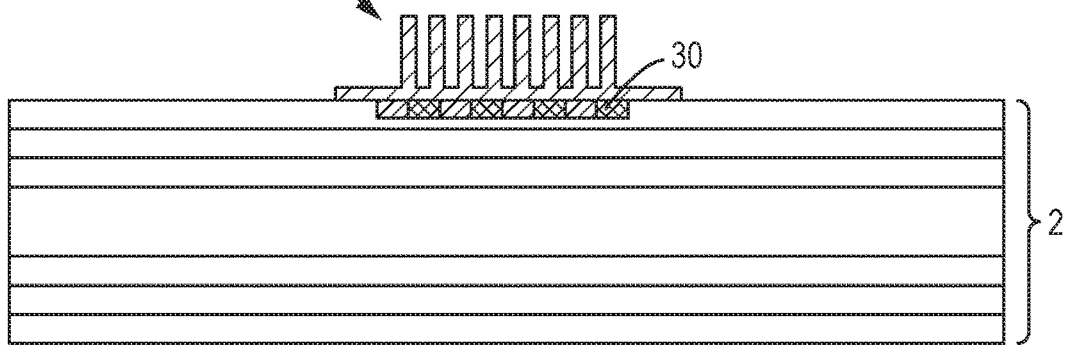
FIG. 32 illustrates a further embodiment of a security device according to the invention.

In FIG. 31, the cured material of the surface relief structure is colourless, with all of the colour components (e.g. red, green and blue components for RGB colour or cyan, magenta, yellow and black for CMYK) being provided by the decorative mark 60. In further embodiments as schematically illustrated in FIG. 32, the cured material of the surface relief structure 20 may provide a colour component of the colour image. For example, in FIG. 32 RGB colour rendering is used, with the cured material of the surface relief structure carrying a blue tint. Thus, the decorative mark 60 is formed with the red and green colour components such that when the decorative mark 60 and the surface relief structure are viewed together the full RGB information is exhibited.

In FIGS. 31 and 32 the surface relief structure 60 is provided directly over the decorative mark 60, such that substantially the same visual effect is observed when viewing the device from the side of the surface relief structure in either reflected light or transmitted light. However, in other embodiments, the decorative mark may be provided within the substrate such that at least one opacifying layer is present between the decorative mark and the surface relief structure, whereby the device exhibits different effects in reflected light and transmitted light. In general, the decorative mark 60 may be formed as a single decorative mark (e.g. as shown in FIGS. 31 and 32) or could be formed as multiple decorative marks at varying locations within the substrate, which may give rise to different visual effects in reflected and transmitted light.

Whilst gravure printing for the provision of the decorative mark 60 is strongly preferred, the decorative mark could be formed via other methods such as flexographic, lithographic, screen or inkjet printing.

In general, the security device 10 of the present invention may be provided within a window region, half-window region or a non-window region of the substrate (or a combination thereof), and some examples of possible configurations are shown in FIGS. 34 to 36.

Figure 34A:
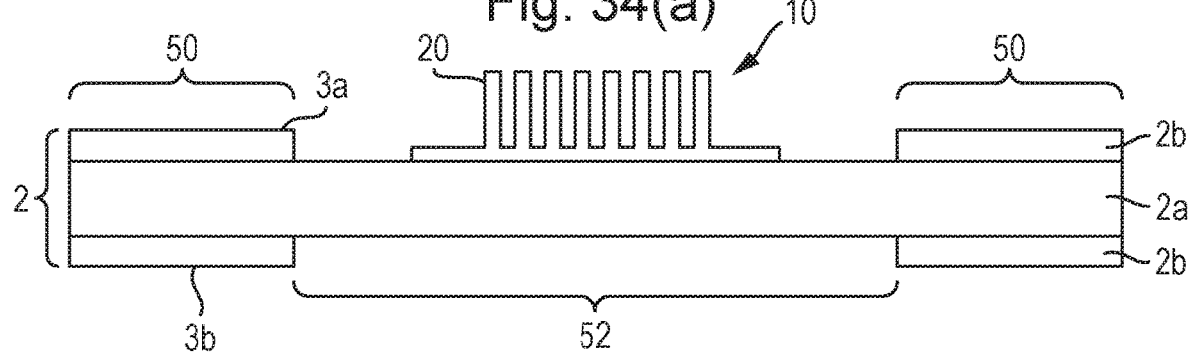

In each of FIGS. 34(a) to 34(d), the substrate 2 is depicted as a multilayer substrate comprising a transparent core substrate 2a of a polymer such as BOPP with opacifying layers 2b arranged on each side thereof. FIG. 34(a) depicts a security device 10 arranged in a window region 51 of the substrate 2, i.e. where both opacifying layers 2b are absent so that the substrate is locally transparent. Regions of the substrate 2 having its standard, base level of opacity are referred to as non-window regions 50. In the examples shown, this corresponds to regions where both the opacifying layers 2b on the two sides 3a, 3b of the substrate are uniformly present. In FIG. 34(a), the window region 51 is surrounded by non-window regions 50. In these non-window regions the substrate 2 has its highest level of opacity.

Figure 34B:
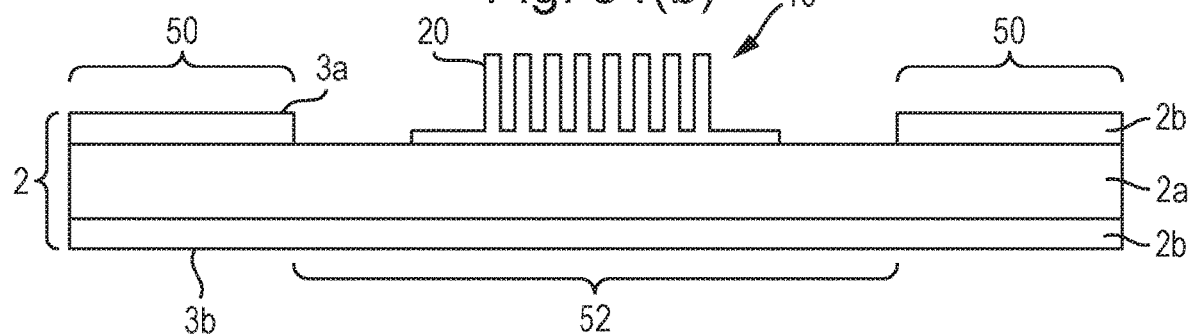

In FIG. 34(b), the device 10 is located in a half-window 52, i.e. where one of the opacifying layers 2b is absent and the other present. Thus, the half-window region 52 is translucent rather than transparent, and has a lower opacity than the surrounding non-window regions 50. In this example, the half window region 52 is formed by locally omitting the opacifying layer 2b on the first surface 3a of the substrate so that the surface relief structure is formed directly on the surface of transparent core substrate 2a (optionally via a primer layer or other surface treatment). The reverse arrangement is shown in FIG. 34(c), where the half-window is formed by retaining the opacifying layer on the first surface 3a of the substrate and omitting it from the second surface 3b.

FIG. 34(d) illustrates a security device located within a non-window region 50 of the substrate 2. The non-window region may be opaque if desired, in which case the multitonal image exhibited by the surface relief structure will be visible in reflected light only. In some embodiments (for example embodiments where a decorative mark is used) it may be desirable that the non-window region 50 in which the security device is located has a sufficiently low level of opacity such that the security device 10 may be viewed in transmitted light. Standard polymer banknote substrates and conventional paper banknote substrates typically meet this requirement.

FIG. 34(e) schematically illustrates a more complex example, in which the same surface relief structure 20 is formed across different regions of the substrate 2. Here, the surface relief structure in the form of a continuous block of cured material comprises three laterally separate regions of raised elements (shown generally at A, B and C), joined by the base layer 29. In this example, the raised elements of region A are disposed in half-window region 52; the raised elements of region B are disposed in window region 51; and the raised elements of region C are disposed in non-window region 50.

As mentioned, more than one opacifying layer may be present on each side of the core substrate in order to provide the desired level of opacity.

Figure 35A:
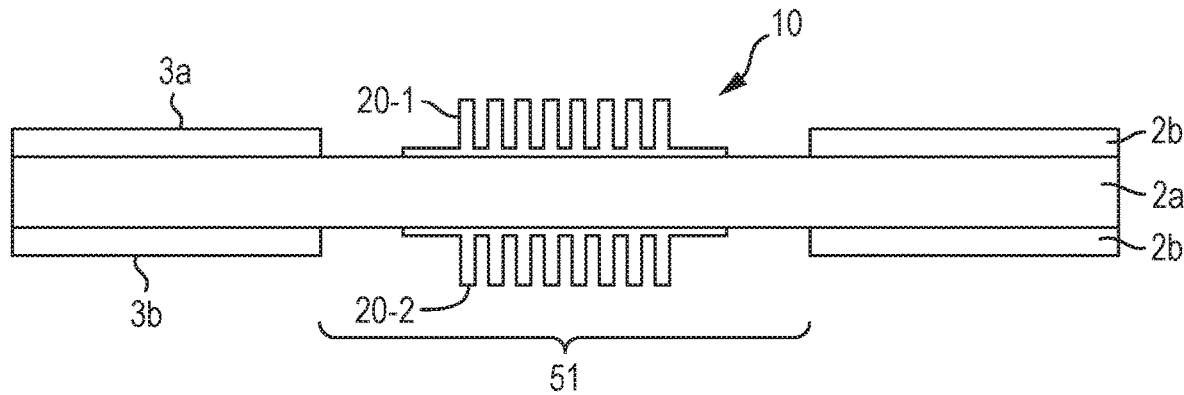
FIGS. 35(a) to 35(c) show, in cross-section, further embodiments of security devices according to the invention.
Figure 35B:
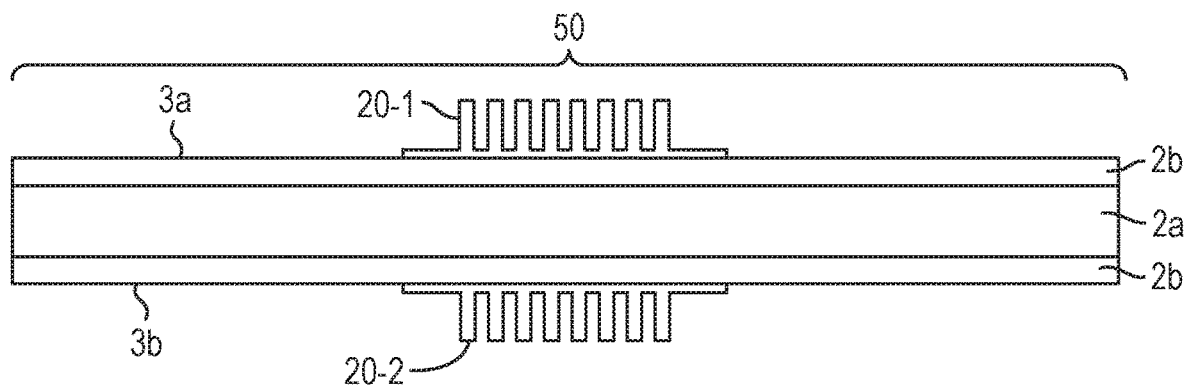

In embodiments in which the security device 10 comprises surface relief structures 20-1 and 20-2 on opposing sides 3a, 3b of the substrate that together in combination exhibit a multi-tonal image, it is preferred that the surface relief structures are formed in a full window region 51 of the substrate 2, as shown in FIG. 35(a). However, such devices may alternatively be formed in half-window regions or even non-window regions 50 of the substrate (as shown in FIG. 35(b)) provided that the opacity of the substrate in the non-window region is low enough for the two surface relief structures to be viewed simultaneously in transmitted light. More typically however, the two surface relief structures 20-1 and 20-2 provided in a non-window region as shown in FIG. 35(b) would be intended to be viewed individually in reflection from their respective sides of the substrate 2, and define security devices in their own right.

Figure 35C:
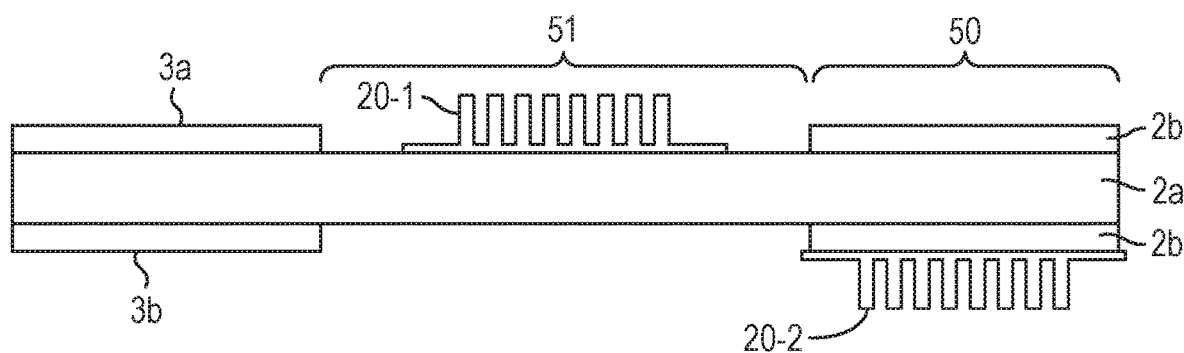

FIG. 35(c) illustrates another possible arrangement of two surface relief structures 20-1, 20-2 disposed on opposing sides of the substrate 2. Here the two surface relief structures define separate security devices, with surface relief structure 20-1 disposed in a window region 51 on the first surface 3a of the substrate and surface relief structure 20-2 disposed in a non-window region 50 on the opposing surface 3b of the substrate.

Figure 36A:
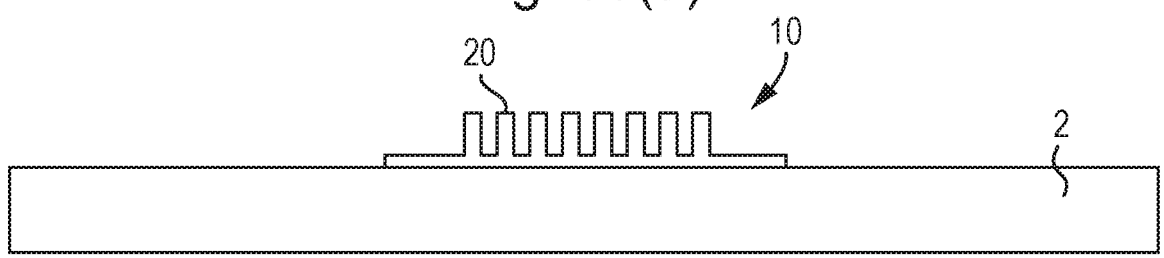
FIGS. 36(a) and 36(b) show further cross-sectional views of security devices according to the invention.

In other embodiments, such as is shown in FIG. 36(a), the security device 10 could be formed on a conventional document substrate 2. Such substrates are typically fibrous in nature, comprising for instance paper or regenerated cellulose as described in WO2020/156655.

In all of the embodiments described so far, as noted at the outset, it has been assumed that the security device is formed on a substrate 2 which also acts as the document substrate for the eventual security document 100. Suitable document substrates include polymer document substrates of the type already referred to above, where the substrate 2 comprises a core substrate of a transparent polymeric material such as polypropylene (PP) (most preferably biaxially oriented PP (BOPP)), polyethylene terephthalate (PET), polyethylene (PE), polycarbonate (PC), polyvinyl chloride (PVC), nylon, acrylic, Cyclic Olefin Polymer (COP) or Cyclic Olefin Copolymer (COC), or any combination thereof. The polymer substrate 2a may be monolithic, e.g. formed from a single one of the above materials, or multi-layered, e.g. having multiple layers of the same type of polymer (optionally with different orientations) or layers of different polymer types. As mentioned previously, by "transparent" it is meant that the polymer substrate 2a is substantially visually clear, although it may carry a coloured tint and/or another optically detectable substance such as a fluorescent material.

One or both surfaces of the polymer substrate 2a may be treated to improve adhesion/retention of subsequently applied materials. For example, a primer layer may be applied to all or part of either surface of the polymer substrate 2a, e.g. by printing or coating. The primer layer is preferably also transparent and again could be tinted or carry another optically detectable material. Suitable primer layers include compositions comprising polyethylene imine, hydroxyl terminated polymers, hydroxyl terminated polyester based co-polymers, cross-linked or uncross-lined hydroxylated acrylates, polyurethanes and UV curing anionic or cationic acrylates.

Alternatively or in addition to the application of a primer layer, the surface of the polymer substrate 2a may be prepared for onward processing by controlling its surface energy. Suitable techniques for this purpose include plasma or corona treatment.

The opacifying layer(s) 2b each comprise a non-transparent material, the primary purpose of which is usually to provide a suitable background for later printing of graphics thereon. Thus, preferably, the opacifying layers comprise polymeric, non-fibrous material containing at least a light scattering substance such as a pigment. The opacifying layers 2b are preferably light in colour, most preferably white or another light colour such as off-white or grey so that a later-applied graphics layer will contrast well against it. In preferred examples, the opacifying layers each have a brightness L* in CIE L*a*b* colour space of at least 70, preferably at least 80 and more preferably at least 90. For example, each opacifying layer may comprise a resin such as a polyurethane based resin, polyester based resin or an epoxy based resin and an opacifying pigment such as titanium dioxide ($TiO_2$), silica, zinc oxide, tin oxide, clays or calcium carbonate.

Two or more opacifying layers may be applied to each surface of the polymer substrate 2a, in order to achieve the necessary opacity. The optical density of each layer by itself may typically be around 0.2 to 0.5. Preferably, three or more layers are applied to each surface, overlapping one another (e.g. as illustrated in FIGS. 27 to 32).

In a preferred embodiment, at least one of the opacifying layers (preferably one on each surface of the polymer substrate 2a) is made electrically conductive, e.g. by the addition of a conductive pigment thereto. This reduces the effect of static charges which may otherwise build up on the security document during handling.

The opacifying layers 2b are preferably applied to the polymer substrate 2a before the manufacture of the presently disclosed security device 10, using a printing process such as gravure printing, although in other cases the opacifying layers could be coated onto the substrate, or applied by offset, flexographic, lithographic or any other convenient method. Depending on the design of the security document, the opacifying layers may be omitted across gaps on one or both surfaces of the polymer substrate to form window regions (which may be full windows or half windows, or a mixture of both) as described above. This can be achieved through appropriate patterning of the opacifying layers during the application process. In alternative constructions, the opacifying layers 2b could comprise self-supporting pre-formed layers (optionally including apertures to later form windows) which are then laminated to the polymer substrate 2a. In this case, the opacifying layers could be polymeric or could be of fibrous construction, such as paper, thus rendering the security document a "hybrid" paper/polymer construction.

Figure 36B:
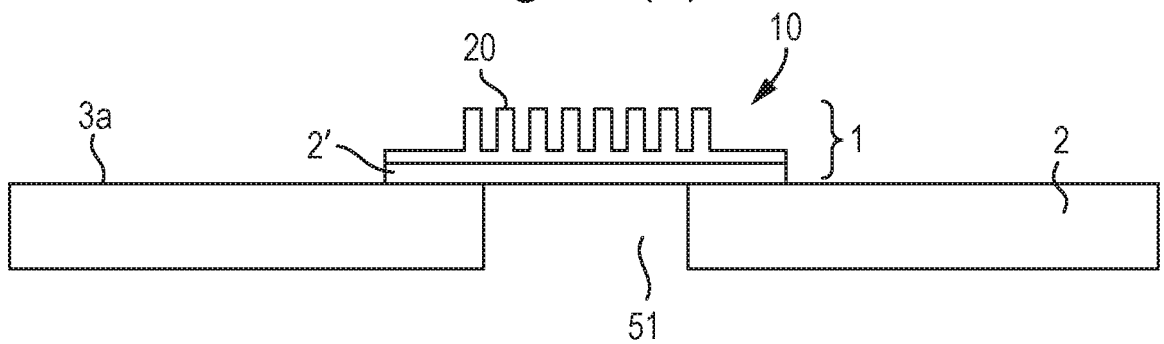

It is also possible to form the security device 10 on a substrate other than the document substrate 2. For instance, the security device 10 can be formed on its own substrate, resulting in a security article 1 such as a security thread, strip, foil or patch. The security article can then be affixed to or incorporated into a security document 100, e.g. by adhesive or via hot or cold stamping. An example of this is shown in FIG. 36(b), where the security device 10 is formed on a secondary substrate 2' such as a transparent polymer film (e.g. PET). This will typically be thinner than a document substrate 2 (e.g. of the order of 30 to 50 microns thick rather than 100 microns or greater). The surface relief structure 20 is formed on a first surface of the substrate 2'.

In this example, the security article 1 is shown to be affixed to a first surface 3a of the security document substrate 2 with the security device 10 (or at least a part thereof) over a window region 51 of the document formed by an aperture through the document substrate 2, as may typically be the case where the document substrate 2 is paper or similar. It is also possible to locate a security article 1 of this sort with the security device 10 in a non-window region 50 of the document substrate 2. Security articles 1 can alternatively be applied to polymer type document substrates, in window regions, half-window regions and/or non-window regions thereof.

In a further example, the secondary substrate 2' may be affixed to the document substrate 2 and then the surface relief structure 20 formed over the secondary substrate. The surface relief structure may be disposed only on the secondary substrate 2', or over a combination of the secondary substrate (fully or partially) and the document substrate.

Suitable apparatus, materials and methods for forming the relief structures disclosed herein are described in WO-A-2018/153840 and WO-A-2017/009616. In particular, the relief structures can be formed by the in-line casting devices detailed in WO-A-2018/153840 (e.g. that designated 80 in FIG. 4 thereof), using an embossing tool 85 carrying an appropriately designed micro-optical structure from which can be cast the desired relief structure shape. Similarly, the cast-curing apparatuses and methods disclosed in section 2.1 of WO-A-2017/009616 (e.g. in FIGS. 4 to 8 thereof) can also be used to form the presently disclosed relief structures, by replacing the relief 225 carried on casting tool 220 with an appropriate relief from which can be cast the desired shapes. In particular it will be noted that whilst WO-A-2017/009616 describes the use of the apparatus to form focussing elements, the same apparatus can be used to form any desired relief structure by appropriate reconfiguration the relief 225, including that envisaged herein.

Whichever casting apparatus is used, the curable material(s) from which the relief structure is cast may be applied either directly to the tool carrying the desired relief shape (e.g. to the embossing tool 85 of WO-A-2018/153840 or to the casting tool 220 of WO-A-2017/009616), or the curable material(s) may be applied directly to the substrate on which the relief structure is to be formed, and then brought into contact with the tool (e.g. by impressing the tool onto the deposited curable material). Both options are described in the aforementioned documents. Preferably, the latter option is employed and the curable material(s) are applied to the substrate by screen printing as detailed in WO-A-2018/153840, before being formed into the desired relief structure. If the former option is employed, it should be noted that there is preferably no wiping of the casting tool surface relief between applying the curable material to it, and bringing it into contact with the substrate, so that a base layer of curable material remains connecting the protrusions (e.g. raised elements) of the relief structure together on the substrate (the base layer will be of much lesser height than the protrusions). In some cases, the curable materials(s) may be provided to both the substrate surface and the tool carrying the desired relief shape.

Suitable curable materials are disclosed in WO-A-2017/009616, section 2.1. UV-curable materials are most preferred. Curing of the material(s) preferably takes place while the casting tool is in contact with the curable material, against the substrate.

In all of the above methods, the curable material in which the surface relief structure 20 is formed can be of various different compositions. The curable material is preferably radiation-curable and may comprise a resin which may typically be of one of two types, namely:

a) Free radical cure resins, which are typically unsaturated resins or monomers, pre-polymers, oligomers etc. containing vinyl or acrylate unsaturation for example and which cross-link through use of a photo initiator activated by the radiation source employed e.g. UV.

b) Cationic cure resins, in which ring opening (e.g. epoxy types) is effected using photo initiators or catalysts which generate ionic entities under the radiation source employed e.g. UV. The ring opening is followed by intermolecular cross-linking.

The radiation used to effect curing will typically be UV radiation but could comprise electron beam, visible, or even infra-red or higher wavelength radiation, depending upon the material, its absorbance and the process used. Examples of suitable curable materials include UV curable acrylic based clear embossing lacquers, or those based on other compounds such as nitro-cellulose. A suitable UV curable lacquer is the product UVF-203 from Kingfisher Ink Limited or photopolymer NOA61 available from Norland Products. Inc, New Jersey.

Due to the nature of the cast-cure process, the resulting relief structure will typically include a base layer of material on top of the substrate, connecting the protrusions of the relief at their base. In many cases this base layer is integral with the relief structure and formed of the same curable material(s), resulting from either the shape of the casting relief and/or the manner in which the curable material is pressed between the substrate and the casting tool during processing. An example of such a base layer and its formation is disclosed in WO-A-2017/009619, FIG. 8. It is also possible to provide (alternatively or in addition) a base layer in the form of a pedestal layer, applied in a preceding step. Apparatus and methods for providing such a pedestal layer are disclosed in WO-A-2017/09620, FIGS. 8 to 12.

Figure 37A:
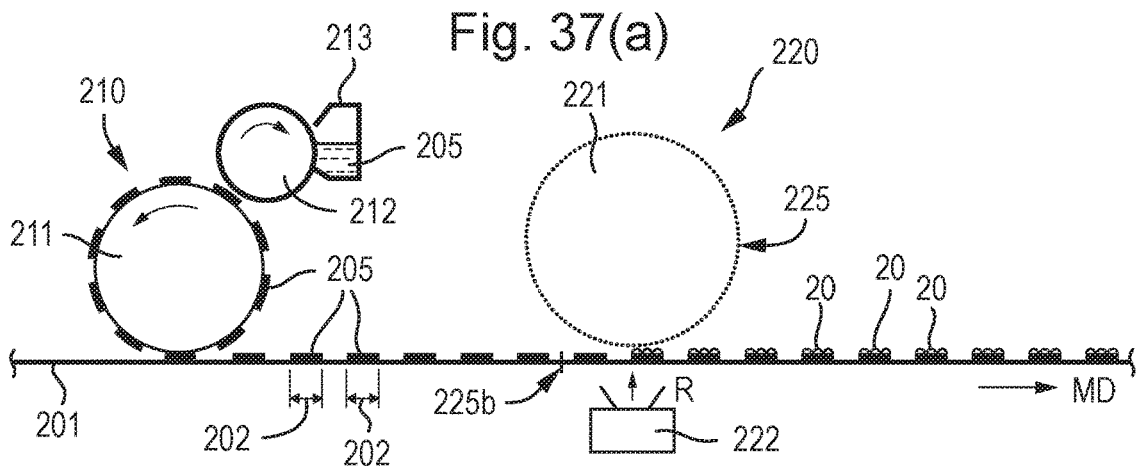
FIG. 37 illustrates one possible method of forming a surface relief structure according to the invention using a cast cure process.
Figure 37B:
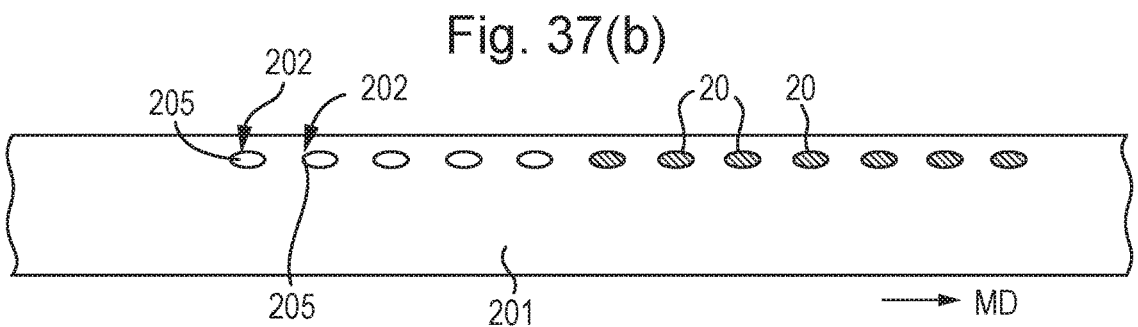

An example of a suitable cast-cure process for forming surface relief structures 20 suitable for use in the security devices disclosed herein will be described with reference to FIGS. 37(a) and (b) hereto, which show the structure 20 only schematically. The process is shown as applied to a support layer 201, comprising a transparent or translucent film, which may be the aforementioned document substrate 2 or could be another substrate 2' which is either attached to or incorporated within the document substrate, or is later applied to the document substrate 2. FIG. 37(a) depicts the apparatus from a side view, and FIG. 37(b) shows the support layer in a perspective view, the manufacturing apparatus itself being removed for clarity.

A curable material 205 is first applied to the support layer 201 using an application module 210 which here comprises a patterned print cylinder 211 which is supplied with the curable material from a doctor chamber 213 via an intermediate roller 212. For example, the components shown could form part of a screen printing system. Other printing techniques such as lithographic, flexographic, offset or inkjet printing could also be used. Print processes such as these are preferred since the curable material 205 can then be laid down on the support 201 only in selected regions 202 thereof, the size, shape and location of which can be selected by control of the print process, e.g. through appropriate configuration of the pattern on cylinder 211. However, in other cases, an all over coating method could be used, e.g. if the surface relief structure is to be formed all over the support 201. The curable material 205 is applied to the support 201 in an uncured (or at least not fully cured) state and therefore may be fluid or a formable solid.

The support 201 is then conveyed to a casting module 220 which here comprises a casting tool 221 in the form of a cylinder carrying a surface relief 225 defining the shape of the surface relief structure which is to be cast into the curable material 205. As each region 202 of curable material 205 comes into contact with the cylinder 221, the curable material 205 fills a corresponding region of the relief structure, forming the surface of the curable material into the shape defined by the relief. The cylinder 221 may be configured such that the relief structure 225 is only provided at regions corresponding to shape and position of the first regions 202 of curable material 205.

Having been formed into the correct surface relief structure, the curable material 205 is cured by exposing it to appropriate curing energy such as radiation R from a source 222. This preferably takes place while the curable material is in contact with the surface relief 225 although if the material is already sufficiently viscous this could be performed after separation. In the example shown, the material is irradiated through the support layer 201 (e.g. the paper or polymer substrate is sufficiently transparent to the curing radiation for the curing to take place) although the source 222 could alternatively be positioned above the support layer 201, e.g. inside cylinder 221 if the cylinder is formed from a suitable transparent material such as quartz. In an alternative embodiment, the curable material 205 could be applied directly onto casting tool 221 rather than on to the substrate 201. This could be done in an all-over or pattern-wise manner.

Exemplary "microintaglio" processes which can alternatively be used to form the relief structures disclosed herein, and suitable curable materials, are disclosed in WO-A-2017/009616, section 3.1, FIGS. 12 to 15.

Figure 38:
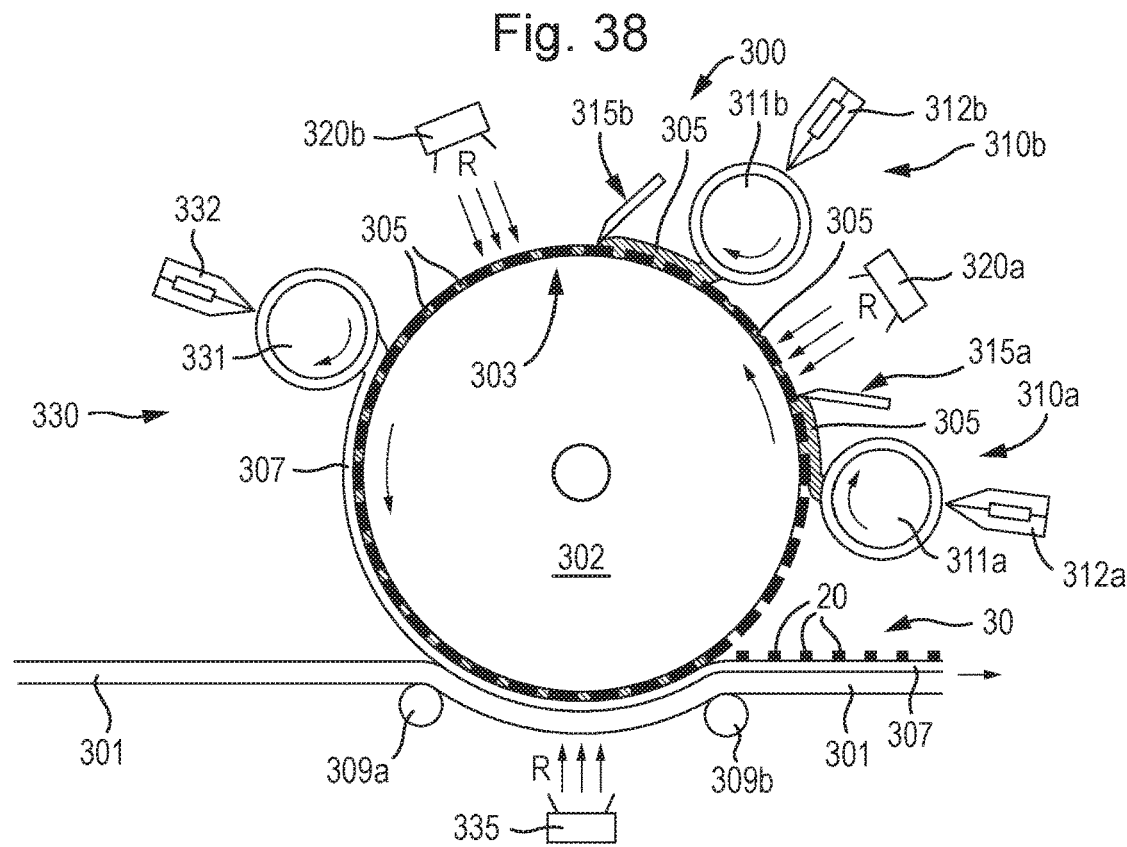
FIG. 38 illustrates one possible method of forming a surface relief structure according to the invention using a microintaglio process.

An example of a suitable "microintaglio" process for forming surface relief structures 20 suitable for use in the security devices disclosed herein will be described with reference to FIG. 38. The surface relief structures 20 are formed on a support layer 301, which is preferably transparent, and which could be the polymer substrate 2a ultimately forming the basis of the security document substrate 2, or could be another carrier film 2' which is then affixed to the document substrate 2. The support layer 301 is preferably pre-primed, e.g. by applying a primer layer such as a thin, optically clear UV adhesive layer (not shown) or by raising its surface energy e.g. by corona treatment. The desired pattern of the surface relief structure 20 is defined by recessed areas in the surface 303 of a die form 302. The recessed areas are separated by raised areas of that surface 303. The die form preferably takes the form of a cylinder, but this is not essential.

The recessed areas of the die form are filled with a curable material 305. An exemplary first application module for applying the material 305 into the recessed areas is shown at 310a. This includes a slot die 312a configured to supply the curable material 305 to a transfer roller 311a from which it is applied to the die form surface 303. The shore hardness of the transfer roller 311a is preferably sufficiently low that some compression/compliance is achieved to improve the transfer of material to the die form 302, which is typically relatively rigid such as a metal print cylinder. The applied ink layer should match or exceed the depth of the recessed areas. The viscosity of the curable material may be configured so that the material 305 transfers substantially only into the recessed areas of the die form and not onto the raised surfaces but in case any of the material 305 remains on the raised surfaces it is preferred to provide a removal means such as doctor blade 315a to remove any such excess material 305 from outside the recessed areas. The material 305 in the recessed areas is preferably then at least partially cured by exposing the material 305 to appropriate curing energy, e.g. radiation, from a source 320a, although this curing could be performed at a later stage of the process.

Any suitable curable material 305 could be used, such as a thermally-curable resin or lacquer. However, preferably, the curable material is a radiation curable material, preferably a UV curable material, and the curing energy source is a radiation source, preferably a UV source. UV curable polymers employing free radical or cationic UV polymerisation are suitable for use as the UV curable material. Examples of free radical systems include photo-crosslinkable acrylate-methacrylate or aromatic vinyl oligomeric resins. Examples of cationic systems include cycloaliphatic epoxides. Hybrid polymer systems can also be employed combining both free radical and cationic UV polymerization. Electron beam curable materials would also be appropriate for use in the presently disclosed methods. Electron beam formulations are similar to UV free radical systems but do not require the presence of free radicals to initiate the curing process. Instead the curing process is initiated by high energy electrons.

As has been explained herein, the material may carry a coloured tint or may be opaque. The colour will be provided by one or more pigments or dyes as is known in the art. Additionally or alternatively, the curable material may comprise at least one substance which is not visible under illumination within the visible spectrum and emits in the visible spectrum under non-visible illumination, preferably UV or IR. In preferred examples, the curable material comprises any of: luminescent, phosphorescent, fluorescent, magnetic, thermochromic, photochromic, iridescent, metallic, optically variable or pearlescent pigments.

If the first application module 310a achieves substantially complete filling of the recessed areas with material 305 then no further application of curable material 305 may be required. However it has been found that the recessed areas may not be fully filled by a single application process and so, in particularly preferred embodiments, a second application module 310b is provided downstream of the first (and preferably of curing source 320a) for applying more of the same material 305 to the die form. In the example shown, the second application module 310b is of the same configuration as the first, comprising a slot die 312b for supplying the curable material 305 onto a transfer roller 311b which applies the curable material 305 into the partially-filled recessed areas on the die form surface. Again the viscosity of the material could be adjusted so that it only fills those recessed areas and is not substantially applied to the raised areas, but preferably another removal means such as doctor blade 315b is provided to remove any such excess material 305 from outside the recessed areas. In the present embodiment, the transferred material 305 is then at least partially cured by second curing source 320b although as discussed below this is not essential, or the degree of curing of the additional material applied by second application module 310b may be lower than that of the material applied first.

If the recessed areas of the die form surface 303 are still not substantially filled, third and subsequent application modules 310 can be provided as necessary.

Next, a tie coat 307 formed of a second curable material is preferably applied over substantially the whole surface of the die form 303, i.e. coating both the filled recessed areas and the raised areas of the surface 303. The second curable material may or may not be of the same composition as the first curable material. In particularly preferred embodiments, the tie coat composition may be selected so as to improve the adhesion between the first curable material and the support layer 301. The tie coat 307 is applied by a tie coat application module 330 which here comprises a slot die 332 and a transfer roller 331. It is desirable for the tie coat to be applied in a continuous, homogenous manner at the micron level hence it is preferably applied in a metered way via a slot die and transfer roller combination.

The tie coat may be partially cured at this point by a further radiation source (not shown). The die form surface carrying the filled recesses and tie coat is then brought into contact with the support layer 301, either at a nip point or, more preferably, along a partial wrap contact region between two rollers 309a, 309b as shown. The combination is then exposed to curing energy, e.g. from radiation source 335, preferably while the support layer 301 is in contact with the die form surface. The support layer 301 is then separated from the die form at roller 309b, carrying with it the tie coat 307 and the elements of material 305 removed from the recessed areas of the die form surface 303 by the tie coat 307. The material 305 is therefore present on the support layer 301 in accordance with the desired pattern, forming the surface relief structures 20.

The tie coat 307 is preferably at least partially cured before the die form 302 leaves contact with the support layer 301 at roller 309b, hence the preferred use of a partial wrap contact via lay on and peel off rollers 309a, b as shown which tension the web around the die form cylinder. If the material is not fully cured in this step, an additional curing station may be provided downstream (not shown) to complete the cure.

In a variant, after the tie coat 307 has been applied, a removal means such as a further doctor blade could be provided to remove the tie coat 307 from the raised portions of the die form surface 303 such that the regions of the tie coat 307 are confined to the surface relief structures. These tie coat regions will most likely not be proud of the die form surface. As such the support layer 301 in this embodiment is preferably primed with a compliant adhesive layer which may be partly cured prior to contacting the die form but should still be compliant before entering the curing wrap.

The use of a tie-coat 307 is optional. Hence the tie coat and its application steps may be omitted from the above-described method. This is particularly the case where the last application of material 305 is not fully cured, since this incompletely cured material can take on the function of the tie coat, helping to affix the material 305 onto the support 301. In many cases, the tie coat 307, if provided, will be a transparent material.

In embodiments in which the device comprises surface relief structures formed on opposing sides of the substrate (as described above with reference to FIGS. 23 to 25), the surface relief structures may be formed sequentially in the same pass ("in-line") or in separate passes (off-line) and then registered in a web-based or sheet-based process using the methods described above.

Figure 39:
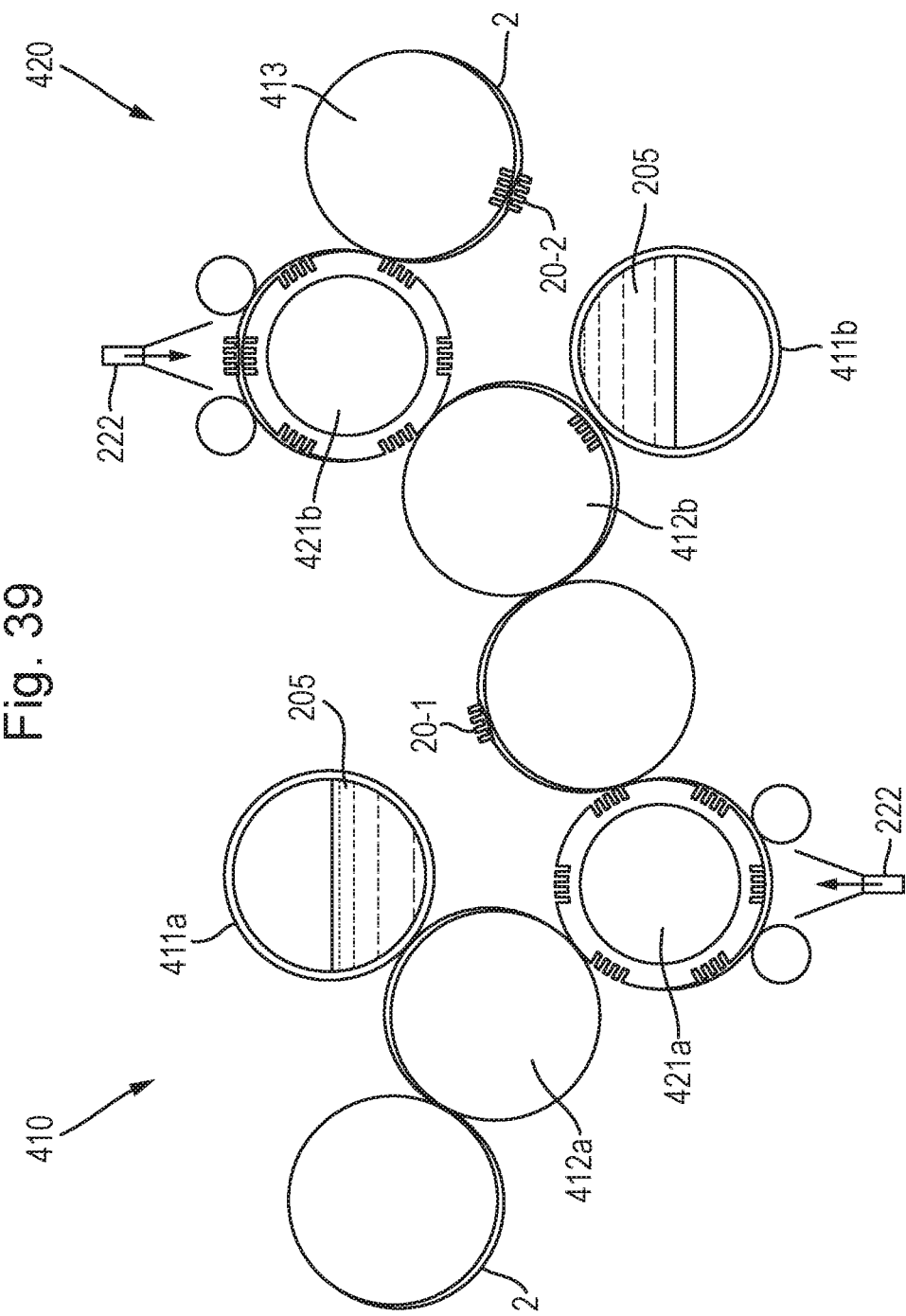
FIG. 39 schematically illustrates an exemplary apparatus for sequentially forming two surface relief structures on opposing sides of substrate.

FIG. 39 illustrates an arrangement for sequentially casting two surface relief structures 20-1, 20-2 on opposing sides of a substrate 2 (which here is in the form of a sheet). This may be described as forming the structures in-line in the same pass. The arrangement generally comprises a first print and cast module 410 and a second print and cast module 420. A curable material 205 is first applied to a first side of the sheet substrate 2 as it passes through a nip formed by screen print cylinder 411a and intermediate roller 412a. However, as previously discussed, other printing techniques such as lithographic, flexographic, offset or inkjet printing could also be used. The sheet 2 is then conveyed to casting tool 421a in the form of a cylinder defining the shape of a surface relief structure which is to be cast into the curable material 205. Having been formed into the desired surface relief structure, the curable material 205 is cured by exposing it to appropriate curing energy such as UV radiation from source 222. This preferably takes place while the curable material is in contact with the surface relief 225 although if the material is already sufficiently viscous this could be performed after separation.

The sheet substrate 2, now carrying the cured first surface relief structure 20-1, is the conveyed to the second print and cast module 420. In a similar manner, a curable material 205 is applied to the second side of the substrate as it passes through nip formed between intermediate roller 412b and second screen print cylinder 411b. The substrate is then conveyed to second casting tool 412b where the curable material is formed into the desired second surface relief and cured via radiation source 222. The substrate 2, now carrying both surface reliefs 20-1 and 20-2 is then conveyed away from the second print and cast module 420 via transfer roller 413.

It is also possible for the surface relief structures to be applied to the opposite surfaces of substrate simultaneously, that is, at the same point along the transport path in the machine direction.

Figure 40:
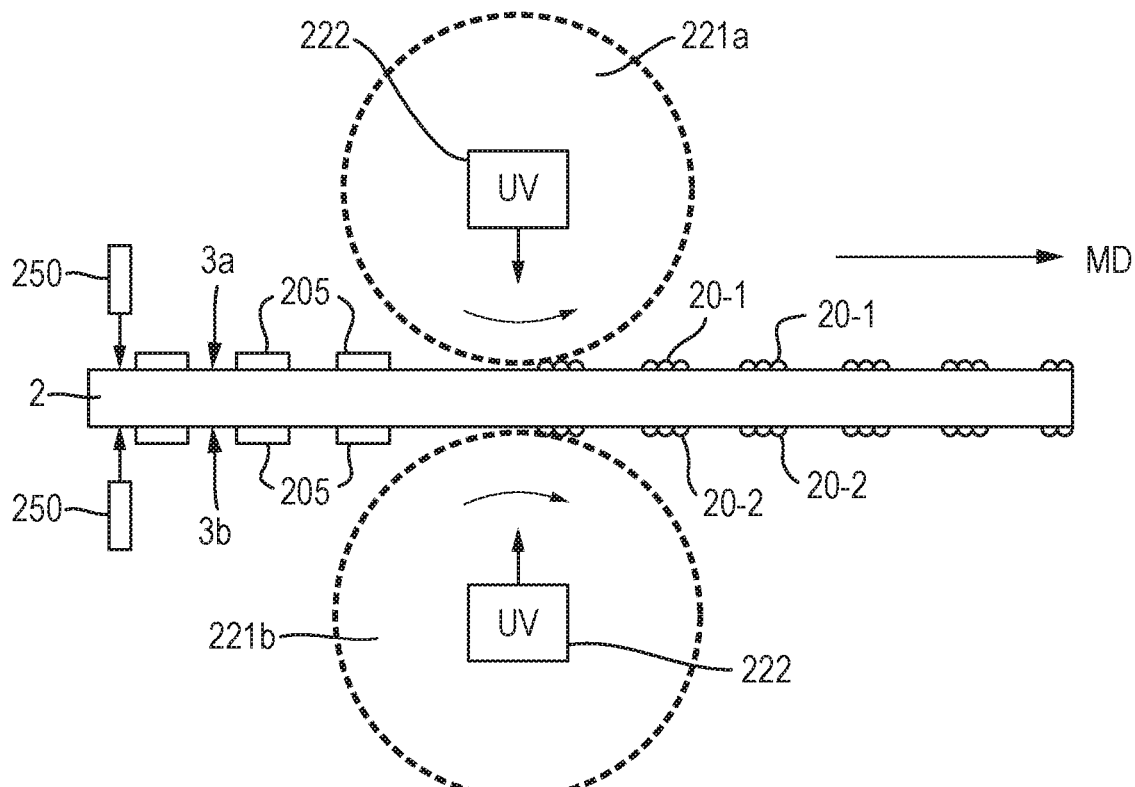
FIGS. 40 and 41 schematically depict two exemplary apparatuses for use in embodiments of the invention for forming two surface relief structures on opposing sides of substrate simultaneously.

FIG. 40 shows an example of this in the case where the surface relief structures 20-1, 20-2 are applied to the first 3a and second 3b surfaces, respectively, of a document substrate 2, which in this case is in the form of a web. However the same principles can be applied to the construction of an article such as a security thread, in which case the web substrate 2 will be replaced by some other, typically thinner, transparent film. For clarity, FIG. 40 depicts only selected components of the apparatus used to form the surface relief structures. Uncured curable material 205 is applied to the first 3a and second 3b surfaces of the web 2 by inkjet printing 250 (although alternative printing processes may be used). The uncured material on the web is transferred along the machine direction MD towards first casting tool 221a and a second casting tool 221b (e.g. as shown in FIG. 37). The first casting tool 221a and second casting tool 221b are arranged on opposite sides of the transport path along which the substrate 2 is conveyed, so as to form a (low pressure) nip through which the substrate 2 passes. At each location along the substrate 2, its first surface 3a therefore comes into contact with the first casting tool 221a at the same time as its second surface 3b comes into contact with the second casting tool 221b. The curable material is cured by radiation from UV lamps 222 located within each casting tool. Thus, the casting tools are made of a UV-transparent material such as quartz such that the curable material may be cured through the tools. As a result, the surface relief structures 20-1, 20-2 are formed on each point of the substrate simultaneously.

This has the significant advantage that any deformation experienced by the substrate 2, as a result of changes in processing temperature or the like, will be exactly the same when each of the surface relief structures is applied. The substrate has no time to expand or contract between the instants at which the two surface relief structures are applied, since they occur at the same time. As such, a very high degree of register between the two components is automatically achieved.

The arrangement shown in FIG. 40 has the disadvantage that since the nip between the two casting tools 221a, 221b constitutes the first point of contact between the substrate and the casting tools, the curable material from which the surface relief structures are formed will be substantially uncured when it enters the nip. As such, the pressure applied between the first casting tool 221a and the second casting tool 221b should be low so as to avoid damage to the cast structures.

Figure 41:
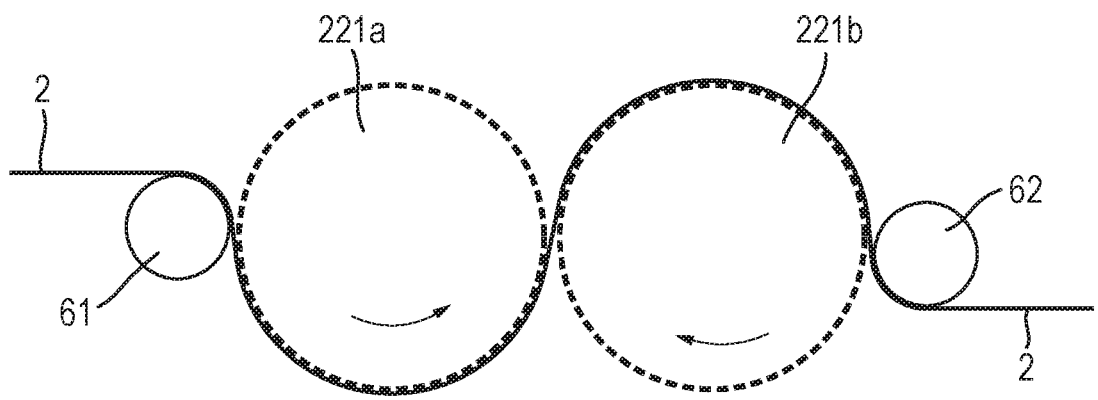
Figure 42A:
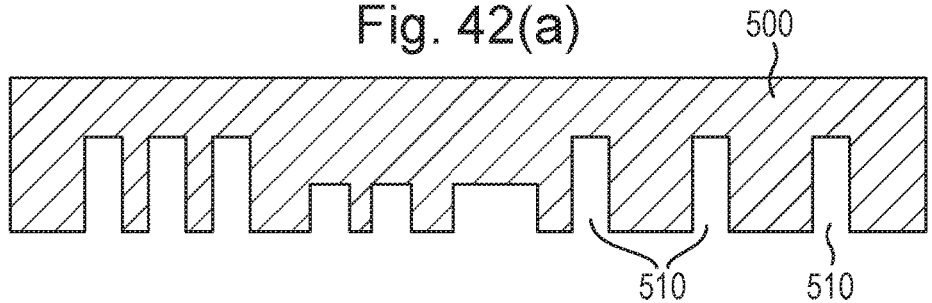
Figure 42B:
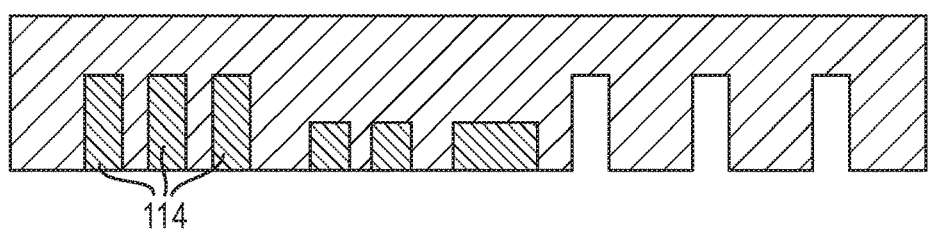
Figure 42C:
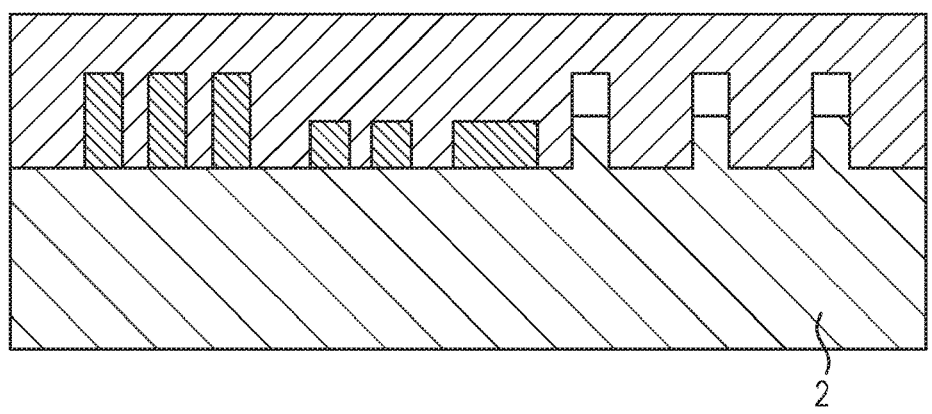
Figure 42D:
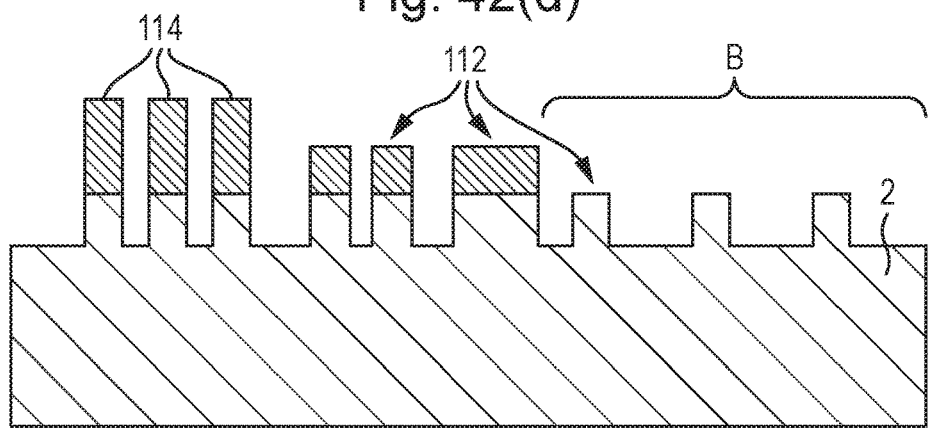

FIG. 41 shows an improved arrangement in which formation of the surface relief structures on opposing sides of the substrate can still be considered simultaneous because the curable material is still in contact with the surface reliefs of the casting tools 221a, 221b at the nip location between the two. The substrate 2 is wrapped around a portion of the first casting tool 221a from a first point at lay on roller 61, at which casting of the first surface relief structure 20-1 begins, until the nip with second casting tool 221b at which point the first surface relief structure 20-1 will be relatively well cured, preferably fully cured. As such, the pressure between the two components 221a, 221b can be increased relative to that in the FIG. 39 embodiment since the material of the first surface relief structure is relatively hard and less prone to damage. This improves the quality achieved in the formation process. A further benefit of the arrangement shown is the increased wrap length of the substrate 2 around second casting tool 221b, allowing for prolonged curing here also. The substrate 2 stays in contact with second casting tool 221b from the nip location until take-off roller 62.

Suitable substrates on which the disclosed devices can be formed are disclosed in WO-A-2017/009616, section 1, and apparatus/methods for applying opacifying layers thereto in section 4, including the formation of window regions. Preferably, the opacifying layers are applied before formation of the presently disclosed security devices on the substrate. For instance, the sheet material supplied to the apparatus of WO-A-2018/153840 may comprise a polymer substrate of the sort disclosed in WO-A-2017/009616, already provided with one or more opacifying layers. The security devices disclosed herein may be disposed in a window region defined by the opacifying layers, or in a non-window region.

Further exemplary embodiments of the present disclosure are set out in the following numbered clauses:

Numbered Clause 1: A security device, comprising a surface relief structure formed of a cured material, the surface relief structure being disposed on a substantially flat substrate and defining a plurality of raised elements spaced from one another, the raised elements corresponding to elements of a screened image, whereby the size, spacing and/or colour density of the elements varying across the surface relief structure so as to exhibit a multi-tonal version of the image.

Numbered Clause 2: A security device according to Numbered Clause 1 wherein the height of the raised elements varies across the surface relief structure, preferably in accordance with the image, to provide additional tactility thereto.

Numbered Clause 3: A security device according to Numbered Clause 1 or Numbered Clause 2, wherein the raised elements are joined by a base layer of the cured material, the base layer having a lower height and a lower optical density than the raised elements such that there is a contrast between the raised elements and the base layer.

Numbered Clause 4: A security device according to Numbered Clause 1 or Numbered Clause 2, wherein the cured material is absent between the raised elements.

Numbered Clause 5: A security device according to any of the preceding Numbered Clauses, wherein the cured material has a colour which is visible to the naked eye under at least some viewing conditions.

Numbered Clause 6: A security device according to any of the preceding Numbered Clauses, wherein the cured material is at least semi-transparent and preferably comprises a visible colourant.

Numbered Clause 7: A security device according to any of the preceding Numbered Clauses, wherein the elements are line elements, dot elements or define indicia such as letters, numbers, currency symbols and the like.

Numbered Clause 8: A security device according to any of the preceding Numbered Clauses, wherein the image is a portrait or architectural drawing.

Numbered Clause 9: A security device according to any of the preceding Numbered Clauses, wherein the substrate is a polymeric substrate.

Numbered Clause 10: A method of manufacturing a security device, comprising forming a surface relief structure on a substantially flat substrate from a curable material and curing the material, and surface relief structure defines a plurality of raised elements spaced from one another, the raised elements corresponding to elements of a screened image, whereby the size, spacing and/or colour density of the elements varying across the surface relief structure so as to exhibit a multi-tonal version of the image.

Numbered Clause 11: A method according to Numbered Clause 10, wherein the surface relief structure is formed by:
 providing a casting tool having a relief structure defined in a surface thereof, the relief structure corresponding to the surface relief structure;
 applying the curable material to the substrate or to the relief structure of the casting tool;

bringing the substrate and the casting tool together, to thereby form the curable material in accordance with the relief structure and curing the curable material such that the surface relief structure formed of the cured material is retained on the substrate.

Numbered Clause 12: A method according to Numbered Clause 10, wherein the surface relief structure is formed by:
providing a die form, the die form having a surface comprising an arrangement of raised areas and recessed areas defining the raised elements of the surface relief structure;
applying the curable material to the surface of the die form such that said curable material substantially fills the recessed areas;
bringing the substrate in contact with the surface of the die form such that it covers the recessed areas;
separating the pattern support layer from the surface of the die form such that the curable material in the recessed areas is removed from said recessed areas and retained on the pattern support layer to thereby form the surface relief structure; and
during and/or after the bringing of the substrate in contact with the surface of the die form, at least partly curing the curable material in one or more curing steps.

Numbered Clause 13: A method according to any of Numbered Clauses 10 to 12, configured to provide the security device with any of the features of Numbered Clauses 1 to 9.

The invention claimed is:

1. A security device, comprising one or more surface relief structure(s), each formed of one or more cured material(s), the surface relief structure(s) being disposed on a substantially flat substrate and defining a plurality of raised elements spaced from one another, the raised elements corresponding to elements of an image, whereby the plurality of raised elements varies across the surface relief structure(s) so as to exhibit a multi-tonal version of the image, wherein:
the image is a macro image;
the raised elements have heights in the range of 20 µm to 100 µm;
for at least one of the surface relief structure(s) the raised elements are joined by a base layer of the cured material(s), the base layer having a lower height than the raised elements such that there is a contrast between the raised elements and the base layer, wherein a ratio of the height of at least one raised element to the height of the base layer joining the raised element to an adjacent raised element is at least 10:1 and no greater than 400:1; and
the raised elements provide a tactile feature of the security device.

2. The security device according to claim 1, wherein at least one of the size, shape, orientation, spacing and/or colour density of the raised elements varies across the surface relief structure(s) so as to exhibit the multi-tonal version of the image.

3. The security device according to claim 1, wherein the plurality of raised elements are arranged as an array of raised elements, whereby the array of raised elements varies across the surface relief structure(s) to as to exhibit a multi-tonal version of the image.

4. A security device according to claim 1, wherein the image is a screened image.

5. A security device according to claim 1, wherein the elements are line elements, dot elements or define indicia such as letters, numbers, and currency symbols.

6. A security device according to claim 1, wherein for at least one of the surface relief structure(s) the height of the raised elements varies across the surface relief structure to provide additional tactility thereto.

7. A security device according to claim 1, wherein the base layer has a lower optical density than the raised elements.

8. A security device according to claim 1, wherein the base layer extends over a peripheral region surrounding the plurality of raised elements.

9. A security device according to claim 1, wherein the height of the base layer varies across the surface relief structure.

10. A security device according to claim 9, wherein the heights of the raised elements with respect to the base layer vary such that the tops of the raised elements have a substantially constant height across at least a part of the surface relief structure.

11. A security device according to claim 1, further comprising a decorative layer formed on a first and/or second surface of the substrate, wherein at least one of the said surface relief structure(s) at least partially overlaps with the decorative layer such that under at least some viewing conditions the decorative layer and the surface relief structure may be viewed in combination.

12. A security device according to claim 1, further comprising an over layer formed on at least a portion of at least one of said surface relief structure(s).

13. A security device according to claim 1, wherein for at least one of the surface relief structure(s), the at least one cured material has a colour which is visible to the naked eye under at least some viewing conditions.

14. A security device according to claim 1, wherein the raised elements are in the form of at least one of: cubic structures; faceted structures such as prisms, cones, pyramidal structures; curved structures; and irregular structures.

15. A security device according to claim 1, wherein the security device comprises two surface relief structures formed on opposing sides of the substantially flat substrate, and wherein the plurality of raised elements varies across the combination of the surface relief structures so as to exhibit a multi-tonal version of the image at least at one angle of view.

16. A security device according to claim 1, wherein the image is a static image.

17. A security document comprising a document substrate and a security device thereon, the security device being in accordance with claim 1, wherein the document substrate may or may not act as the substrate of the security device.

18. A method of manufacturing a security device, comprising forming one or more surface relief structure(s) on a substantially flat substrate, each formed from one or more curable material(s) and curing the material(s), the surface relief structure(s) defining a plurality of raised elements spaced from one another, the raised elements corresponding to elements of an image, whereby the plurality of raised elements varies across the surface relief structure(s) so as to exhibit a multi-tonal version of the image, wherein:
the image is a macro image;
the raised elements have heights in the range of 20 µm to 100 µm;
for at least one of the surface relief structure(s) the raised elements are joined by a base layer of the cured material(s), the base layer having a lower height than the raised elements such that there is a contrast between the raised elements and the base layer, wherein a ratio of the height of at least one raised element to the height of the base layer joining the raised element to an adjacent raised element is at least 10:1 and no greater than 400:1; and the raised elements provide a tactile feature of the security device.

19. A method according to claim 18, wherein at least one of the surface relief structure(s) is formed by:

providing a casting tool having a relief structure defined in a surface thereof, the relief structure corresponding to the surface relief structure;

applying the one or more curable material(s) to the substrate and/or to the relief structure of the casting tool;

bringing the substrate and the casting tool together, to thereby form the one or more curable material(s) in accordance with the relief structure; and during and/or after bringing the substrate and casting tool together, curing the one or more curable material(s) such that the surface relief structure formed of the cured material(s) is retained on the substrate.

20. A method according to claim 18, wherein the method comprises forming two surface relief structures on opposing sides of the substantially flat substrate, and wherein the plurality of raised elements varies across the combination of the surface relief structures so as to exhibit a multi-tonal version of the image at least at one angle of view.

* * * * *